(12) United States Patent
Manjeshwar et al.

(10) Patent No.: US 7,426,190 B2
(45) Date of Patent: Sep. 16, 2008

(54) SYSTEM AND METHOD FOR A COMMUNICATION PROTOCOL FOR WIRELESS SENSOR SYSTEMS INCLUDING SYSTEMS WITH HIGH PRIORITY ASYNCHRONOUS MESSAGE AND LOW PRIORITY SYNCHRONOUS MESSAGE

(75) Inventors: Arati Manjeshwar, Chandler, AZ (US); Lakshmi Venkatraman, Mountain View, CA (US); Bhaskar Srinivasan, Menlo Park, CA (US); Anshul Pandey, San Ramon, CA (US); Jim Berube, Farmington, NY (US)

(73) Assignee: Robert Bosch GmbH, Stuttgart (DE)

( * ) Notice: Subject to any disclaimer, the term of this patent is extended or adjusted under 35 U.S.C. 154(b) by 406 days.

(21) Appl. No.: 11/240,436

(22) Filed: Sep. 30, 2005

(65) Prior Publication Data
US 2007/0076650 A1    Apr. 5, 2007

(51) Int. Cl.
*H04L 12/28* (2006.01)
(52) U.S. Cl. .................. 370/254; 370/254; 455/435.1
(58) Field of Classification Search ................. 370/254, 370/328; 455/435.1
See application file for complete search history.

(56) References Cited

U.S. PATENT DOCUMENTS

| 5,862,142 | A | * | 1/1999 | Takiyasu et al. | ............ 370/480 |
|---|---|---|---|---|---|
| 2002/0011921 | A1 | * | 1/2002 | Amtmann | .................. 340/10.1 |
| 2002/0181417 | A1 | * | 12/2002 | Malhotra et al. | ............ 370/329 |
| 2004/0137927 | A1 | * | 7/2004 | Mun | ........................... 455/509 |
| 2004/0151137 | A1 | * | 8/2004 | McFarland et al. | .......... 370/329 |
| 2004/0223466 | A1 | * | 11/2004 | Schrader et al. | ............. 370/321 |
| 2005/0195760 | A1 | * | 9/2005 | Lee et al. | ..................... 370/312 |
| 2007/0258508 | A1 | * | 11/2007 | Werb et al. | ................... 375/140 |

FOREIGN PATENT DOCUMENTS

| EP | 1 107 512 | 6/2001 |
|---|---|---|
| GB | 2 375 014 | 10/2002 |
| WO | WO 2004/088934 | 10/2004 |

OTHER PUBLICATIONS

International Search Report, Jan. 28, 2008, International Patent Application EP06020092.

* cited by examiner

*Primary Examiner*—Vincent P. Harper
*Assistant Examiner*—Jaime M Holliday
(74) *Attorney, Agent, or Firm*—Kenyon & Kenyon LLP

(57) ABSTRACT

A method for initializing a wireless network is provided which includes discovering at least one node of the wireless network that is within hearing range of a base station of the wireless network, authenticating the at least one discovered node, assigning a node identifier to the at least one discovered node, and selecting a network frequency, at least one backup frequency, and a locally unique network identifier.

17 Claims, 55 Drawing Sheets

| Wakeup Interval | | | Wakeup Interval | | | Wakeup Interval | | | Wakeup Interval | | |
|---|---|---|---|---|---|---|---|---|---|---|---|
| AI/MN | BC | ... | AI/MN | BC | ... | AI/MN | BC | ... | AI/MN | BC | ... |
| | | | | | | | 5 | | | | |
| | | | | | | | | | | | |

NW ID poll received     Transmit response

Figure 14

| Maximum latency for alarms from stationary sensor nodes (ms) | 516 |
| --- | --- |
| Maximum latency for alarms from mobile nodes (ms) | 516 |
| Maximum latency for back channel commands (including acks assuming no simultaneous mobile node packet) (seconds) | 1.215 |
| Wakeup interval for nodes before initialization. (ms) | 250 |
| Wakeup interval for nodes after initialization.(sec) | 1 |
| Maximum delay for a new node to become a part of the network. (sec) | 1.356 |

Figure 18

| | |
|---|---|
| Maximum latency for alarms from stationary sensor nodes (ms) (in case the network alarm occurs immediately after MN alarm is received) | 765ms |
| Maximum latency for alarms from mobile nodes (ms) | 1000ms |
| Maximum latency for back channel commands (including acks) (seconds) | 1.706sec |
| Wakeup interval for nodes before initialization. (ms) | 250 |
| Wakeup interval for nodes after initialization. (ms) | 1000 |
| Maximum delay for a new node to become a part of the network. (sec) | 1.7 |

Figure 19

| USA | EUROPE |
|---|---|
| 200 seconds | - |
| 1 hour | - |
| 2 hours | 2 hours |
| 4 hours | 4 hours |
| 1 day | 1 day |

Figure 20

| Iteration Number | Number of slots to chose from | Range for the random number in US (3 backup frequencies, 1 Network freq) | Range for the random number in Europe. (1 backup frequency, 1 Network freq) |
|---|---|---|---|
| 1 | 2 | $2*(1+3) = 8$ | $2*(1+1) = 4$ |
| 2 | 4 | $4*(1+3)=16$ | $4*(1+1)=8$ |
| 3 | 8 | $8*(1+3)=32$ | $8*(1+1)=16$ |
| 4 | 16 | $16*(1+3)=64$ | $16*(1+1)=32$ |
| 5 | 32 | $32*(1+3)=128$ | $32*(1+1)=64$ |
| 6 | 64 | $64*(1+3)=256$ | $64*(1+1)=128$ |

Figure 24

BC packet structure for Unicast and Unicast list packets

BC packet structure for unicast list packets

|  | Multicast group Id | Sub Group No. | Node Length | Node IDs |
|---|---|---|---|---|
| Multicast | Multicast Id | Sub Group Id | N/A | N/A |
| Unicast | Node Id | 0xFF | N/A | N/A |
| Unicast list | Multicast Id | 0xFF | Number of nodes in list | Node Ids |

Figure 26

BC multicast packet for US slot structure

BC Unicast packet(unicast list packet) for US slot structure

Backup frequencies used for re-transmission

|  | Typical Number | Max Number | Number involved in simultaneous Transmission |
|---|---|---|---|
| Keyfob | 8 | 32 | 3 |
| Key pad | 3 | 8 | 3 |
| Pendants | ?? | 50 | ?? |
| Mobile nodes | ?? | 58 (50 pendants + 8 keypads) | ?? |

Figure 30

| MN Sample | BC Slot | ...... | MN Sample | Supervision Slots |

MN Sample Slot for US

Figure 31A

| Al Sample on NW Freq | Al Sample on Bak Freq | MN Sample | BC Slot | Sup Slots |
|---|---|---|---|---|

MN Sample Slot for Europe

Figure 31B

Transmission of Alarms by Pendants (Europe)

*Key fob transmission Pattern*

Transmission of Message by Key fobs (Europe)

ALARM SLOT FOR EUROPE

ALARM SLOT FOR US

| NF | NF, BF1 | NF | NF, BF2 | NF | NF, BF3 |
|---|---|---|---|---|---|

Figure 41B

| NF | NF, BF | NF | NF, BF | NF | NF, BF |
|---|---|---|---|---|---|

Figure 41A

|  | Jamming detection flag | |
|---|---|---|
|  | Set | Clear |
| Set | Increment jamming count | Increment jamming count. If count > threshold, report jamming |
| Clear | Clear jamming count Report restore jamming | No action |

Reported flag

Figure 42

BSTM/BS : Module in Hub that interfaces to the sensor network

MPS: Module in Hub that interfaces with Panel and possibly other hubs.

100 % human-written

SYSTEM AND METHOD FOR A COMMUNICATION PROTOCOL FOR WIRELESS SENSOR SYSTEMS INCLUDING SYSTEMS WITH HIGH PRIORITY ASYNCHRONOUS MESSAGE AND LOW PRIORITY SYNCHRONOUS MESSAGE

CROSS REFERENCE TO RELATED APPLICATIONS

This application is related to U.S. patent applications entitled "Method and System for Time Synchronization in Communication Networks" (Ser. No. 11/241,298), "Method and System for Providing Acknowledged Broadcast and Multicast Communication" (Ser. No. 11/240,401), "Method and System for Providing an Energy Efficient Exchange of Information in Wireless Networks" (Ser. No. 11/239,837), "Method and System for Providing Interference Avoidance and Network Coexistence in Wireless Systems" (Ser. No. 11/240,545), "Method and System for Reliable Data Transmission in Wireless Networks" (Ser. No. 11/239,839), "Method and System for Providing a Modified Time Division Multiple Access (TDMA) for Reduced Delay" (Ser. No. 11/241,639), "Method and System for Providing Reliable Communication with Redundancy for Energy Constrained Wireless Systems" (Ser. No. 11/241,300), "System and Method for a Communication Protocol for Wireless Sensor Systems Including Systems with High Priority Asynchronous Message and Low Priority Synchronous Message" (Ser. No. 11/241,296), "Method and System to Reconfigure a Network to Improve Network Lifetime Using Most Reliable Communication Links" (Ser. No. 11/240,434). The disclosure of each of the foregoing related applications is hereby incorporated by reference herein in its entirety.

FIELD OF THE INVENTION

The present invention relates to an exemplary system and method for a communication protocol for wireless sensor systems.

SUMMARY OF THE INVENTION

The present invention relates to an exemplary system and method for a communication protocol for wireless networks, including, for example, wireless sensor networks. The exemplary communication protocol may be used, for example, to initialize, configure, operate, maintain, reconfigure, and/or shutdown the wireless network, and may comply with governmental regulatory requirements, including, for example, US and European regulatory requirements.

BRIEF DESCRIPTION OF THE DRAWINGS

FIG. 14 shows an exemplary time slot allocation for consecutive wakeup intervals.

FIG. 18 shows exemplary network parameters for US compliant systems.

FIG. 19 shows exemplary network parameters for European compliant systems.

FIG. 20 shows exemplary supervision intervals for US and Europe compliant systems.

FIG. 24 shows an exemplary table for determining a range of random numbers, which are used to select a time slot to transmit alarms in order to minimize collisions.

FIG. 26 shows exemplary back channel packet structure values.

FIG. 30 shows exemplary values for the number and type of mobile nodes in a system.

FIG. 31A show an exemplary mobile node slot structure for US compliant systems.

FIG. 31B shows an exemplary mobile node slot structure for European compliant systems.

FIGS. 41A and 41B show two exemplary sampling sequences performed by the sensor nodes.

FIG. 42 shows an exemplary truth table for continuous interference protection prescribing the action to be taken on every pass based on the status of a jamming detection flag and a reported flag.

DETAILED DESCRIPTION

Figure 1:
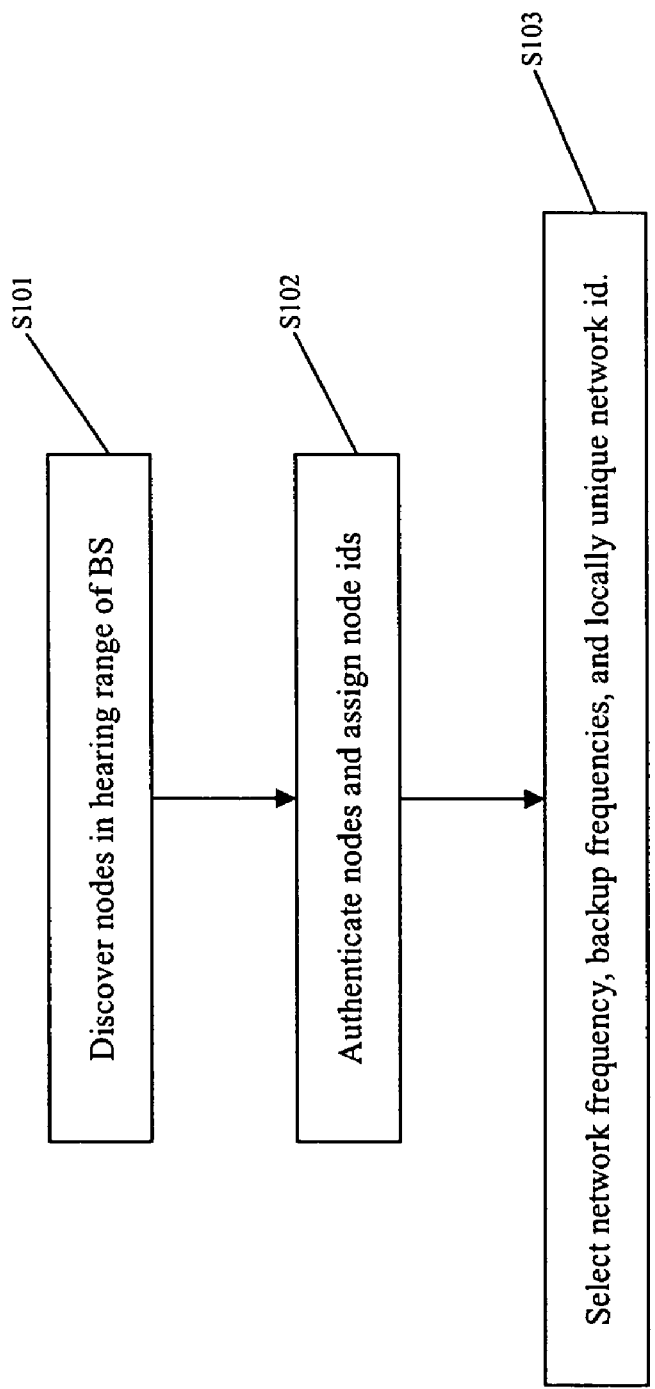
FIG. 1 shows an exemplary method to initialize and configure a wireless sensor system that includes a hub, a base station and several network nodes.

FIG. 1 shows an exemplary method to initialize and configure a wireless sensor system that includes a hub, a base station and sensor nodes. In step S101, discovery of the sensor nodes in the system is performed. That is, all the sensor nodes that are within hearing range of the base station are discovered. In step S102, authentication of the nodes and assignment of node identifiers is performed. That is, nodes are authenticated by the installer (e.g., remote program or human), and all nodes that are approved and certified to belong to the system, are assigned unique node identifiers. In this regard, the node identifier may be used, for example, to address the nodes during network operation. In step S103, a network frequency, backup frequencies, and a network identifier, which is at least locally unique among adjacent networks, are selected. To manually select the frequency of an already installed network, the system may repeat step S103 so that selection of network frequency may occur on request from an operator.

Figure 2A:
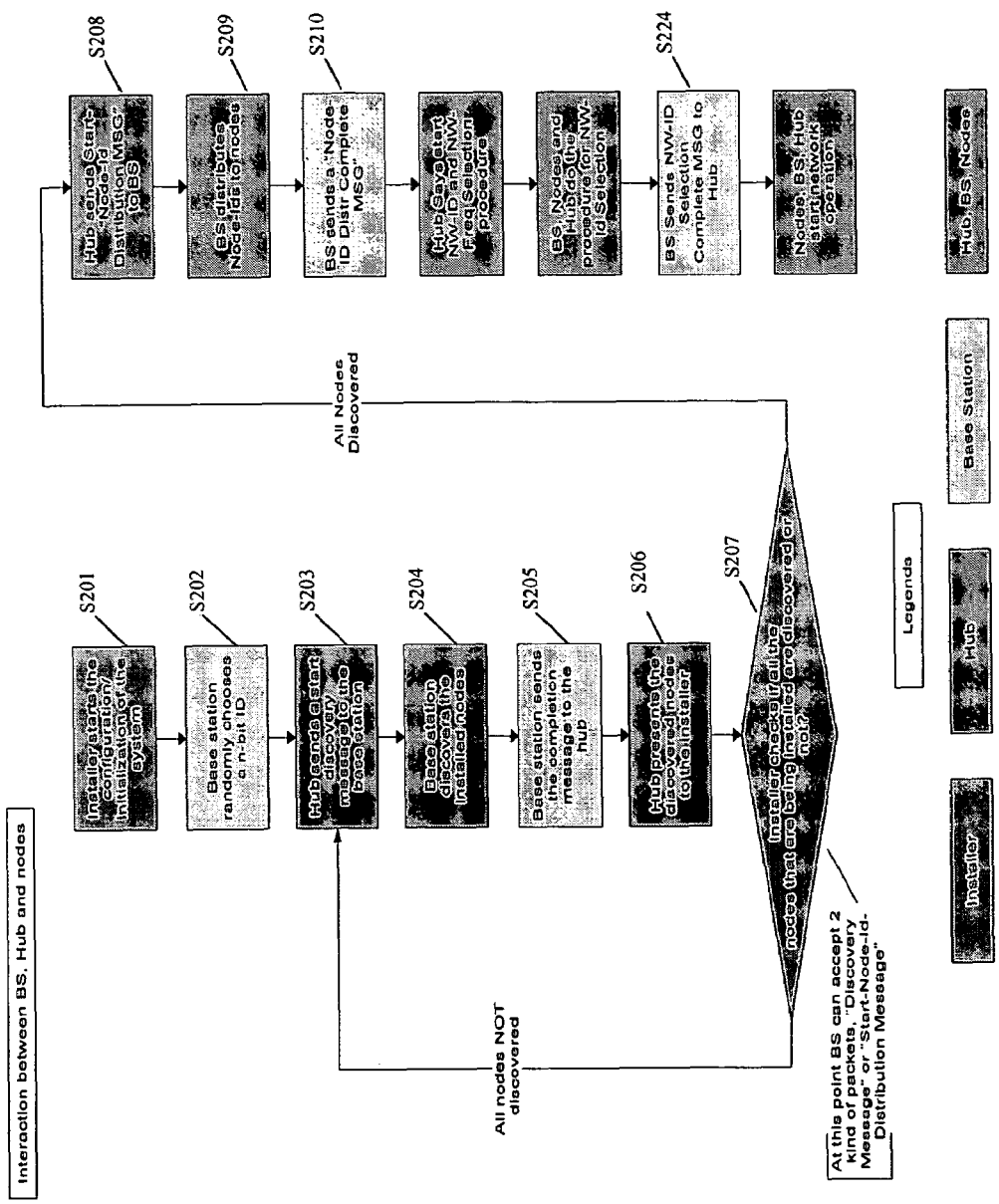
FIG. 2A shows an exemplary method for initialization a wireless sensor system.
Figure 2B:
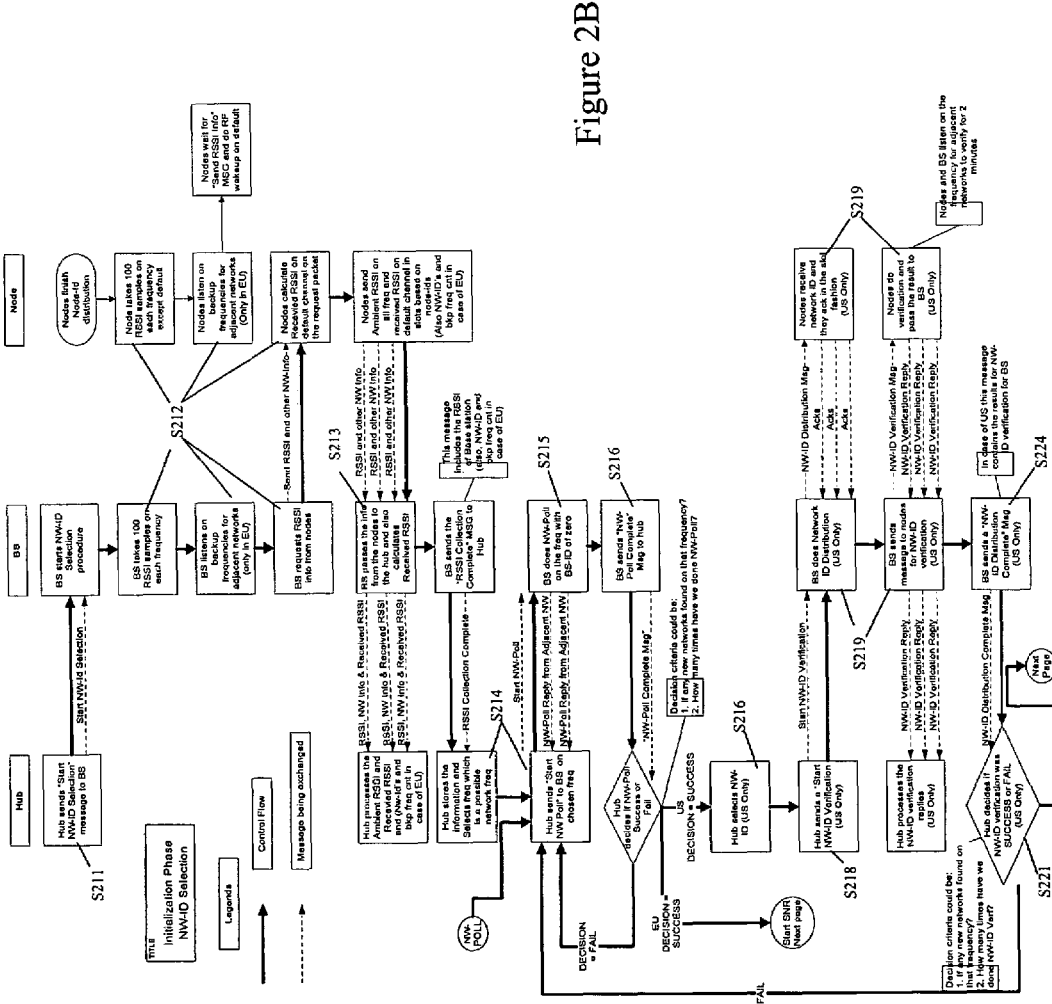
FIGS. 2B and 2C show an exemplary method for selecting a network identifier.
Figure 2C:
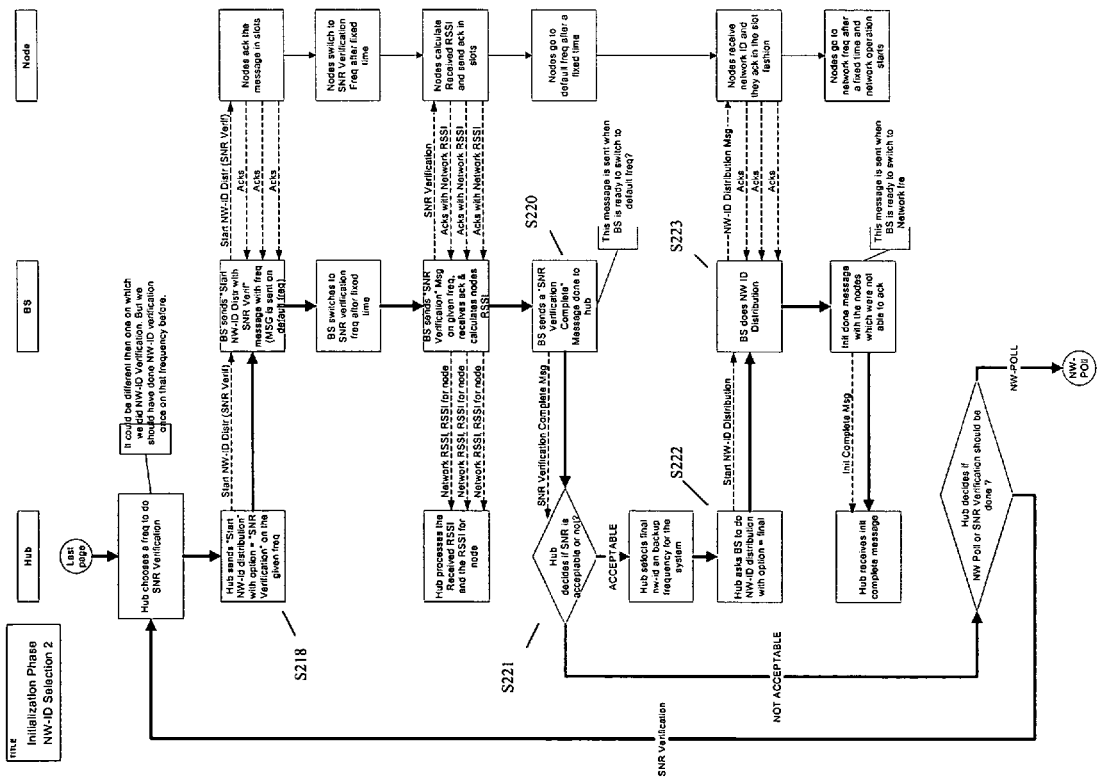

FIGS. 2A, 2B and 2C show an exemplary method for initialization a wireless sensor system, including exemplary methods for discovering all nodes and selecting a network identifier.

In step S201, an installer starts initialization of the system. In step S202, the base (BS) station chooses a random n-bit base station identifier. In step S203, the hub sends a "Start Discovery" message to the base station. In step S204, base station discovers the nodes and passes the information to the hub. In step S205, the base station sends a "Discovery Process Complete" message to the hub. In step S206, the hub presents the discovered nodes to the installer. In step S207, if all the nodes are not discovered, the installer issues discovery again and the hub repeats step S203 to S207. In step S208, the hub sends a "Start Node Id Distribution" message. In steps S209, the base station distributes the node identifiers to the nodes. In step S210, the base station sends a "Node Id Distribution Complete" message to the hub. In step S211, the hub sends a "Start NW-Id Selection" message to base station. In step S212, the base station and nodes collect the ambient RSSI reading on all frequencies.

In Europe, when the base station and nodes listen on the backup frequencies, they may also keep track of number of networks on each of the backup frequency number. They may also keep a bit-mask of the network identifier received in both the frequencies. In step S213, the base station collects ambient RSSI data (for EU Complaint Systems back frequency count and network identifiers may also be collected) from all the nodes and sends it to the hub. The base station and nodes also read the Signal to Noise Ratio (SNR) at the default frequency during this process. In step S214, based on the data collected by the node and the base station, the hub selects a network frequency and sends a "Start Network Poll" message to the base station. In step S215, the base station performs a network poll at the selected frequency and sends the network identifiers found in this frequency to the hub. In step S216, the base station sends a "NW Poll Complete" message to the hub. If there are adjacent networks using this frequency, the hub may repeat steps S214 to S216 again. (For US compliant systems, the hub may send a "Start Network Id Verification" message to the base station. The base station and nodes verify if any of the adjacent networks are using the selected network identifier and frequency and send the data back to the base station. The base station also sends a completion message at the end of phase).

In step S217, based on the data collected, the hub selects a network frequency and backup frequencies for the network. In step S218, the hub sends a "SNR Verification" message to the base station for the selected frequency. In step S219, the base station and nodes collect the signal to noise ratio (SNR) on the selected frequency and send the data to the hub via the base station. In step S220, the base station sends a "SNR Verification Complete" message to the hub. In step S221, if the signal to noise ratio (SNR) is acceptable, the hub selects the final network identifier and backup frequency for the network. If the signal to noise ratio (SNR) is not acceptable, the hub repeats the network identifier selection process (from steps S214 or S217) In step S222, the hub sends a "Network Id Distribution" message to the base station. In step S223, the base station distributes the network parameters to all the nodes. In step S224, the base station sends the "NW-ID Distribution Complete" message to the hub. In step S225, the base station and nodes switch to the network frequency and network operation after a fixed interval. In steps S226, the hub performs recovery operation for those nodes which failed the network identifier distribution.

Discovery of Nodes in the System (Collection of Device IDs)

Figure 3:
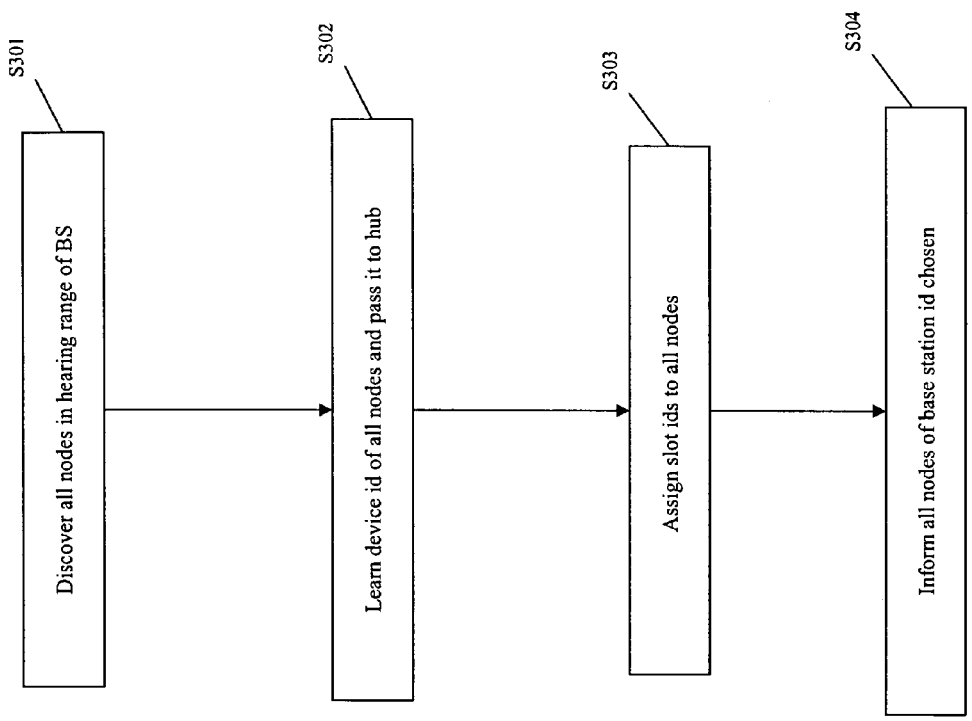
FIG. 3 shows an exemplary method to discover nodes in a wireless communications system, in which the base station discovers the sensor nodes and learns their device identifiers, and each node is assigned a temporary slot identifier.

FIG. 3 shows an exemplary method to discover nodes in a wireless communications system, in which the base station discovers the sensor nodes and learns their device identifiers, and each node is assigned a temporary slot identifier. More specifically, in step S301, all the nodes that are within the hearing range of the base station are discovered, including, for example, nodes that are not part of the system being installed. In step S302, the device identifier of all the nodes is learned and passed to the hub. In step S303, slot identifiers are assigned to all the nodes, so that communication during node identifier distribution is time slotted and packet transmission from one node does not adversely affect other nodes. In steps S304, all the nodes are informed of the chosen base station identifier so that nodes may distinguish packets from other systems that may also be performing initialization. (Note: All communications in next step of initialization (node identifier distribution) occur in a time slotted fashion so that there is no collision of packets. Each node communicates with the base station in its respective time slot that is determined by the slot identifier).

Figure 4:
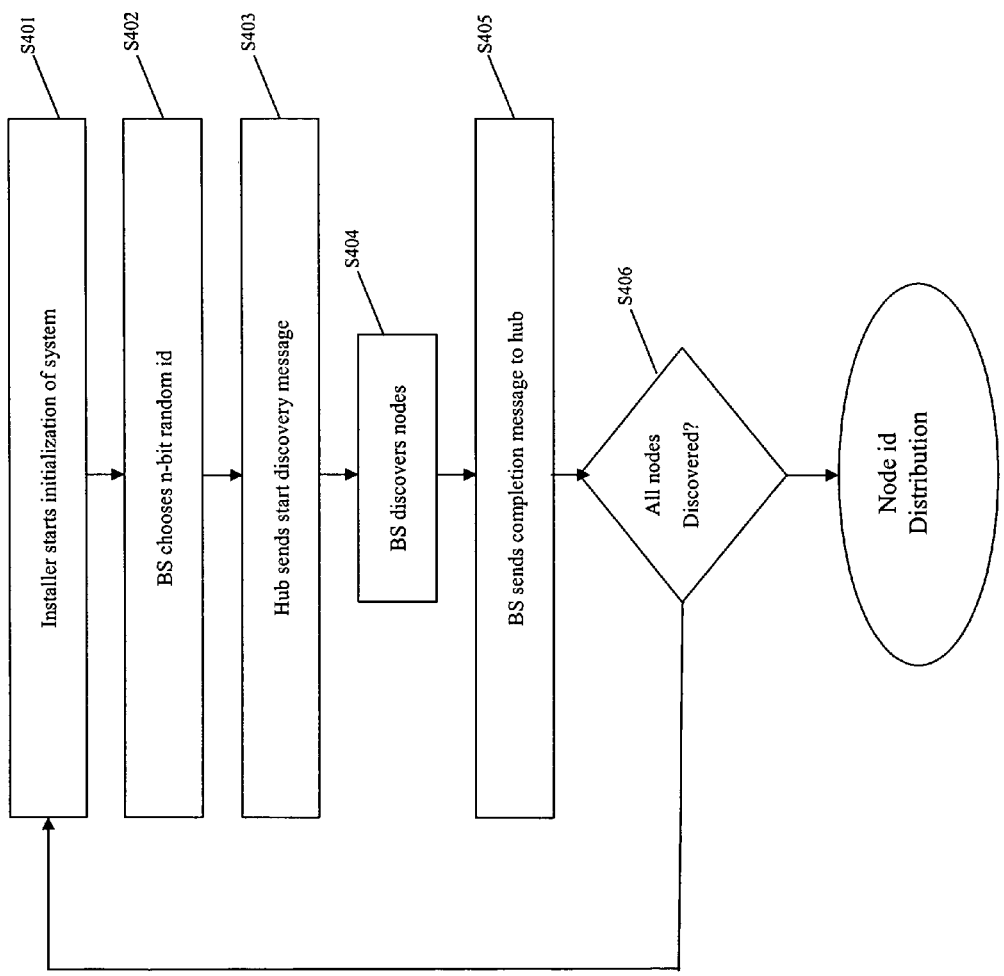
FIG. 4 shows an exemplary basic flow for the discovery of nodes and how an interaction may occur between the hub, base station and a network installer.

FIG. 4 shows an exemplary basic flow for the discovery of nodes and how an interaction may occur between the hub, base station and installer. In step S401, the installer starts the initialization of the system. In step S402, the base station chooses a n-bit random identifier, which acts as temporary network identifier for the system. This identifier is called the base station identifier, which is a n-bit identifier because the permanent network identifier is also the same number of bits. The base station identifier distinguishes packets of one base station from another during initialization. Since more than one network may be installed and initialized at the same time, the base station identifier may be useful to distinguish them. Alternatively, the device identifier (e.g., six bytes) of the base station may be included, but to do so may increase the number of bytes transmitted. In particular, with each packet transmission in the system the six-byte base station device identifier would need to be sent. But since it is a random choice, two installations may pick same base station identifier. To handle this, additional randomness is added by using cyclic reducing checking (CRC).

In step S403, the hub sends a "Start Discovery" message to the base station, which indicates the number of nodes that the installer is installing. (This number makes this step scalable to number of nodes being installed). If the operator cannot provide this number, then the maximum number of nodes the panel can handled is passed. In step S404, the base station runs a discovery process and discovers the nodes it can. During the discovery process, it sends the device identifier of the discovered nodes to the hub. Further details of the discovery process are described below. In step S405, on completion of the discovery process, the base station sends a completion message to the hub. In step S406, the installer now checks if all the nodes that were installed have been discovered or not. If all the nodes have been discovered, the installer moves onto the next step, i.e., node identifier distribution. If some of the nodes are installed but not discovered, the installer reruns the discovery process with a reduced number of nodes. In this regard, the hub should pass the number of nodes which are yet undiscovered to the base station.

Figure 5A:
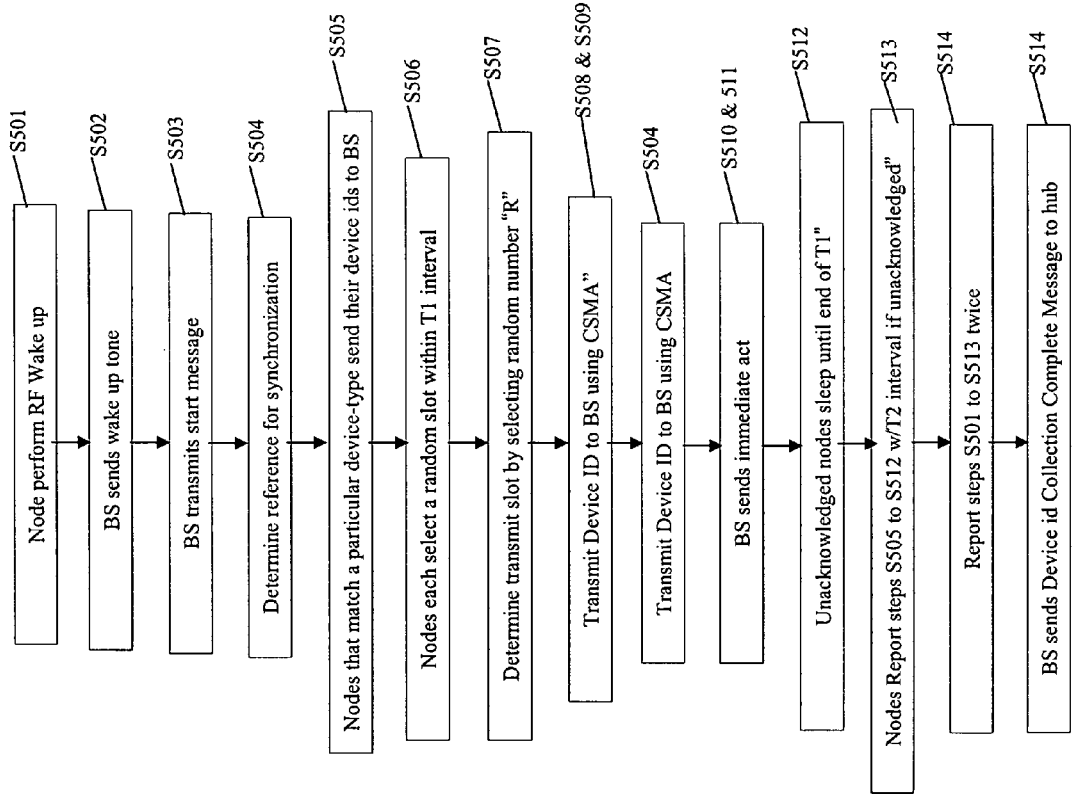
FIG. 5A shows an exemplary method to discover nodes in a wireless communication network system.
Figure 5B:
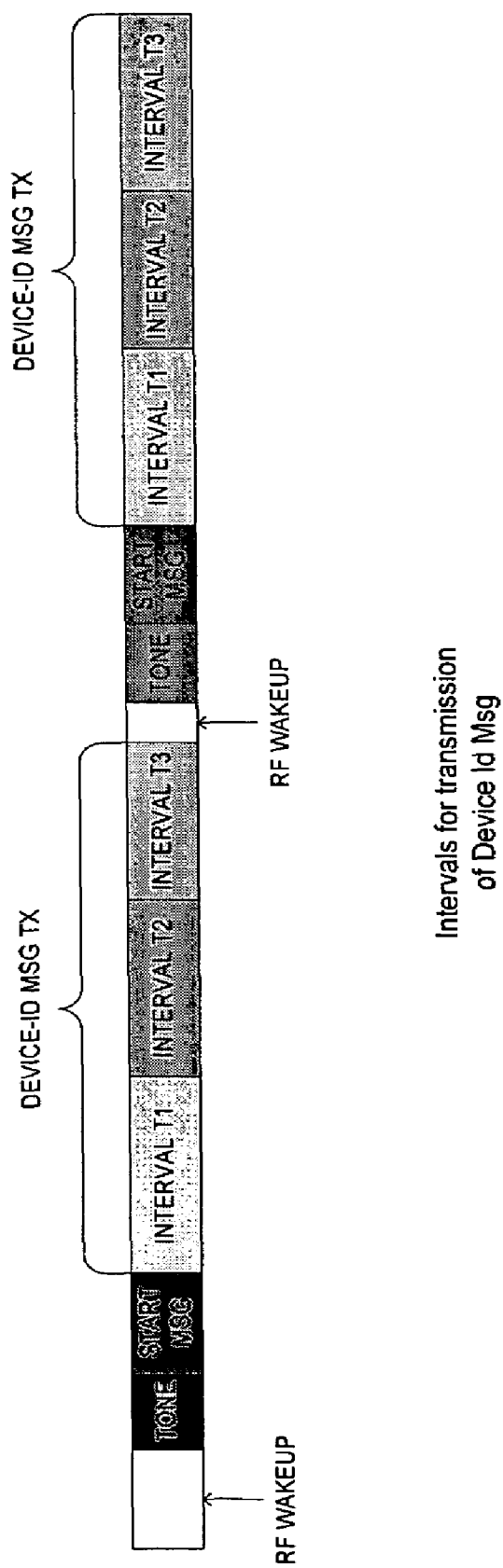
FIG. 5B shows exemplary time intervals for the transmission of a Device Identifier message, for use with the exemplary discovery method of FIG. 5A.

FIG. 5A shows an exemplary method to discover nodes in a wireless communication network system, and FIG. 5B shows exemplary time intervals for transmitting a Device Identifier message. In step S501, initially all nodes of the network perform RF wakeup with a RF wakeup interval of 200 milliseconds. The nodes are not yet synchronized to the network. In RF wakeup, nodes are in the sleep state and wake up periodically to sample the frequency. If a node senses a high signal, it continues to listen. The received bytes are checked for preamble bytes because wakeup tones include preamble bytes. If the bytes received are preamble bytes, the node waits for valid packets. If the node does not receive valid packets within a specified time period, or if the bytes received are not the preamble bytes, they go back to sleep. If the node does not sense a high signal when it wakes up and samples the frequency, it also goes back to sleep. The periodicity may be predefined and determined by the "RF wakeup interval". Initially, the RF wakeup interval is 200 milliseconds, that is, the nodes wakeup every 200 milliseconds to sample the frequency.

In step S502, the base station sends a wakeup tone for 210 milliseconds (a little more than the RF wakeup interval). In step S503, following the tone the base station transmits the "Start" message that includes the base station identifier, base station time (two bytes of hardware timer, so that the cyclic redundancy check cyclic redundancy check (CRC) is different even if the base station identifier matches), expected number of nodes in the network, device type to discover and cyclic redundancy check (CRC) for the packet. The device type is set to "0x00" if it is desired to discover all type of devices. In this regard, the expected number of nodes may be greater than the number given by the hub by a fixed number, to account for uninstalled nodes from adjacent installations. In step S504, the time at which the base station sends the start symbol of the start message and the time at which the node receives the start symbol of the "start" message is used as reference for synchronization of events between the base station and nodes. In step S505, the nodes, for which the device type matches the one the base station is trying to discover, send their device identifiers to the base station. Since multiple nodes may send device identifier packets, there may be a high chance of collisions.

In step S506, to minimize the number of collisions, each node selects a random slot within a specific interval "T1" to transmit the device identifier packet. The interval "T1" is divided into number of time slots based on the number of nodes. As described in step S503, the number of nodes in the network is based on the value received in the "start message". In step S507, the time slot to transmit is determined by selecting a random number "R" whose depends on "N", where "N" is the number of nodes in the network. In step S508, the node transmits the device identifier packet to the base station after performing a carrier sense multiple access (CSMA) protocol exchange. This packet also has one byte of cyclic redundancy check (CRC) of the time packet to ensure that any other base station that is also performing initialization does not mistake it to be a packet meant for it. Although the base station chooses a random base station identifier, this may also handle situations where the base stations from two adjacent installations chooses the same base station identifiers. The cyclic redundancy check ( CRC) for the two base stations should be different if number of nodes or the time at which they send start message is different. In step S509, if the carrier sense multiple access (CSMA) protocol exchange fails at the node, the node again chooses a random time slot in the interval T1 and sends a device identifier packet. In steps S510, the base station acknowledges the receipt of the device identifier packet. This is an "immediate-ack", that is, the base station sends the acknowledgement immediately without performing carrier sense multiple access (CSMA) protocol exchange. In step S511, the acknowledgement includes of a temporary slot identifier that is unique for every node. The slot identifier determines the time slot when the node and the base station should communicate hereafter until the node is assigned a permanent node identifier. In step S512, if the nodes do not receive an acknowledgement the node sleeps until the end of the time interval T1.

In step S513, after the end of T1, the nodes that did not receive an acknowledgement earlier wakeup and repeat steps S505 to S512 but with a new time interval "T2". The interval T2 is fixed to be smaller than T1 because only the subset of nodes that did not receive an acknowledgement should attempt to receive again. This process is again repeated for the nodes that did not receive an acknowledgement during their try in interval T2 by repeating steps S506 to S511 in interval "T3". In step 514, the entire cycle from step S501 is repeated (e.g., twice more) to ensure that the base station has discovered all nodes in its range. The sending of tone, start message etc. are repeated so that if a node did not detect the earlier tone it gets another opportunity. The time intervals T1, T2 and T3 for subsequent cycles should be smaller and based on number of nodes found in previous cycle. In step S515, after completion of initial discovery, the base station sends a "Device Id Collection Complete" message to the hub. During the device identifier collection phase, the base station passes each device identifier to the hub, which in turn passes it to the panel. The user verifies each device identifier and identifies those that belong to the network.

Node ID Distribution

During node identifier distribution, the base station provides a permanent node identifier to every node that belongs to the network. All nodes that do not belong to the network are sent a message indicating that they are not part of the network. Whether a node belongs to the network or not is determined by the installer at the panel or by the remote-programmer.

Figure 6:
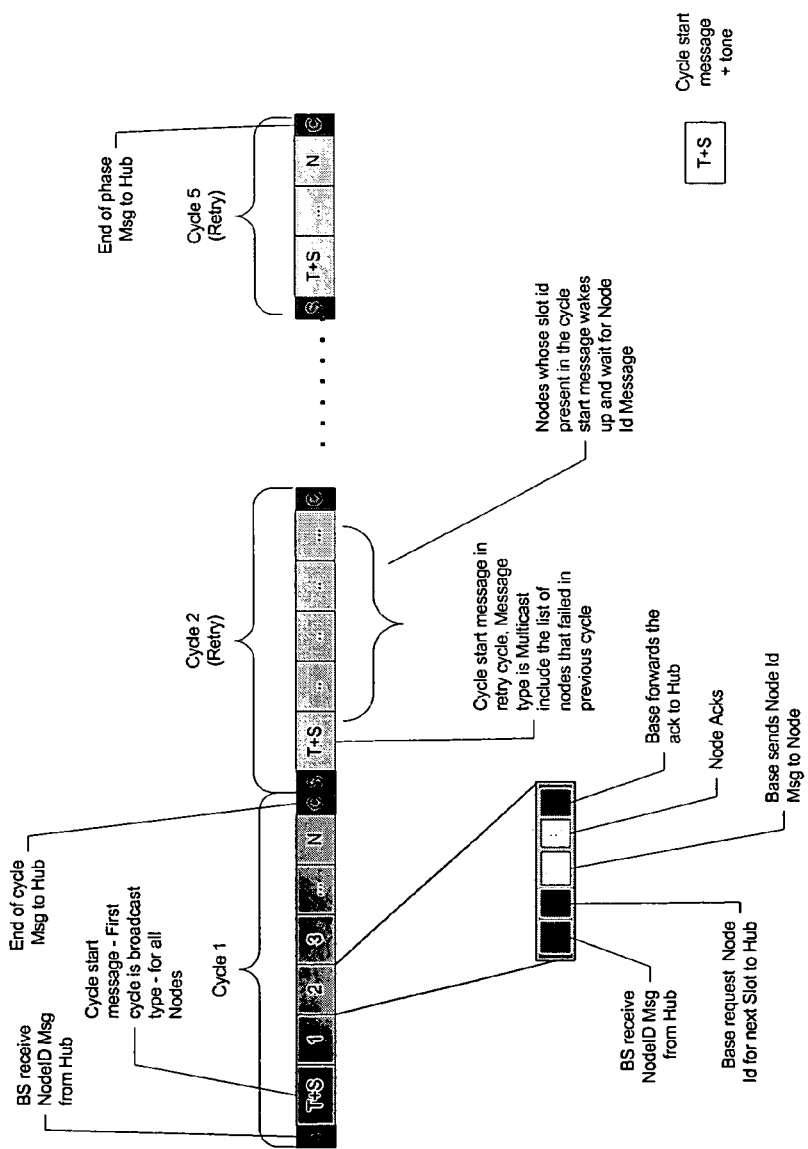
FIG. 6 shows an exemplary node identifier distribution time slot structure.

FIG. 6 shows an exemplary node identifier distribution time slot structure. The node identifier distribution starts with a "Start Node Id Distribution Message" from the hub. First, the base station sends the cycle start message to the nodes. Thereafter, the base station sends the node identifier to each node in predefined time slots based on a slot identifier that was assigned to the node during device identifier collection phase. The slot structure and message sequence in a time slot is shown in FIG. 6.

Figure 7:
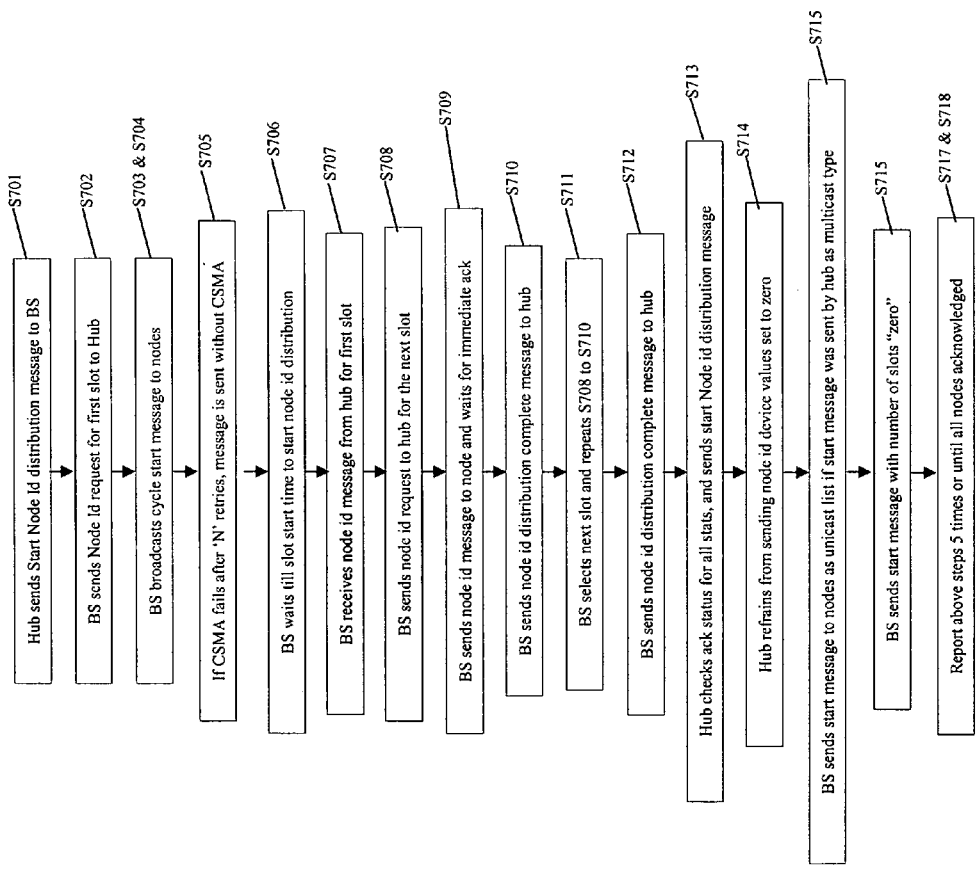
FIG. 7 shows an exemplary method for distributing node identifiers, which may be performed at the base station.

FIG. 7 shows an exemplary method for node identifier distribution, which may be performed as the base station. In step S701, the hub sends a "Start Node Id Distribution Message" to the base station. The message is of a 'Broadcast' type, directing that node identifier distribution be performed for all nodes. In step S702, the base station sends the node identifier request for the first time slot to the hub. In step S703, the base station broadcasts the cycle start message to the nodes. The cycle start message includes the message type (e.g., broadcast or multicast), cycle number, and the total number of time slots. In step S704, the cycle start message in the first cycle is always a broadcast type and it indicates that all nodes should wake up in their assigned time slot for a node identifier message from the base station. In step S705, the cycle start message is sent using a carrier sense multiple access (CSMA) protocol exchange. If the carrier sense multiple access (CSMA) protocol exchange fails for 'N' retries (in the same cycle), the base station sends the message without performing a carrier sense multiple access (CSMA) protocol exchange in the next attempt. In step S706, the base station waits until the slot start time to start node identifier distribution. In step S707, the base station receives the node identifier message from the hub for the first slot (note: request sent in step S702). The message includes the device identifier and node identifier for the selected time slot. If the time slot corresponds to an unapproved node the node identifier is set to zero in the message. If the time slot is invalid, the device identifier and node identifier is also set to zero in the message. It is expected that the node identifier message from the hub should be available at the base station at the beginning of the time slot. In step S708, the base station sends a node identifier request to the hub in the next time slot. In step S709, the base station sends the node identifier message to the node and waits for an immediate acknowledgement from the node. In step S710, when the base station receives the acknowledgement, it is forwarded it to the hub.

In step S711, the base station selects the next time slot and repeats the steps from S708 to S710 until it is finished with all of the time slots. In step S712, base station then sends a "Node Id Distribution Complete" message to the hub indicating that this is node identifier distribution "End of Cycle". In step S713, when the hub receives the completion message with "End of Cycle" flag, it checks the acknowledgement status for all slots and then sends the "Start Node Id Distribution" message to the base station with a message type based on the number of nodes that failed to provide an acknowledgement in previous cycle(s). In this regard, if the number of nodes that failed to provide an acknowledgement is less than 10, the hub sends a "unicast" list with the list of failed slot identifiers. Otherwise, if the number of nodes that failed to provide an acknowledgement is greater than 10, the hub sends the message type as "multicast". If all the nodes were successful, the hub sends the message type as unicast list with the number of slots failed 'zero'. In step S714, if the start message from the hub is a broadcast type, the base station repeats the same procedure as explained above for each time slot. But, in this instance, there may be many time slots that have already acknowledged successfully in previous cycle(s). For those time slots that were successful, the hub will not send node identifier and device identifier values set to zero in the message in response to the base station request and there will not be any node identifier distribution to nodes for these time slots. In step S715, if the start message from the hub is a multicast type, the base station sends the start message to nodes as unicast list type with the list of slot identifiers in the message. The base station repeats the node identifier distribution steps for the failed time slots. Here the communication slot for a failed node is the position of its slot identifier in the start message. In step S716, if the start message from the hub is unicast list with no slot identifiers, it indicates that all the nodes were successful in previous cycles. The base station sends the start message to the nodes as unicast list with number of slots 'zero'. In step S717, the base station repeats the above steps until all nodes acknowledged, or a total of five cycles for node identifier distribution. After that the base station sends a "Node ID Distribution Complete" message with end of phase flag, indicating end of the node identifier distribution phase. In step S718, the base station uses the carrier sense multiple access (CSMA) protocol for the node identifier message in the first three cycles and no carrier sense multiple access (CSMA) protocol is used in the last two cycles.

Figure 8:
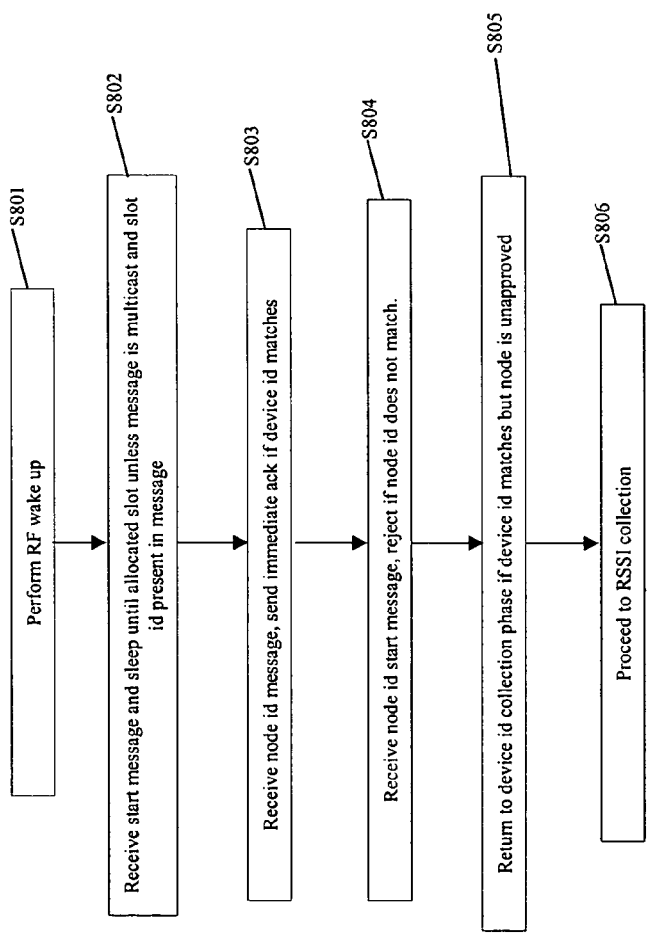
FIG. 8 shows an exemplary method for performing a node identifier distribution at the node.

FIG. 8 shows an exemplary method for node distribution which is performed at the node. In step S801, the nodes perform a RF wakeup and sample the channel every 200 milliseconds to detect a node identifier start message. In step S802, when the node receives the start message, if the message is broadcast type or multicast type with its slot identifier present in the message, the node sleeps until its assigned time slot and wakes up expecting a node identifier message from the base station. If the message type is multicast and the node's slot identifier is present in the message, the communication time slot for the node is the position of its slot identifier in the message. In step S803, when the node receives the node identifier message, it compares its device identifier with the device identifier received in the message. If they match, the node accepts the node identifier and sends an immediate acknowledgement to the base station. The node sleeps until the end of the current cycle and then performs a RF wakeup, waiting for a node identifier start message. In step S804, if the device identifier received in the node identifier message is different, the node rejects the message and no acknowledgment is sent to the base station. The node sleeps until the end of the current cycle and then performs an RF wakeup, waiting for a node identifier start message. In step S805, if the device identifier matches and the node identifier indicates that the node is unapproved, the node immediately returns back to the device identifier collection phase. In step S806, if the node receives a multicast start message and if the node's slot identifier is not present in the message, this indicates that the base station received the acknowledgement from this node in a previous cycle. The node then goes to the next phase, which is RSSI collection.

At the end of five cycles, all nodes that did not receive a node identifier message from the base station return back to RF wakeup and wait for a device identifier collection start message. These nodes will fail the subsequent steps of initialization and the hub will send a configure node by device identifier command after network identifier distribution.

Network ID and Frequency Selection

During network identifier and frequency selection, the nodes and the base station collect frequency quality(s) and network usage, including usage by other wireless sensor network installations. This information is used to select a frequency(s) and a unique network identifier, with respect to other wireless sensor network installations, that is most suitable for all the nodes in the network. The procedure may differ for US and Europe compliant systems since backup frequency allotment is different. To choose a suitable frequency, which is not used by adjacent wireless sensor network installations, the base station may need to know which frequencies and network identifiers are being used by adjacent installations.

Figure 9A:
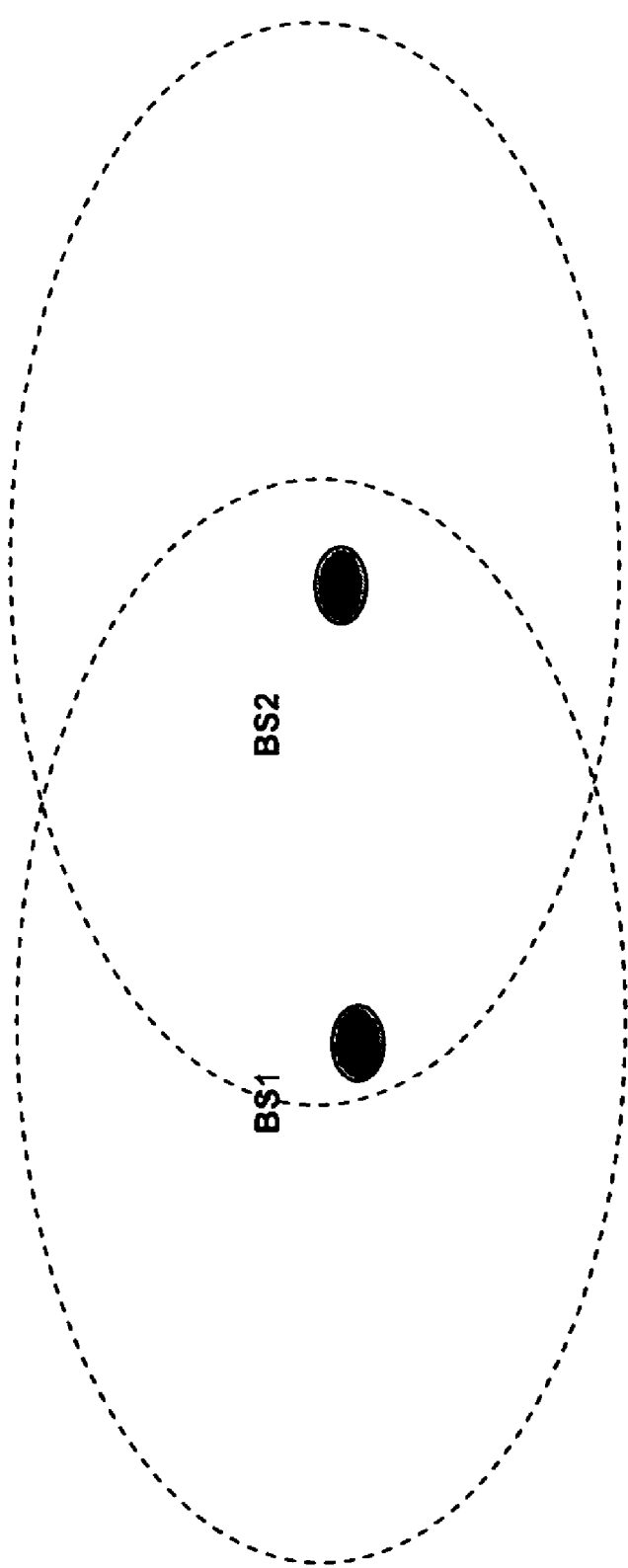
FIG. 9A shows an exemplary scenario in which a base station of an initializing network is within the radio range of the base station of an adjacent installation.
Figure 9B:
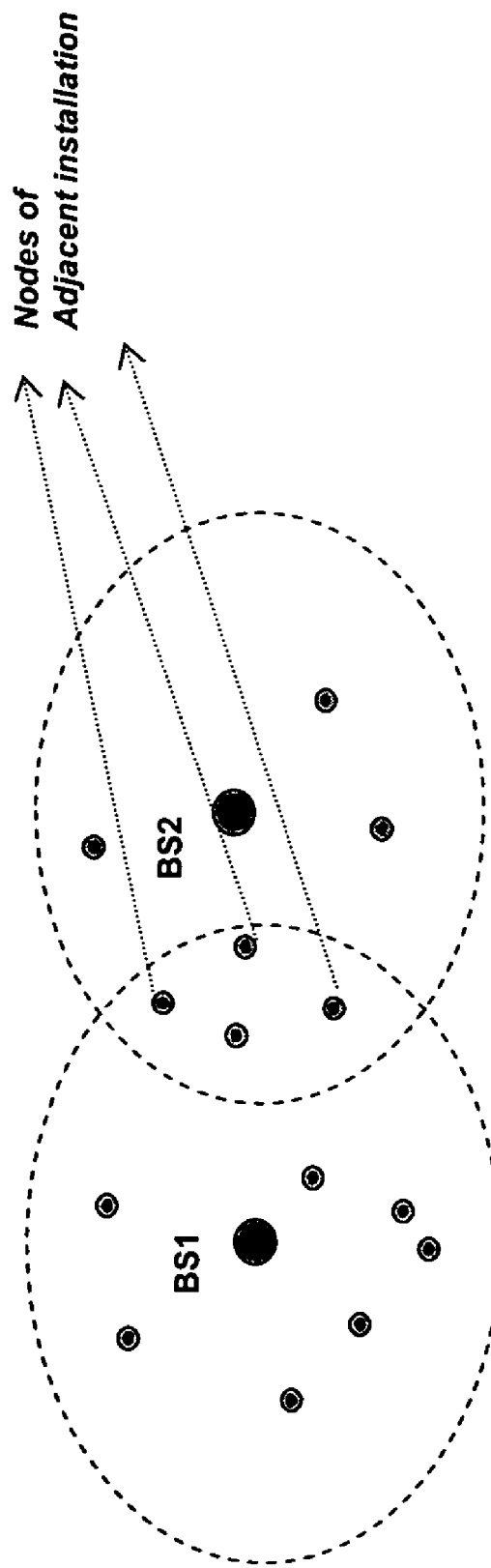
FIG. 9B shows an exemplary scenario in which the base station of the initializing network can hear certain nodes of the adjacent installation, but cannot hear the base station of the adjacent installation.
Figure 9C:
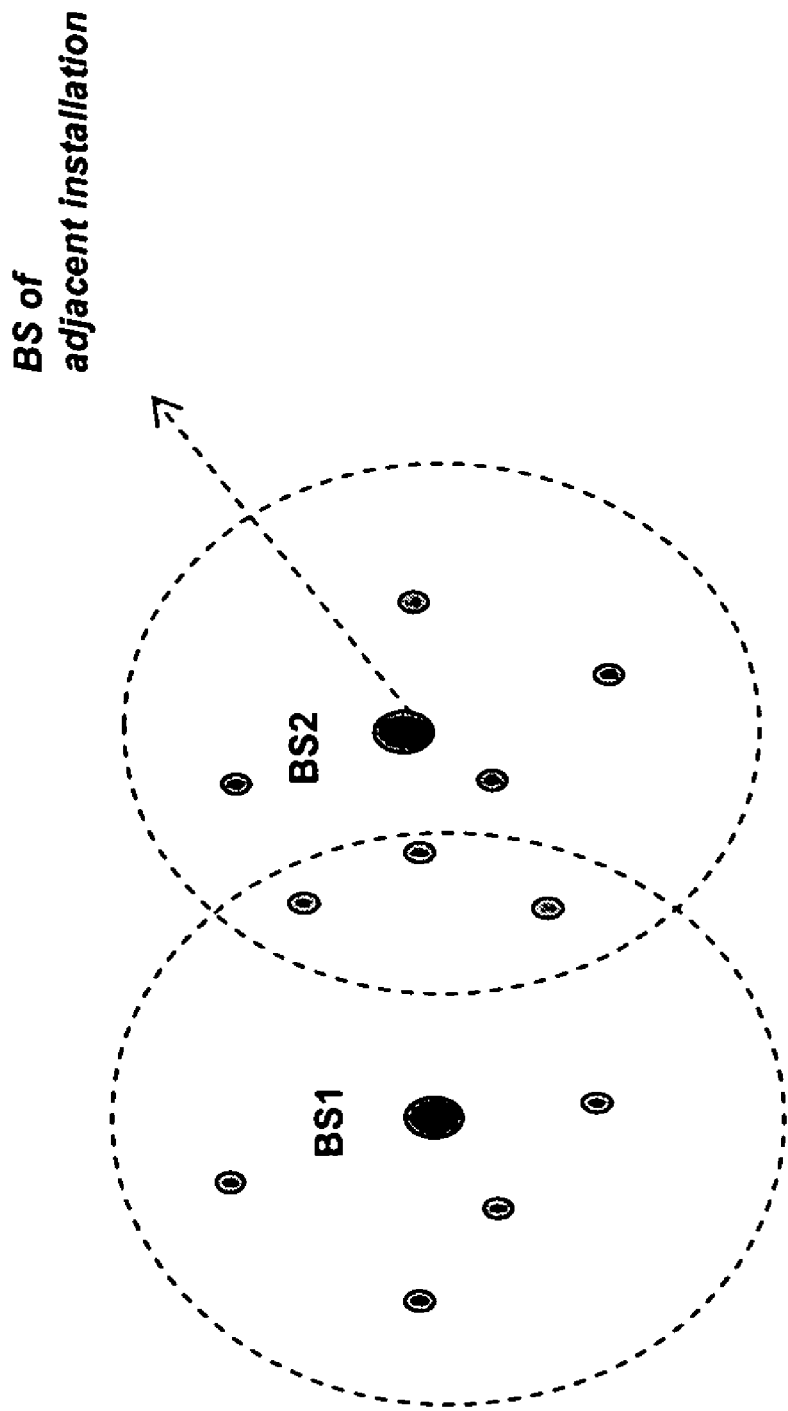
FIG. 9C shows an exemplary scenario in which the nodes of the initializing network can hear the base station of the adjacent installation.
Figure 9D:
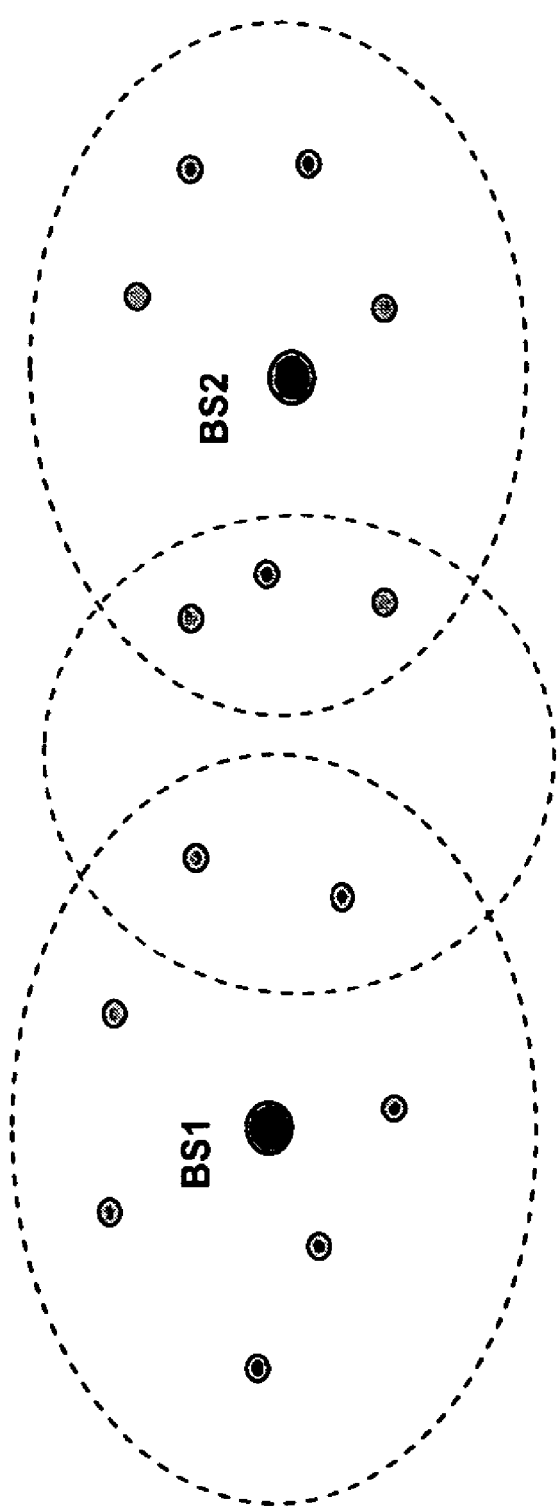
FIG. 9D shows that the nodes of the initializing network hear the nodes of adjacent installation but do not hear the base station of the adjacent installation.

FIGS. 9A to 9D show example scenarios for overlapping installations. In the Figures, BS1 is the base station of the network that is being initialized and BS2 is the base station of the adjacent network. More specifically, FIG. 9A shows the base station BS1 of the initializing network is within the radio range of the base station BS2 of the adjacent installation. FIG. 9B shows that the base station BS1 of the initializing network can hear certain nodes of the adjacent installation, but cannot hear the base station BS2 of the adjacent installation. FIG. 9C shows that the nodes of the initializing network can hear the base station BS2 of the adjacent installation. FIG. 9D shows that the nodes of the initializing network hear the nodes of adjacent installation but do not hear the base station BS2 of the adjacent installation. (In this instance, adjacent installations with only nodes hearing one another may not adversely impact the working of the two networks as they may transmit very infrequently and node packets may be distinguished from base station packets).

Figure 10:
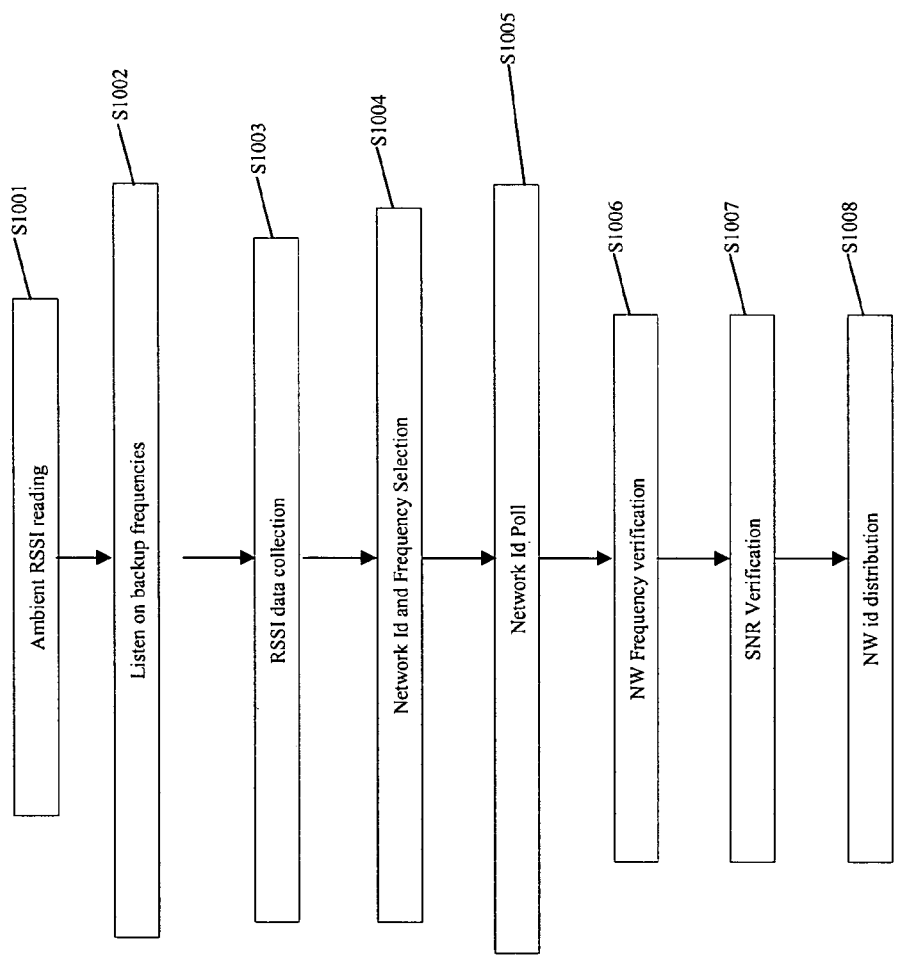
FIG. 10 shows an exemplary method for selecting and verifying the network identifier and frequencies of an initializing network, under the exemplary scenarios shown in FIGS. 9A through 9D.

To handle the aforementioned scenarios and learn the network identifier and frequencies, the following steps may be performed as shown in FIG. 10.

In step S1001, an ambient Received Signal Strength Indication (RSSI) reading is performed. In step S1002, listening on backup frequencies is performed (e.g., in Europe only). In step S1003, RSSI data collection is performed. In step S1004, network identifier and frequency selection is performed. In step S1005, network identifier poll is performed. In step S1006, network frequency verification is performed (e.g., in US only). In step S1007, signal to noise (SNR) verification is performed. In step S1008, network identifier distribution is performed. Details of these steps are provided below.

Ambient RSSI Reading

During ambient RSSI reading, the base station and the nodes sample all available frequencies to collect the average noise level in each frequency. Noise level is measured in terms of Received Signal Strength Indication (RSSI) when there is no packet transmission from wireless sensor network systems. A lower noise level (lower RSSI) implies a better channel.

Figure 11:
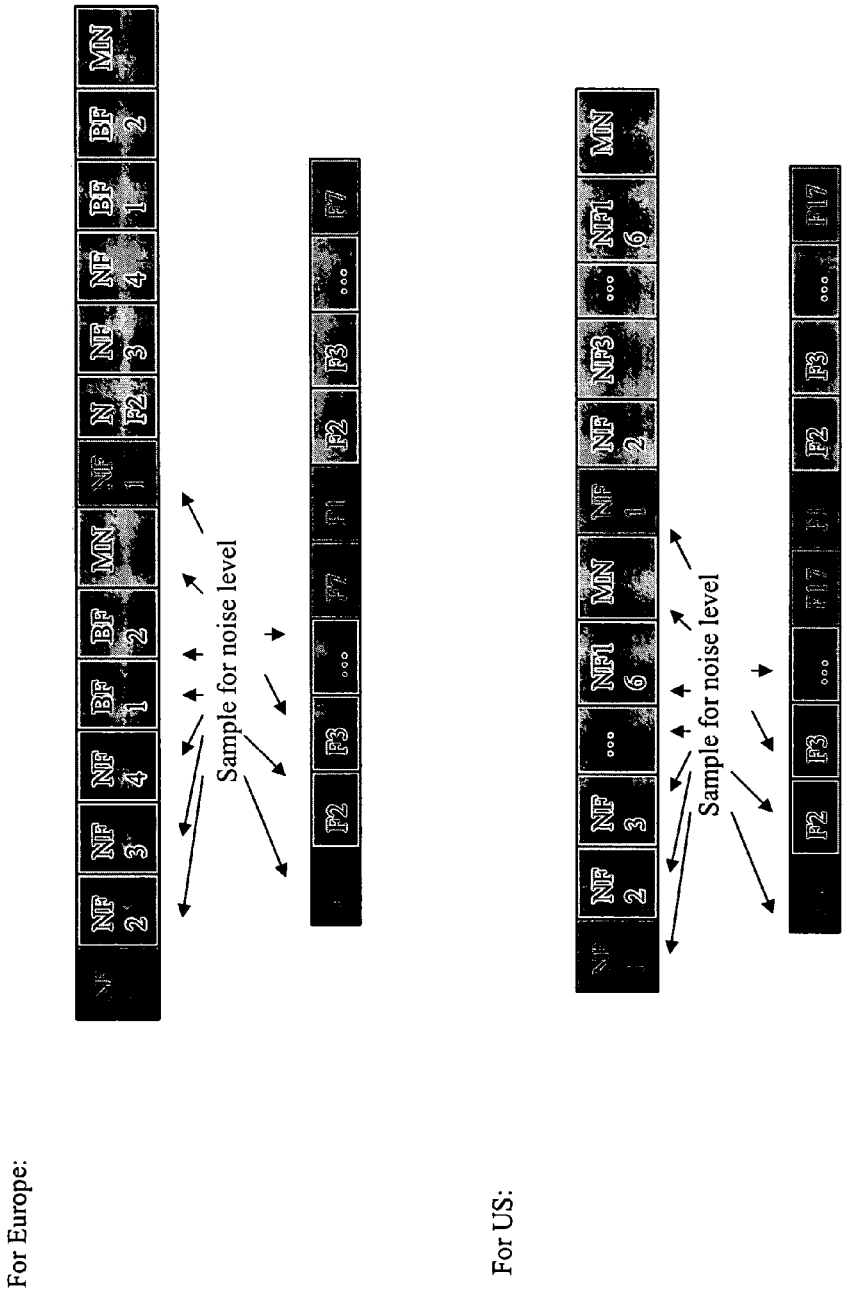
FIG. 11 shows an exemplary method to perform ambient Received Signal Strength Indication (RSSI) reading.

FIG. 11 shows an exemplary method to perform ambient Received Signal Strength Indication (RSSI) reading. The nodes and base station sample each of the frequencies (e.g., around 100 samples/frequency) to collect the noise levels. When a sample is taken, it is taken on all the frequencies before taking the next sample. The nodes sample all the frequencies except the default frequency. The mobile network frequency is also sampled by nodes so that the user has a understanding of how the channel is around the network. So that if there are problems with mobile network, it may use this information. For example, there may be seven frequencies per channel in Europe and seventeen frequencies per channel in United States. The base station samples default frequency also (eight frequencies in Europe and eighteen frequencies in the United States). The nodes sample these frequencies immediately after completing node identifier distribution. Nodes do not sample on the default frequency since the base station may send packet on the default frequency during this time. The base station starts sampling when it receives the "Start Network Id Selection" command from the hub. The data collected by the node may be sent to the base station at a later time, such as, for example, during RSSI data collection from the nodes.

Listening on Backup Frequency (for EU only)

In Europe in addition to collecting a noise level, the base station and the nodes also collect the network identifiers of all parallel wireless sensor network installations within hearing range so that the network which is being installed may choose a locally unique network identifier. The network elements, including both the nodes and the base station, listen to the backup frequencies for two minutes each since each wireless sensor network installation transmits a time beacon in the backup frequencies, which contains the network identifier. The network can hear all the nodes that have a scenario similar to what is shown in FIG. 9A, in which the base station BS1 of the initializing network is within the radio range of the base station BS2 of an adjacent installation, and the scenario shown in FIG. 9C, in which the nodes of the initializing network hear the base station BS2 of adjacent installation. The scenario shown in FIG. 9B, in which the base station BS1 of the initializing network hears only the nodes of adjacent installations, is not handled by listening on backup frequency. Instead, this scenario is taken care by during a network identifier poll. The collected information may be sent to the base station in subsequent steps.

In the United States, since we do not have a certain set of frequencies assigned for backup, and since the number of backup frequencies to sniff (e.g., 16) is high, it may not be useful to listen for a network identifier at this stage. Instead it may be performed in the verification of the network frequency phase.

RSSI Data Collection from Nodes

During RSSI data collection, the base station receives the ambient RSSI data collected by the nodes. For Europe, this message also includes the data collected during listening on the backup frequency, which includes of the backup frequency count (i.e., the number networks using this frequency as backup) and the network identifiers observed. In addition, the base station and nodes measure the RSSI during this message exchange (which is at the default frequency) both at the node and the base station.

Figure 12:
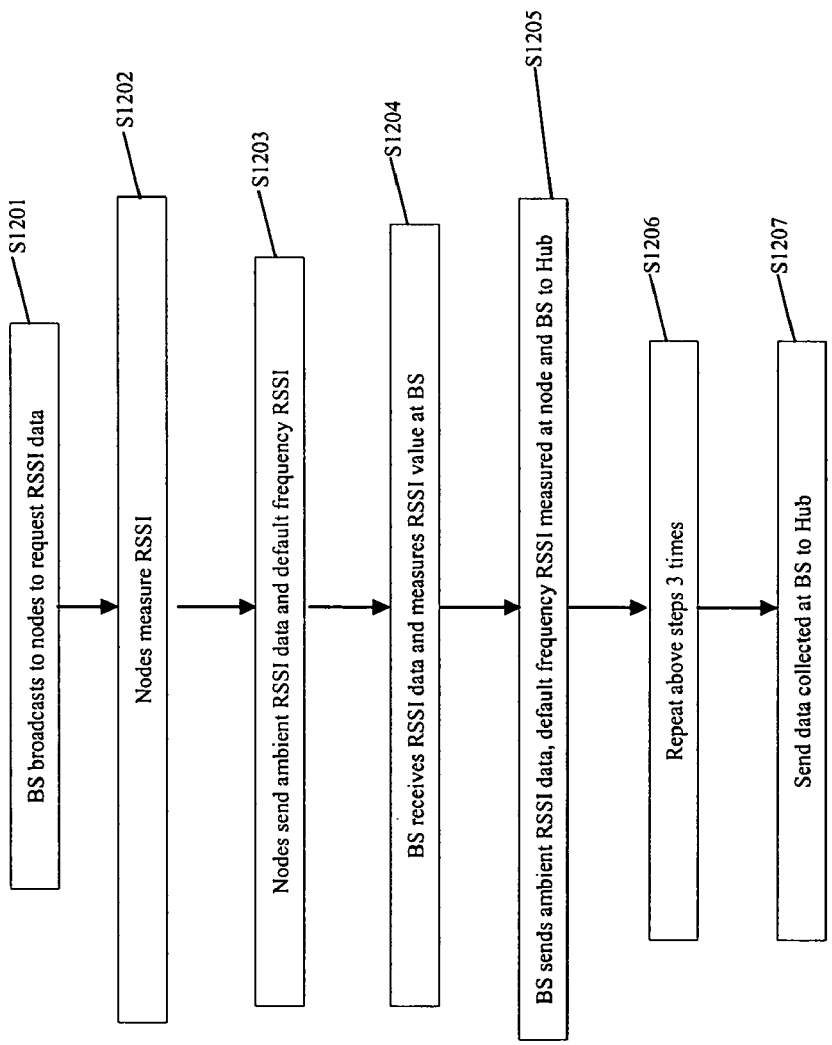
FIG. 12 shows an exemplary method to perform RSSI data collection.

FIG. 12 shows an exemplary method to perform RSSI data collection. In step S1201, the base station broadcasts a message to the nodes to request the RSSI data. In step S1202, all the nodes measure the RSSI value with which the broadcasted message is received at the node. In step S1203, the nodes send the ambient RSSI data and the default frequency RSSI measured in step S1302 above, in its assigned time slot. For Europe, the data sent includes the data collected during backup frequency listening. In step S1204, when the base station receives the RSSI data from a node, it measures the RSSI value with which this message is received at the base station. In step S1205, the base station sends all these data (e.g., the ambient RSSI data, default frequency RSSI measured at the node and base station) for each node to the hub. In step S1205, the above steps are repeated three times in case there are failures. In step S1206, at the end of this phase, the base station sends data collected at the base station to the hub.

NW ID and Frequency Selection

The hub selects frequencies for network operation and backup (e.g., backup frequencies may be used only for retries) based on the frequency quality, the signal to noise ration (SNR) and the network usage. In particular, the hub chooses a frequency from a set of frequencies that has an ambient RSSI value below a certain threshold. Additional rules may include, for example:

Rule 1: Minimum number of networks should use the selected frequency.

Rule 2: If the network usage is same for more than one frequency, then the frequency that has the less number of networks using it as a backup frequency is chosen. This rule may only be applied, for example, in U.S. compliant systems.

Rule 3: If the parameters for selection are the same (in case of Europe parameter 1), then the frequency with smaller RSSI value is chosen.

Rule 4: if the number of frequencies for which RSSI below threshold is zero, then all the frequencies are inoperable. The frequency is still chosen based on the three rules above, but the chosen frequency may not lead to an efficient network operation.

Once the network frequency is chosen, the base station chooses the backup frequency. For US compliant systems, three backup frequencies are chosen from the list of sixteen frequencies using the same criteria as for network frequency selection. The network frequency and three backup frequencies should be distinct. For Europe compliant systems, one backup frequency is chosen out of two backup frequencies based on (i) the number of networks using a frequency as a backup frequency, and (ii) the RSSI value.

After network frequency and backup frequency selection, the hub selects a network identifier based on the selected frequency and unused network identifier in that frequency. The system may support, for example, network identifiers in the range 1-127 and the corresponding network frequency may be found by (NW-ID % 16) for US and (NW-ID % 4) for Europe. The network identifier is selected randomly from the unused network identifiers in the selected frequency.

Network ID Poll by BS

The network identifier is polled by the base station of the initialize network, whereby the base station hears the nodes of the adjacent installation but does not hear the base station of the adjacent network. In this instance, listening on a backup frequency or a selected network frequency may not help in obtaining information about the adjacent network since the base station is not in the listening range of the adjacent base station and therefore will not receive the time beacon transmissions from the adjacent base station. So, the procedure followed here is to send a poll packet to the nodes of the adjacent installation and get the details.

Figure 13:
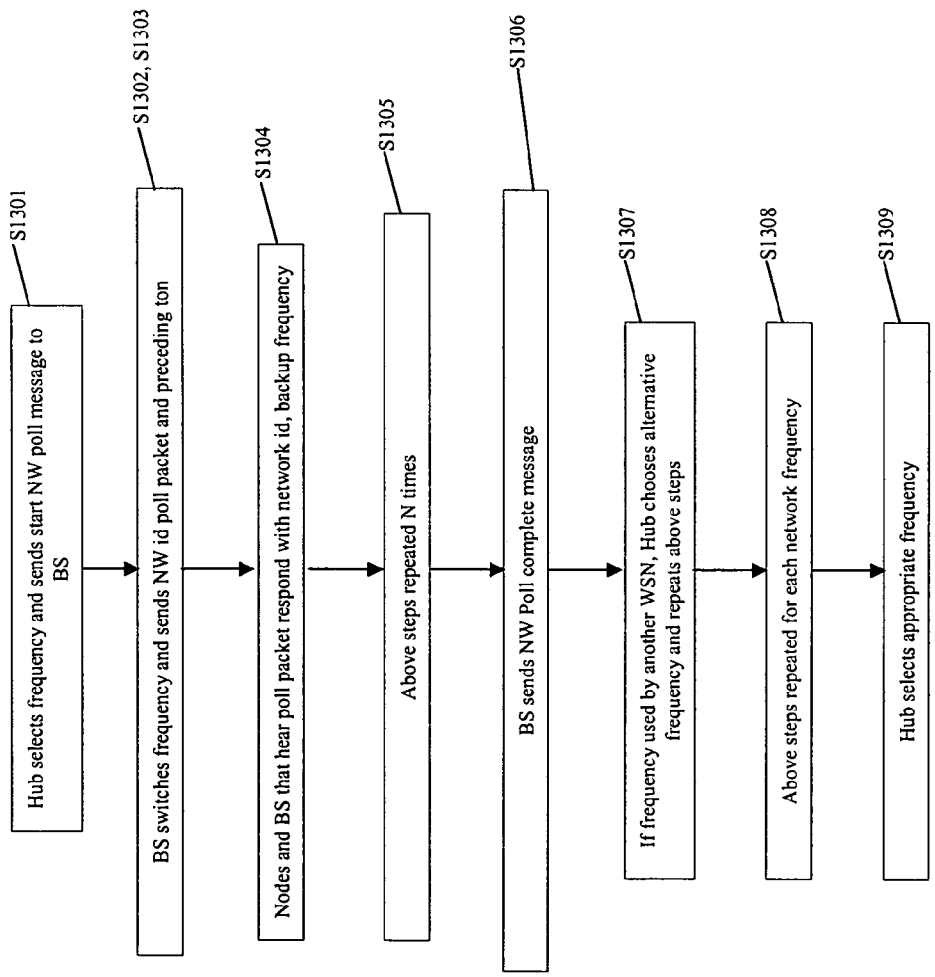
FIG. 13 shows an exemplary method to perform network identifier and frequency selection using a network poll approach.

FIG. 13 shows an exemplary method to perform network identifier and frequency selection using a network poll approach. In step S1301, based on the data collected in the previous phases, the hub selects a frequency that is suitable for network operation and sends a "Start NW Poll" message with the chosen frequency to the base station. In step S1302, on receiving this message, the base station switches to the frequency received from the hub and sends out a network identifier poll packet. In step S1303, the base station precedes this poll packet with a tone of one second duration to wakeup all the nodes of the adjacent installation using the same network frequency. A tone of one second duration is sent because the nodes of the operational network perform a RF wakeup once every one second. In step S1304, all the nodes of adjacent installation, including the base station of the adjacent installation that can hear this poll packet respond with their network identifier and backup frequency used, at their convenience in default frequency (within a fixed period). The base station forwards this information to the hub. In step S1305, the base station repeats the above procedure a predefined number of times "N", spaced by a predefined time, allowing enough time to receive responses. This is performed to ensure that the responses are not lost due to collision or losses in the frequency.

In step S1306, at the end, the base station sends a "NW Poll Complete" message to the hub. In step S1307, if the hub discovers that this particular frequency is being used by another wireless sensor network installation for network operation, it may choose another network frequency and send the network poll again to the base station to repeat the above steps in the newly selected frequency. Since it is assumed to have a maximum of only three wireless sensor network installations in the hearing range of any installation it should be feasible to allot a unique frequency for network operation (both in US and Europe). However, if more than four installations are provided at the same location or the noise level in some frequencies is not suitable for network operation, the same frequency may have to be assigned to more than one installations. In such a scenario, a different network identifier may be assigned to distinguish packets. Having more than one installation operating in the same network frequency may not efficient. In step S1308, these steps may be repeated for each number of network frequency in the system, which should be a total of four frequencies for Europe and a total of sixteen frequencies for US. In step S1309, based on the result of the network identifier poll and the data collected in previous phases, the hub selects a frequency, which is unique with respect to adjacent installations.

The transmission of poll packets may pose a potential security risk since these packets may not have a mechanism to prevent replay attacks. To reduce the affect of this attack, any node or base station responds to only 3*N network identifier poll packets in only one supervision period.

Network ID Poll by Node

To handle network identifier poll at the nodes, if a new network is initialized when there is an adjacent network and only the nodes of the adjacent installation are in the hearing range of the new base station BS1 as shown in FIG. 9B, then the base station BS1 of the initializing network should listen for at least as long as the supervision interval of the adjacent installation to better guarantee that it can hear the supervision acknowledgement of at least one node. Since the base station BS1 of the initializing network does not know the supervision interval of the adjacent system it should listen for the maximum possible supervision interval, which may be, for example, twenty four hours.

This implies the initialization of the network may take longer than twenty four hours, which may not be acceptable. To reduce the time needed for initialization, the base station BS1 of the initializing network sends a poll requesting information such as network identifier used etc. from the nodes of the adjacent network. To handle this feature the nodes of the adjacent installation should be able to respond to polls sent asynchronously and also handle high priority network operations.

Handling NW ID Poll at the Nodes

To handle the network identifier poll, the nodes are in the receive mode for the following activities. At all other times their transceiver is switched off to save power. In a first activity, the nodes wakeup periodically once every wakeup interval to check for any back channel (BC) commands from the base station. If the channel is free they go back to sleep immediately. In a second activity, the nodes wakeup in their supervision slot (if status not already given) and wait for their poll to send the status. If the channel is free they go back to sleep immediately except in the final retry slot (e.g., seventh slot). In a third activity, the nodes wakeup every two minutes to receive a time beacon to adjust their clocks and frequency. If the channel is free they go back to sleep immediately. In a fourth activity, if the nodes have an alarm to send, then in the alarm slot (in retries) it samples for a free channel before transmitting.

The nodes may receive the network identifier poll from the adjacent installation when listening for any of the above packets. The base station BS1 of the new installation transmits a tone long enough to cover the entire wakeup interval to guarantee that the nodes of the adjacent system will hear it at least when they expect to receive the back channel (BC) commands since nodes may not have their supervision slot or it is not time for time beacon etc. Since the nodes are guaranteed to receive the tone in the back channel slot, they ignore the tone if received in any other slot. The network identifier poll is handled only in the back channel slot.

To process the network identifier received at the nodes the nodes wakeup in the back channel time slot to sense for a high signal in the channel. A node expects a network identifier poll if all the following conditions are true: (a) if a high signal received, (b) a back channel packet is not received within the back channel start sequence timeout, and (c) less than nine network identifier polls were received in the current supervision interval (this reduces the effect of replay attack. Hence, an intruder cannot replay a network identifier poll to drain the batteries of the nodes). The nodes continues to receive with a "Network ID Poll Start Sequence Timeout" for the network identifier poll. In the meantime, other network operations may be handled. For example, if it is time for the nodes supervision slot (e.g., other than seventh slot), and the node was not successful in transmitting the supervision acknowledgement in the earlier six slots, it ignores the network identifier poll packet and does not send a response. If the node senses an alarm and it is time for the alarm slot, the network identifier poll is ignored and the node tries to transmit the alarm in network frequency (e.g., the base station may not hear the network identifier poll). If an acknowledgement is not received, it is transmitted in the backup frequency. If a time beacon is received when the node is waiting for the network identifier poll (started at back channel slot), both the packets (time beacon and network identifier poll) may be dropped. If it is time for the third time beacon and the node did not receive the other two time beacon, stop stack, go and receive the third time beacon in the backup frequency. If the network identifier poll is received within the timeout, the node picks a random number (range R), and transmits "NW ID Response" (after CSMA) in one of the back channel time slots (if back channel is not received in that time slot) in the network frequency (since it will not be used for any other communication. The default frequency may potentially wipe out async alarms). For example, if the node picks random number 5 and the back channel time slots are subdivided (big enough to fit a response packet+skew extra), then it would transmit a response packet. A minimum of ten slots and maximum of slots may be reached that fit in three back channel time slots. (This may depend on the number of nodes that can hear the adjacent system and the base station needs to hear from only 1 of them).

The response packet includes the network identifier and backup frequencies. The node does not expect an acknowledgement for the response packet. The node does not retry if it has a problem sending the packet (e.g., back channel time slot missed, CSMA failed, etc).

Figure 15:
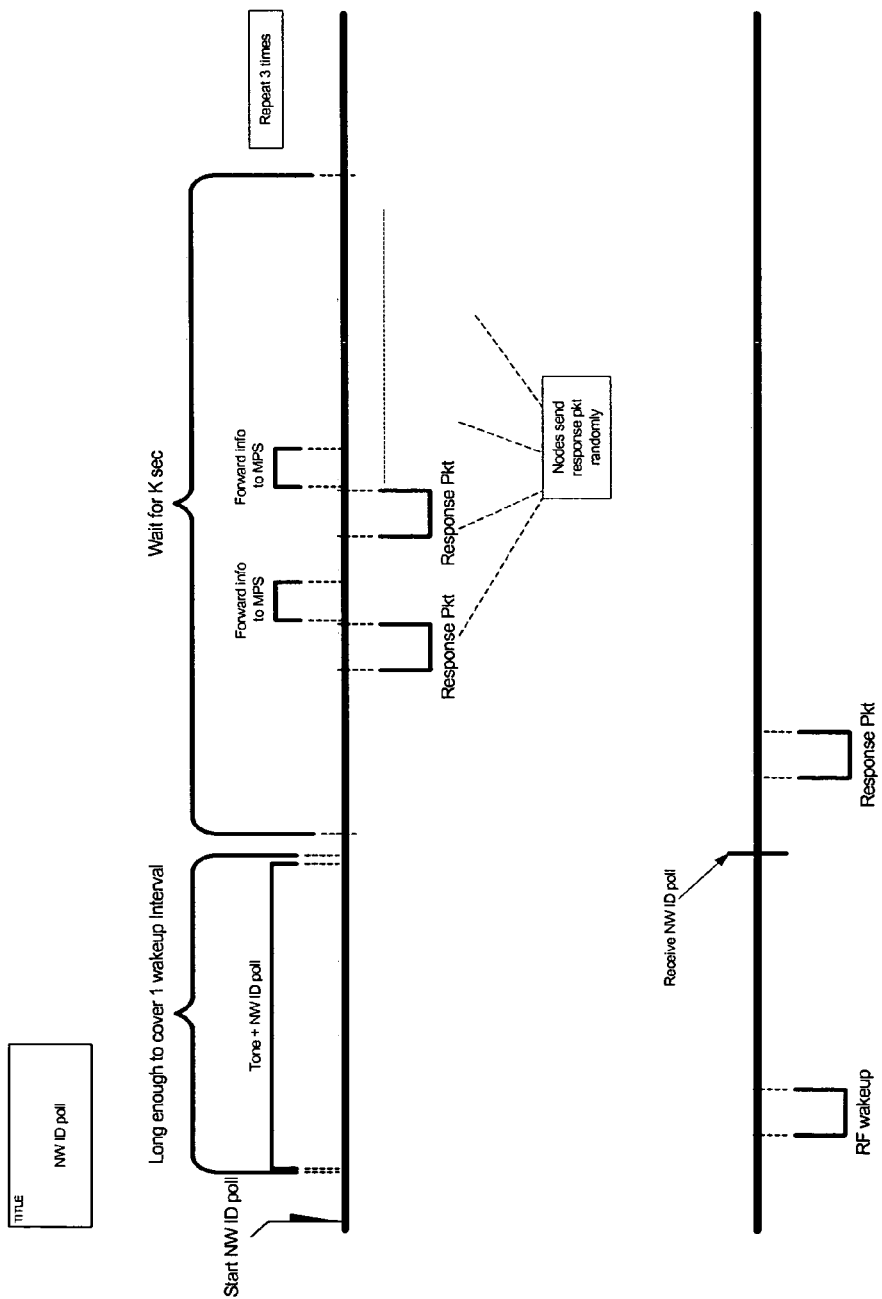
FIG. 15 shows a time line for an exemplary network identifier poll sequence.

FIG. 14 shows an exemplary time slot allocation for consecutive wakeup intervals, and FIG. 15 shows a time line for an exemplary network identifier poll sequence.

NW Frequency Verification (Listen on NW Frequency (for US only)

Network frequency verification ensures (for US compliant systems) that the selected frequency is unique with respect to scenario described in FIGS. 9A and 9C (base station of initializing network is in listening range of adjacent base station, and nodes hear the base station of adjacent installation) for the United States. The nodes and base station of the initializing network listen on the selected frequency for two minutes to receive any transmissions from adjacent networks. The base station of the initializing network starts this phase when it receives the "Start NW-ID Verification" with the frequency to be verified. The base station broadcasts a "Verify NW Id" message to the nodes with frequency number received from the hub. The base station and nodes switch to the new frequency and listen for any message transmissions (e.g., time beacons, supervisions, etc.) from adjacent networks, for two minutes. After this receive time, the base station requests the nodes to send back the information collected by the nodes. The base station forwards this information to the hub. The base station sends a "NW-ID Verification Complete" message to the hub. If the base station receives information from any of the nodes stating the frequency is used by an adjacent system then the network repeats the whole procedure of network ID and frequency selection.

SNR Verification

In SNR Verification, the system verifies the signal to noise ration (SNR) of the selected frequency with all the nodes. The base station starts the SNR verification when it receives the "Start SNR Verification" message with the selected frequency number from the hub. The base station broadcasts the SNR verification message with the frequency number to the nodes. After a predetermined time, the nodes and the base station switch to the given frequency. The base station sends a "Request SNR" message to the nodes and the nodes measure the RSSI for the received signal from the base station. The nodes send back the measured signal RSSI value to the base station in their assigned time slot and the base station measures the received signal RSSI for this message from the node. The base station sends the RSSI value collected by the node and the base station to the hub for each node. At the end of this phase, the base station sends a "SNR Verification Complete" Message to the hub. The hub verifies the SNR based on the signal RSSI collected in this phase and the ambient RSSI for the selected frequency that was collected in RSSI collection phase. Based on this the hub decodes whether to continue with network identifier and configuration distribution or to repeat the network frequency selection to select another frequency.

NW ID Distribution

After the system has selected the network parameters, such as the network frequency, network identifier and back up frequencies, the system distributes the selected network parameters to the nodes. In particular, the base station broadcasts the network identifier distribution message containing all the configuration information needed for network operation. In particular, the nodes acknowledge one after the other in the order of their assigned node identifier. Once a particular time has elapsed to account for the time slots for all the nodes, the base station checks if all the nodes have acknowledged the reception of the information. The base station repeat the steps for a predefined number of times to distribute the data to all the nodes. At the end of this phase, the base stations sends the "NW ID Distribution Complete" message to the hub, with the list of node identifiers that failed to receive network identifier. The base station and nodes switch to network frequency and network operation after a fixed time from the end of network identifier distribution. For the failed nodes, the hub takes recovery actions. The hub first sends a query command to the failed node in the network frequency. If the node does not respond, the hub sends a "Configure Node by Device Id" message to the node in the default frequency. The node configures and switches to network frequency and network operation on reception of this message.

Abort Initialization

To abort an ongoing initialization process and to bring back the base station and nodes to the start of Initialization, the MPS sends a command to the BSTM.

Base Station

The abort command is an asynchronous command from the MPS. When the base station receives this command, it sends an abort command to the nodes. Though the abort command is asynchronous from the hub, the base station completes the current cycle of operation and the abort command is sent in the next cycle start instant. This is to make sure that all the nodes are in a state to receive this message. The base station does not expect an acknowledgement for the abort command. The command is sent several times to reduce the probability of a message loss by the node. The abort command is sent only in the default frequency. If the abort command is received by the base station during network poll, frequency listen, RSSI reading etc, in which the nodes are in a different frequency, the base station waits until the end of that phase before sending the abort command, so that all the nodes come back to default frequency. Accordingly, there could be a maximum delay of four minutes in case of Europe (the back up frequency listen for EU takes four minutes) and two minutes in case of the US (network identifier verification takes 2 minutes).

At the Node

In every phase of initialization, when waiting for cycle start message, the nodes may receive either the cycle start message or the abort command. The nodes may not sleep for more than one cycle duration in the initialization phase. For example, the nodes may wake up at the end of the cycle and wait for a cycle start message. When the node receives the abort command, it verifies the network identifier (e.g., base station identifier) and if it matches, aborts initialization and goes to a default state (e.g., rests itself).

Broadcast/Multicast Messaging in Initialization

Broadcast/Multicast messaging may be used in initialization. In particular, the base station and nodes use the this messaging mechanism when the base station wants to send a common message to all nodes and then receive a response from the nodes. In this regard, the base station broadcasts the start message to all nodes. In the first cycle, the message type is set to "Broadcast", indicating that all nodes in the network should acknowledge. The nodes, on receiving this message, send back a response in their assigned time slot based on their node identifier. In the next cycle, while sending the start message, the base station checks the acknowledgement status of the node. If the number of nodes unacknowledged in the last cycle(s) is less than 'n' (this number is based on number of nodes that can be accommodated in the packet given a Maximum length), it sets the start message type as 'Multicast' and the message includes the list of nodes that failed to acknowledge in previous cycle(s). Only those nodes whose node identifier is present in the start message will send a response to the base station in the Multicast cycle. When receiving a multicast message, if the node's assigned node identifier is not present in the message, it assumes that the base station received the response in the previous cycle. If the number of nodes that failed to acknowledge in previous cycle is greater that 'n', then the base station sends the broadcast message again to the nodes. All nodes respond but the base station ignores a reply from nodes that have already replied successfully in previous cycle.

Overview of Time Slotting Mechanism

After initialization is completed, the system may handle alarms from sensor nodes/mobile nodes and user commands may also be sent to the sensor nodes. The alarms are sent to the hub within a specified maximum latency. The back channels may also be distributed to the nodes within a supervision desired maximum latency duration. The nodes are supervised periodically (e.g., once in a supervision interval). The nodes sleep most of the time and wakeup periodically (e.g., once every wakeup interval) to check if the base station has any back channel packets for the nodes. All the activities are performed in a time slotted manner in order to be energy efficient. To perform the aforementioned functions, the wakeup interval includes assigned time slots for: (1) alarms, (2) back channels, (3) mobile nodes, and (4) supervisions.

Figure 16A:
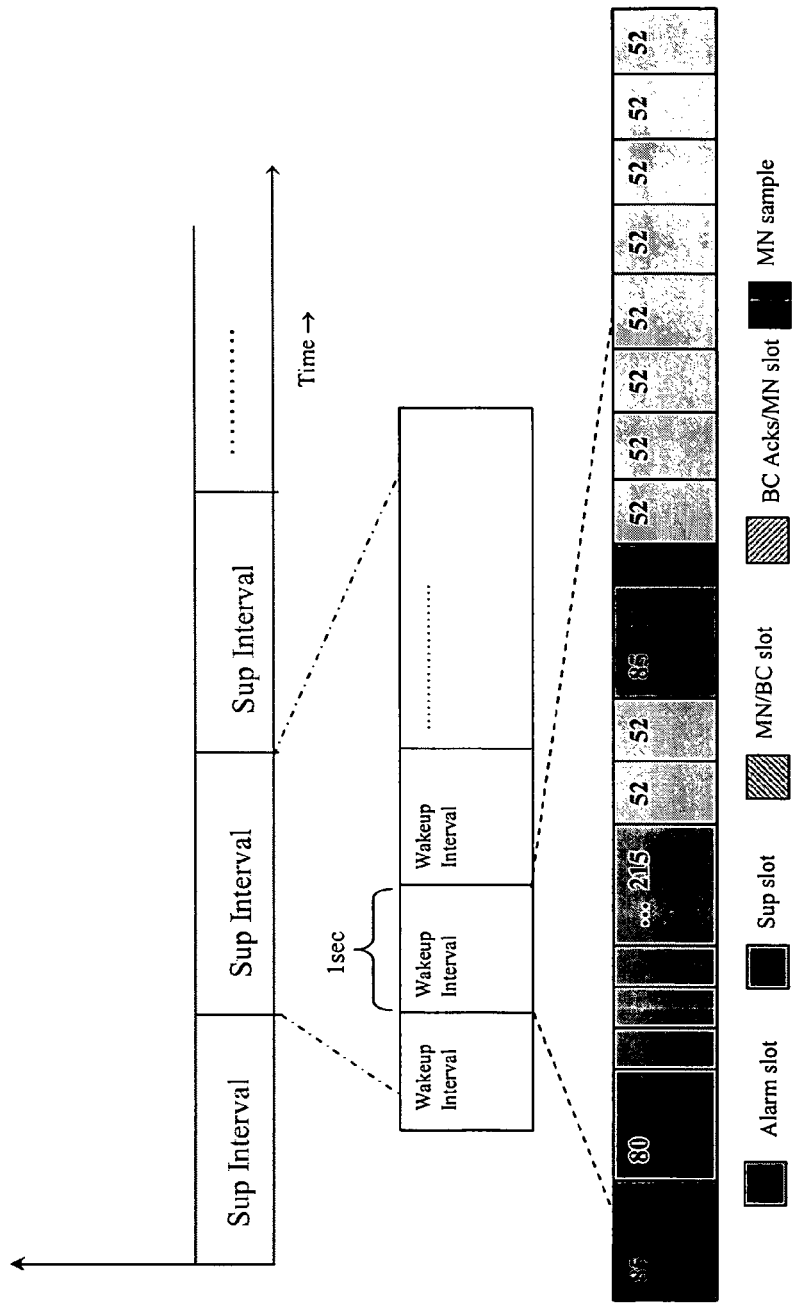
FIG. 16A shows an exemplary time slot structure for a protocol designed to meet US regulatory requirements.
Figure 16B:
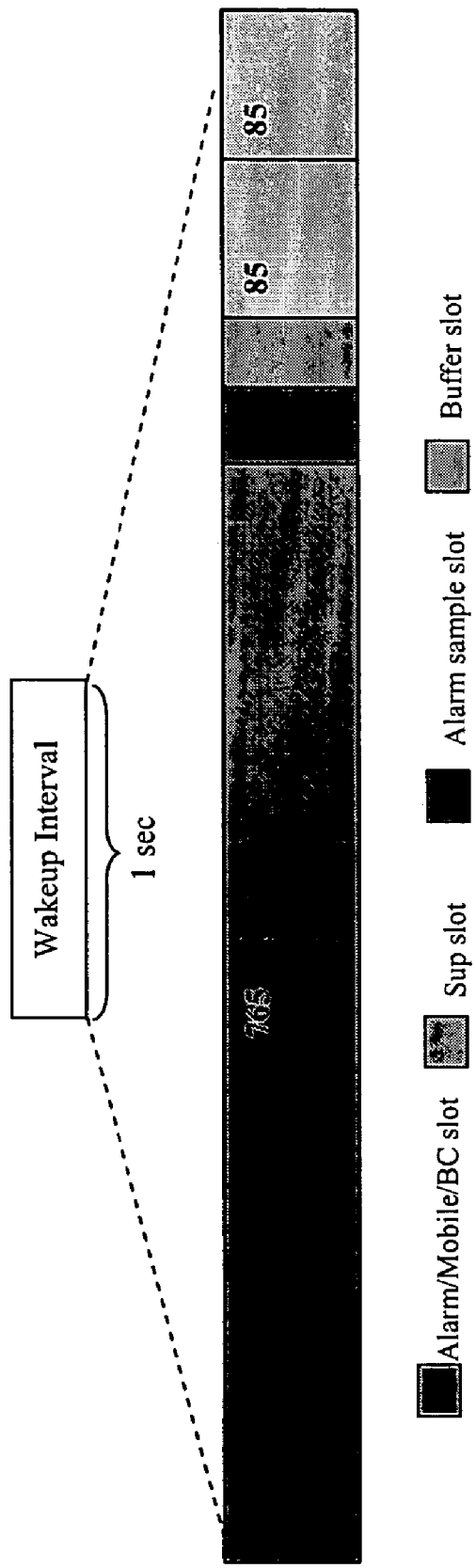
FIG. 16B shows an exemplary time slot structure for a protocol designed to meet European regulatory requirements.

The time slots may be structured differently for networks designed to comply to US regulatory requirements and those designed to meet European regulatory requirements. FIGS. 16A and 16B show the slot structure for the two configurations. The values in the boxes indicate the slot length in milliseconds.

Slot Structure for US

FIG. 16A shows a slot structure for a protocol designated to meet US requirements (e.g., 200 seconds to 1 day supervision). The alarm time slot is used to receive an alarm packet from a stationary sensor node. The time slot length is 85 ms. In the alarm time slot, the base station samples the network frequency and the backup frequencies. The alarm time slot size is large enough to accommodate the time to sample the network frequency, backup frequencies and receive an alarm packet on one of the sampled frequencies. The delay to handle the system alarms is limited by the time between the alarm time slots.

Figure 17:
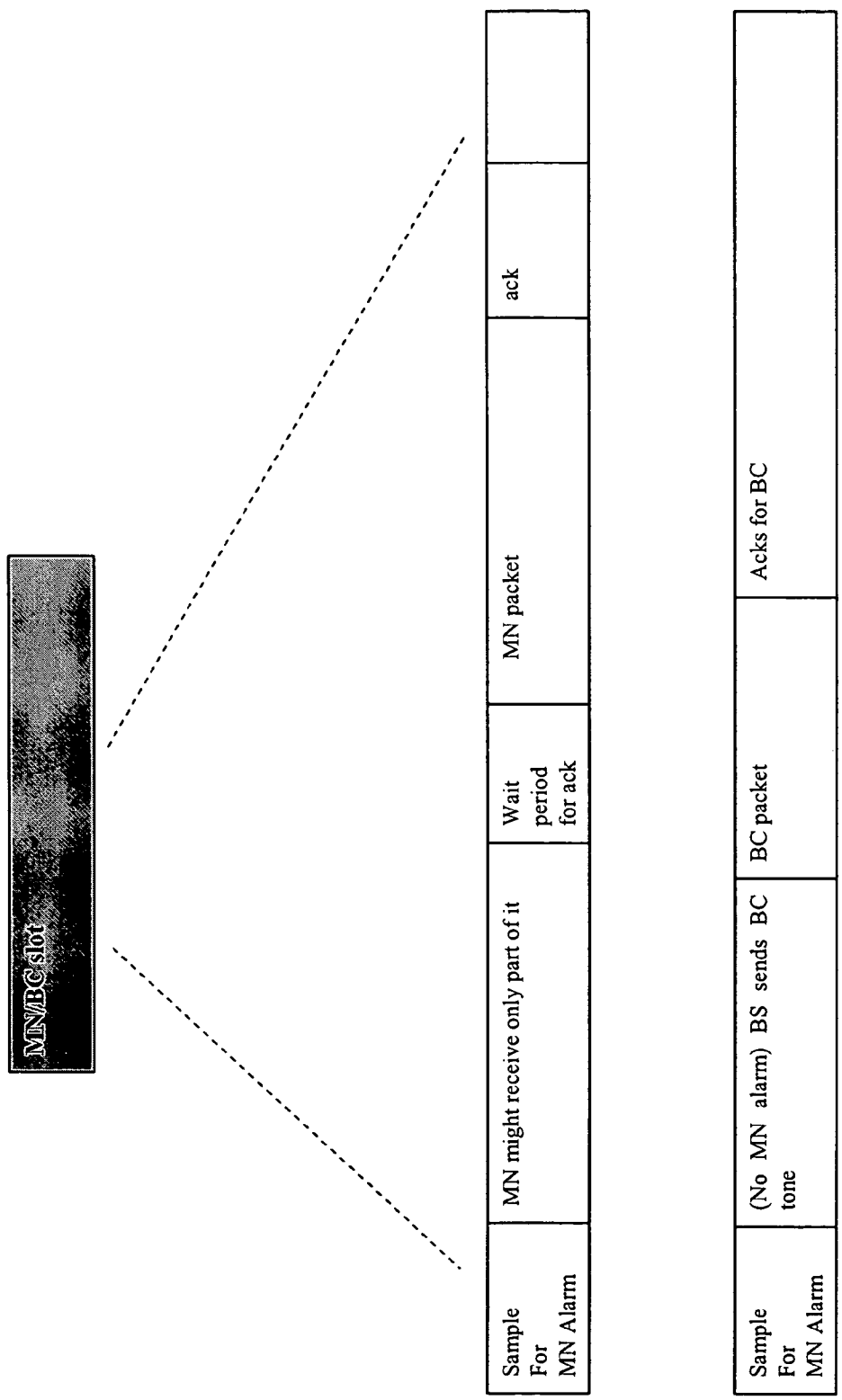
FIG. 17 shows an exemplary mobile node/back channel time slot structure

FIG. 17 shows an exemplary mobile node/back channel time slot structure. In this regard, the mobile node/back channel time slot should be long enough to accommodate the time to sample the mobile node frequency and also send a back channel command. The base station may either receive a mobile node packet or send a back channel command. The base station samples the mobile node frequency in the first 15 ms. If it senses a signal, it remains in the mobile node frequency to receive any medical/panic alarms. The mobile nodes are not synchronized to the network. In the worst case, the base station is required to listen twice the time it takes to transmit a mobile node packet and receive an acknowledgement, in order to receive a complete mobile node packet. Therefore, the mobile node time slot may spill into the back channel acknowledgement time slots. The delay to handle mobile node alarms is limited by the time between the mobile node sample time slots.

Priority is given to panic alarms over back channels by first sampling the mobile node frequency. A back channel command may be sent whenever there is no mobile node alarm/packet to be received. If the base station has a back channel packet to send it first starts with a tone followed by the back channel packet. Each sensor node wakes up in this slot to check for the presence of a back channel command. Every alternate back channel time slot, the sensor nodes first sample the network frequency and then one of the backup frequencies. This is because the base station transmits the back channel in the backup frequency if it does not receive acknowledgements for the one sent on the network frequency.

The nodes send their acknowledgements in their respective time slots within the acknowledgement slot. The back channel acknowledgement slot may accommodate acknowledgements from a fixed number of nodes. In case the back channel is sent to more nodes, the acknowledgements may spill into the back channel acknowledgement time slots of subsequent wakeup intervals.

Supervision time slots are used for supervision and retransmission of supervisions. The time slot length is 52 ms.

Mobile node sample time slots have a slot length of 15 ms. The base station samples the mobile node frequency to check for alarms/packets from mobile nodes. If the base station senses a signal, it continues to listen for the mobile node packet. If it receives a valid packet, this will result in wiping out of some of the subsequent supervisions. If it does not receive a valid network identifier in a specified time period (base station also may hear mobile nodes belonging to adjacent networks), it times out and gets back to doing supervisions. This may minimize wiping of supervisions due to packets from mobile nodes of adjacent networks.

FIG. 18 shows exemplary network parameters for US compliant systems.

Slot Structure for Europe

FIG. 16B shows an exemplary time slot structure for a protocol designed to meet European regulatory requirements. The alarm/mobile node/back channel time slot should be long enough to accommodate an alarm or a packet from the mobile node or a back channel. In the alarm/mobile node/back channel time slot, the base station samples the network frequency and then the backup frequency to receive any alarms, which the nodes in the network might have sensed. If it does not receive any alarms in the alarm/mobile node/back channel slot, it samples the mobile node frequency to receive any medical/panic alarms. If it does not sense any mobile node, it might proceed to send any back channel (if any) then it returns back to the network frequency. The nodes wake up in this time slot to check for back channel commands. Every alternate back channel time slot, the sensor nodes first sample the network frequency and then the backup frequency. This is because the base station may retransmit the back channel in the backup frequency if it does not receive acknowledgements for the one sent on the network frequency. The time slot is large enough to accommodate back channel acknowledgements from eight nodes. If more nodes need to send acknowledgements to a back channel command, the back channel time slots in subsequent wakeup intervals are used.

By sampling the channel for alarms first priority is first given to the network alarms. The delay to handle the system alarms is limited by the time between the alarm sample time slots. The delay to handle mobile node alarms is limited by the time between the mobile node's time slot. If there is a system alarm, the mobile node alarm will be further delayed. It is the case for the back channel also. The slot length is 765 ms.

Supervision time slots are used for supervision and retransmission of supervisions. The slot length is 85 ms. Two supervision time slots may be accommodated in one second. The base station samples for alarms after the alarm/mobile/back channel time slot. If there are any alarms to be received, it wipes the subsequent supervision time slot. A node scheduled for supervision in that slot performs it in an alternate retransmission time slot. This alarm sample time slot is provided to reduce the maximum latency for alarm packets.

FIG. 19 shows exemplary network parameters for European compliant systems.

Supervision Intervals

FIG. 20 shows exemplary supervision intervals for the United States and European compliant systems. The user may configure the network to have any of the supervision intervals. The default supervision interval is one hour for systems in the US, and two hours for networks in Europe.

Overview of Supervision Mechanism for US/Europe

Figure 21:
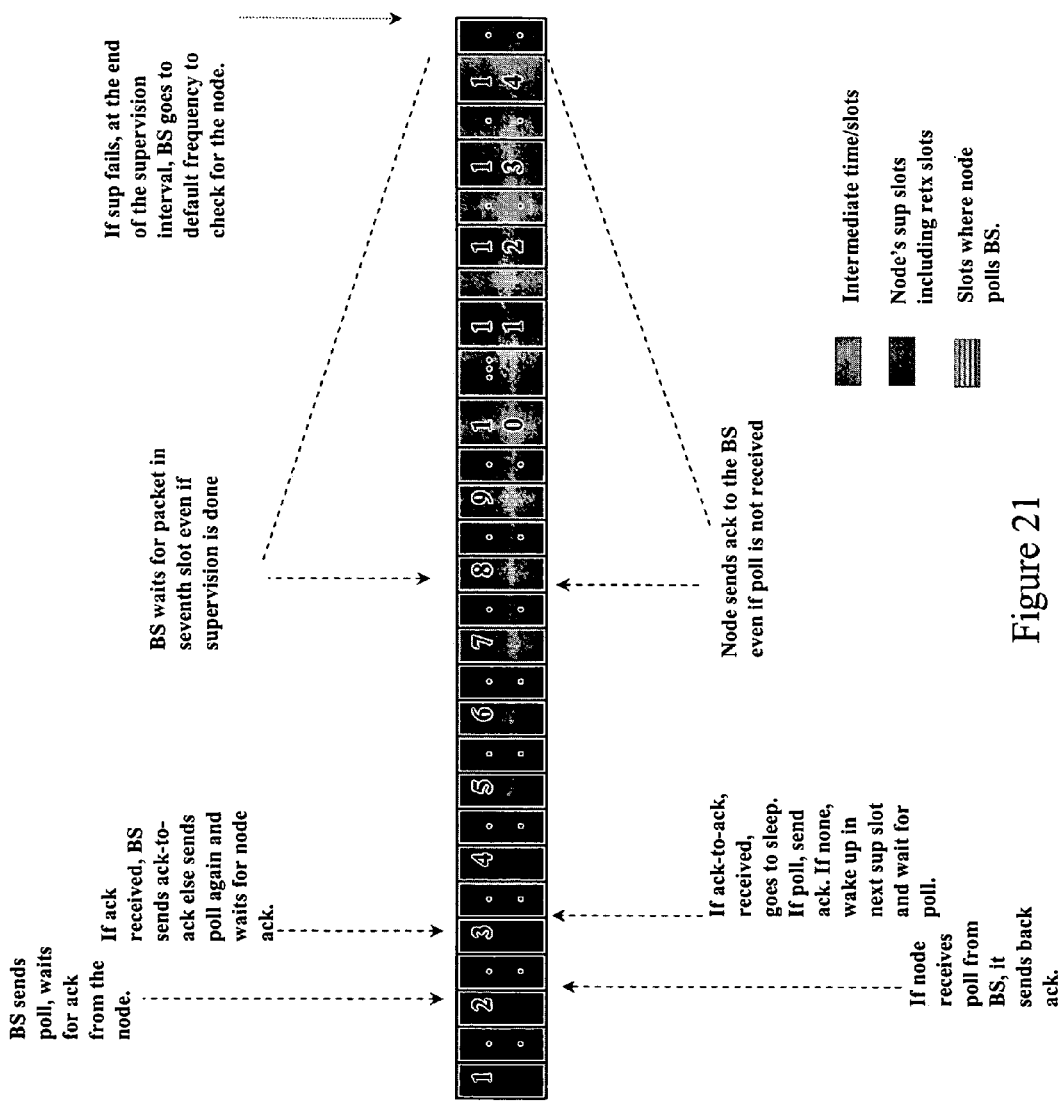
FIG. 21 shows an exemplary supervision mechanism overview.

FIG. 21 shows an overview of an exemplary supervision mechanism. The base station may supervise each sensor node. Any error (e.g., low battery etc.) status is collected at the base station. In this regard, each node is assigned a fixed number of time slots for supervision that should be sufficient to accommodate for retransmissions. Every node wakes up in its respective supervision time slot and waits for a poll tone, which is sent by the base station. The tone includes preamble bytes followed by start sequence and network identifier. The sensor node acknowledges the poll. The base station also uses this packet to learn about the status of the node, including, for example, whether the node's battery is low, etc. A single byte of information is sent in an acknowledgement packet. If there is no new status change, the node uses the information byte to send ambient RSSI, network RSSI and status in a cyclic fashion. If there is a status change, the new status is sent even if the time slot was scheduled for ambient RSSI/Network RSSI. If the base station receives the acknowledgement, it acknowledges the sensor node by sending an acknowledgement in the subsequent supervision slot, (e.g., ack-to-ack tone). If the base station does not receive an acknowledgement to the poll tone, the base station sends a poll tone again in the sensor node's next retransmission slot. The ack-to-ack tone and the supervision poll are differentiated by just one bit, the e.g., most significant bit of the network identifier. A "1" indicates a poll and "0" indicates and ack-to-ack tone. The sensor node wakes up in its next retransmission slot to check if the base station is sending an ack-to-ack tone poll. If the node hears an ack-to-ack tone, the node goes back to sleep, which implies that the base station received the acknowledgement that was sent in the prior supervision slot. If the node hears a poll tone again, the node acknowledges the poll packet tone and repeats the aforementioned procedure. If the node does not hear a poll tone, the node timeouts and wakes up in the subsequent supervision slot to listen for poll/ack-to-ack tone. In the seventh retransmission slot, even if a poll is not received the node sends its acknowledgement packet. If it was expecting an ack-to-ack tone in the seventh slot, it waits, timeouts and sends its poll. If the base station does not hear from a node in all the seven supervision slots, it sends a message to the MPS indicating that the supervision for the node failed. The MPS then initiates a search for the node in the default frequency by sending a configure node command. The nodes monitor their battery voltage whenever they transmit acknowledgements to supervision polls.

Slot Allocation and Frequency Usage

Figure 22:
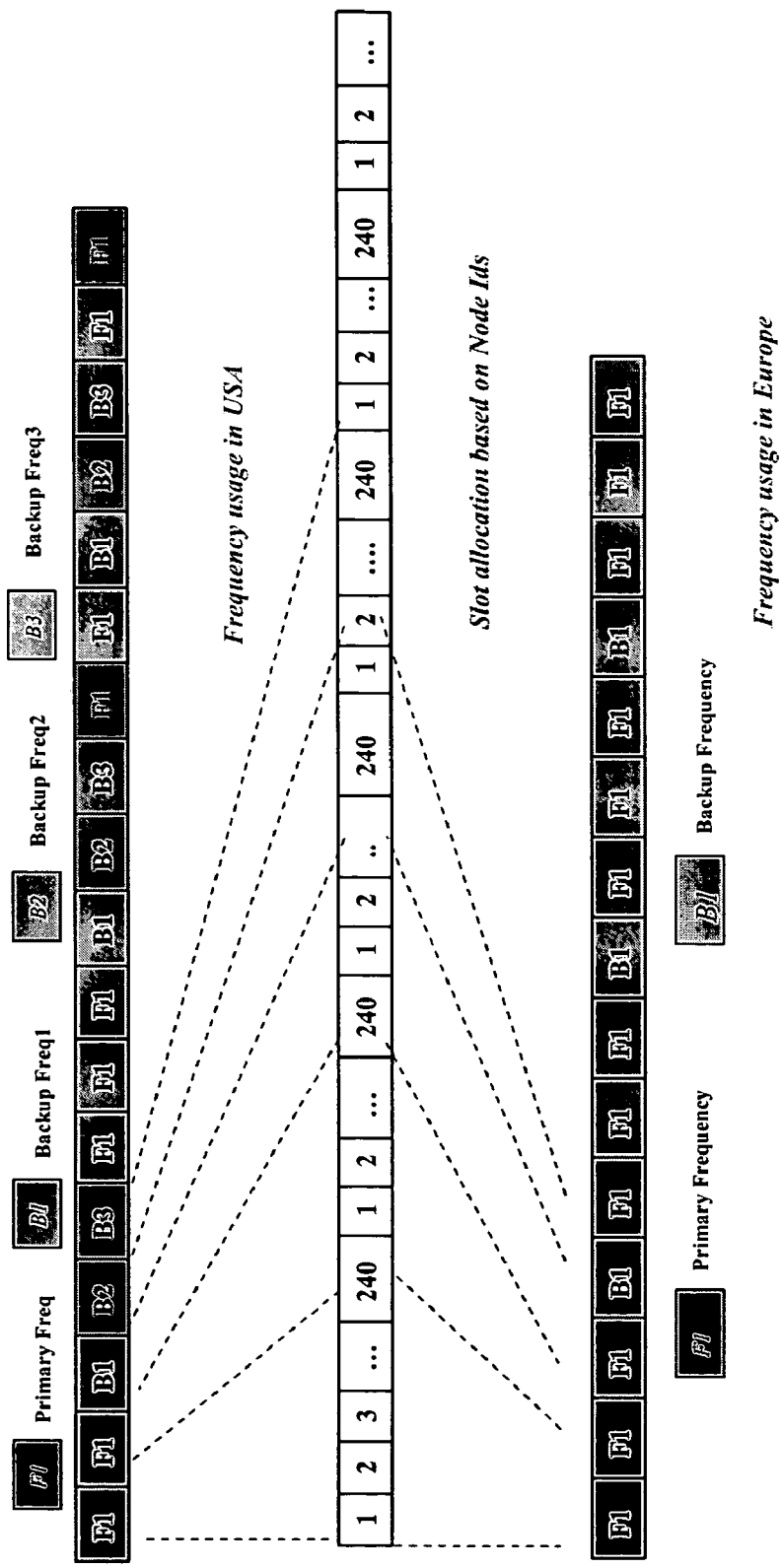
FIG. 22 shows an exemplary slot allocation and frequency usage for US and European compliant systems.

Every node is assigned multiple time slots for retransmission of supervisions and these slots are well separated in time so that any brief asynchronous activity that causes failure of supervision in one time slot should not affect the retransmission slots. The number of supervision time slots allocated is large enough to accommodate 240 nodes. Even though a network may have fewer nodes, time slots are allotted for 240 nodes so as to handle the possibility of adding new nodes at some future time. Every node is assigned a slot based on its node identifier and they cycle over after each node has received one time slot. The nodes are assigned slots as shown in FIG. 22. For example, the node with node identifier "1" is assigned all time slots marked as 1. In Europe, due to duty cycle restrictions, only a fixed number of nodes "N" can be accommodated in each hour. The first "N" nodes are supervised in the first hour, the subsequent "N" in the next hour and so on. The size of the supervision slot is long enough to accommodate for clock drifts and transmission of polls and acknowledgements. Alternate frequencies are pre-assigned to some of the retransmission slots so that if a particular frequency is jammed, the supervision may be successful in another one. The systems in the United States use one primary frequency and three backup frequencies while those in Europe use one primary frequency and one backup frequency. Since the networks designed for the United States have multiple backup frequencies, they are chosen in order one after the other in the backup-frequency-supervision slot. The first two tries use network frequency and the subsequent three use backup frequencies as shown. The last two tries also use network frequencies. The use of frequency is shown in FIG. 22, which shows the supervision time slots of a particular node.

Packet Structure

The poll tone may include a preamble (four bytes), a start symbol (two bytes), and a network identifier (one byte). Note, one bit in this byte may differentiate between a poll and ack-to-ack tone. The acknowledgement from the node may include a network identifier (one byte), a packet type/length (one byte), a node identifier (one byte), a counter (one byte), and a node status/ambient RSSI/network RSSI (four bytes).

Counter Handling

The base station and all the nodes maintain a supervision counter. This counter at the base station may common for all the nodes. The counter is incremented at the base station and nodes increment the counter at the start of each supervision cycle.

Exception Handling & Other Notes

Supervisions that fail due to prolonged interference in one frequency are handled by using multiple frequencies. Brief interference in the network frequency is handled by assigning multiple slots well separated in time. Failing to receive poll/ node ack/ack-to-ack tones is handled by the three-way communication between nodes and the base station. Multiple retransmissions of time beacons ensure time synchronization. Nodes may be reset, lose time synchronization and go to default frequency. The MPS issues command to find the node in default frequency after a supervision failure. The network identifier is sent along with the poll tone to differentiate poll tones from adjacent network's node sending a packet (packets start with preamble and start symbol follows). A counter is provided in the acknowledgement for replay protection. A supervision poll is required because sometimes a supervision may be wiped out by back channel command acknowledgements or if the base station is receiving some alarm or a packet from a mobile node. If a poll is not sent, the nodes may send acknowledgement during these times colliding at the base station.

Time Synchronization

The narrow band requirement in Europe may make it difficult to use data rates higher than 4.8 kbps. Due to the low data rate, communication of packets may take longer times and the supervision slots may need to be really big. This may result in exceeding the limits set by duty cycle regulations in Europe. The energy consumption for transmit and receive may also become extremely high. In order to handle the aforementioned problems, the supervision scheme and time synchronization mechanism have been modified as below.

The base station sends three time beacons in predetermined time slots. Time beacons use the last supervision time slot in a wakeup interval. Two of the beacons are transmitted in the network frequency and one is transmitted in backup frequency. If the node deletes a time beacon it will not wakeup for the other two time beacons. Multiple beacons and frequencies are used to ensure that the nodes receive the time beacons. The time beacon is similar to the supervision poll, but it also has a counter byte. The tone always ends at a "predefined time". The sensor nodes hear the tone and when the tone ends, they set their clocks to the "predefined time". For example, if the time beacon slot for a node is supposed to start at 120, the node wakes up at 120 and hears the tone. The tone is predefined to end at 10 units after start of slot, i.e. 130. Therefore, when the tone ends, the receiving node knows that the base station's time was 130 and sets its clock to 130.

A feature of using tones is that they may be very small. The time packet usually consists of headers and several bytes of time, and the encoding of this packet makes them very big. (other encoding scheme may make packet three times bigger). Therefore, energy may be saved and smaller slot sizes may be realized by using tones. The tone needs to be long enough to accommodate for clock skews. But the clock skew may be very small as the nodes synchronize every two minutes (120 seconds). The node sets the time only if the counter is valid. The ambient RSSI is measured in the time beacon slot after the time beacon is received. This is performed once in a supervision interval. Whenever a time beacon is received, the radio frequency drift is measured at the nodes and the frequency is adjusted depending on the measured drift.

Counter Handling

The base station and all the nodes maintain a time beacon counter. At the base station the counter is incremented whenever the first of the three time beacons is sent. The nodes increment the counter whenever they receive the time beacon with valid counter.

Alarms

The base station is alternately listening to the network frequency and mobile node frequency at all times except when handling back channel commands/acknowledgements/ supervisions and new nodes. The sensor interface transmits status information to the node when it senses an alarm. The node waits until the alarm time slot to send the alarm packet to the base station, which acknowledges these packets immediately. If the node does not receive an acknowledgement it retries in the next alarm time slot.

If multiple services are utilized on the same system, priority of the messages in the network may be as follows: (a) fire alarm, (b) medical or panic alarm, (c) security alarm, (d) trouble and supervisory, and (e) others. In this regard, it is noted that transmission of a tone may not be required since the base station is receiving continuously in these slots.

Potential Issues with Alarm Handling

If the link is poor (e.g., due to high level of noise) the alarms may not reach the base station. Also, multiple sensors in a neighborhood (e.g., sensors may hear one another) may sense the alarms and send packets to the base station resulting in a collision. Moreover, multiple distant sensors (e.g., sensors that cannot hear one another) may be sending alarms to the base station resulting in a collision. The node due to some problem is not synchronized with the network.

Collision Avoidance for Alarms

Figures 23A, 23B:
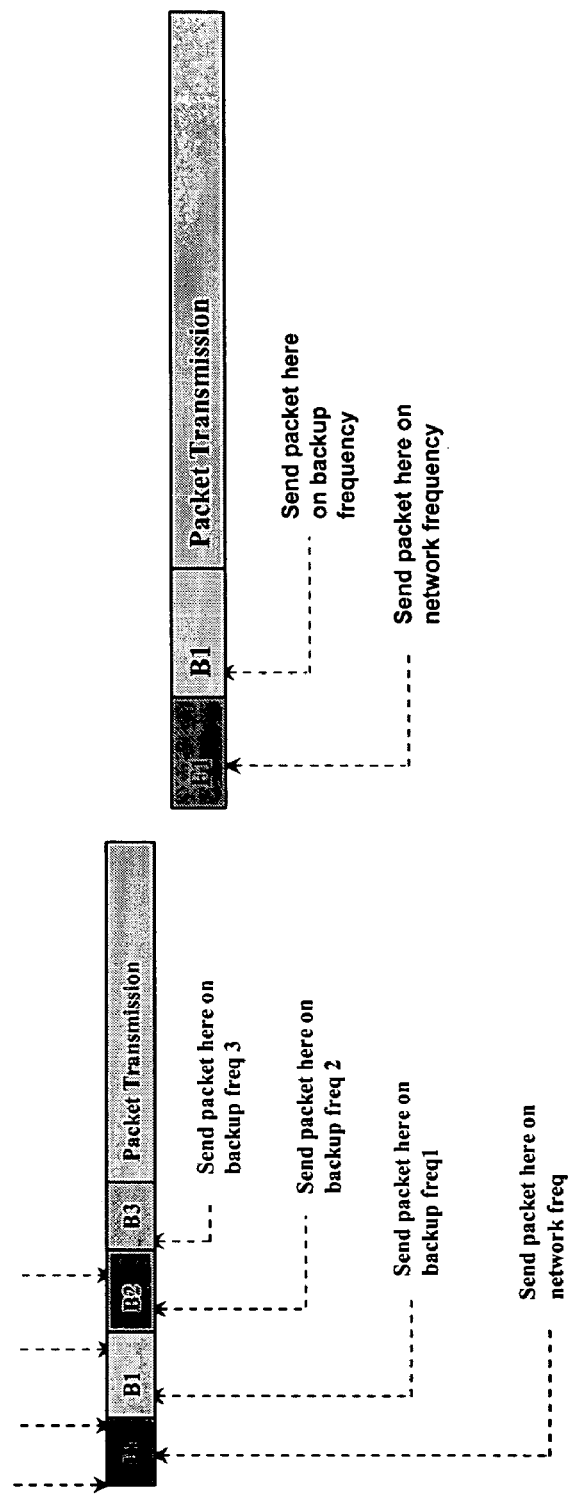
FIG. 23A shows an exemplary alarm time slot structure for US compliant systems.
FIG. 23B shows an exemplary alarm time slot structure for European compliant systems.

Alarms may be considered to be critical messages and should get through even in the presence of multiple alarms/bad channels, etc. An exemplary method to ensure this is shown in FIGS. 23A and 23B.

In every alarm time slot the base station samples the network frequency and then the backup frequency. In the US, the base station may be required to sample three backup frequencies. The nodes send an alarm in the first alarm slot following the sensing of the alarm. It sends the packet in the network frequency without performing a Carrier Sense Multiple Access (CSMA) protocol exchange. If it does not receive an acknowledgement, the node performs a CSMA in the next alarm time slot. If it senses no signal, it sends the packet on the network frequency. If not, it goes to the backup frequency and performs CSMA. If the channel is not busy, it sends the packet on the backup frequency. For US, this may be continued for multiple backup frequencies.

The previously described step is performed in a maximum of three alarm slots to ensure that if multiple nodes in a particular neighborhood sense an event, their alarms can get through. Performing CSMA may help at least one of them to get through in a particular slot. If the alarm still does not get through, the node goes to the next alarm slot and sends the packet on a backup frequency without performing CSMA. For networks in the US, this is performed on all the three backup frequencies in successive alarm time slots if the packets do not get through. Sending alarms on the backup frequency handles the case where there is noise on the network frequency. If the aforementioned steps do not result in alarms getting through successfully, the nodes use an exponential back off algorithm to transmit in random time slots. The details of this procedure are provided in the subsequent paragraph. Doing this may handle the hidden terminal problem where distant nodes transmit an alarm simultaneously and collide at the base station. If the node still does not receive an acknowledgement to the alarm (e.g., may happen if the node's clock is not synchronized to the base station's clock), the node sends alarms packets continuously in the default frequency for one second. These packets are separated by a wait time for acknowledgements. The base station samples the default frequency and mobile node frequency alternately in the back channel time slot and should be able to receive at least one alarm packet.

Figure 23C:
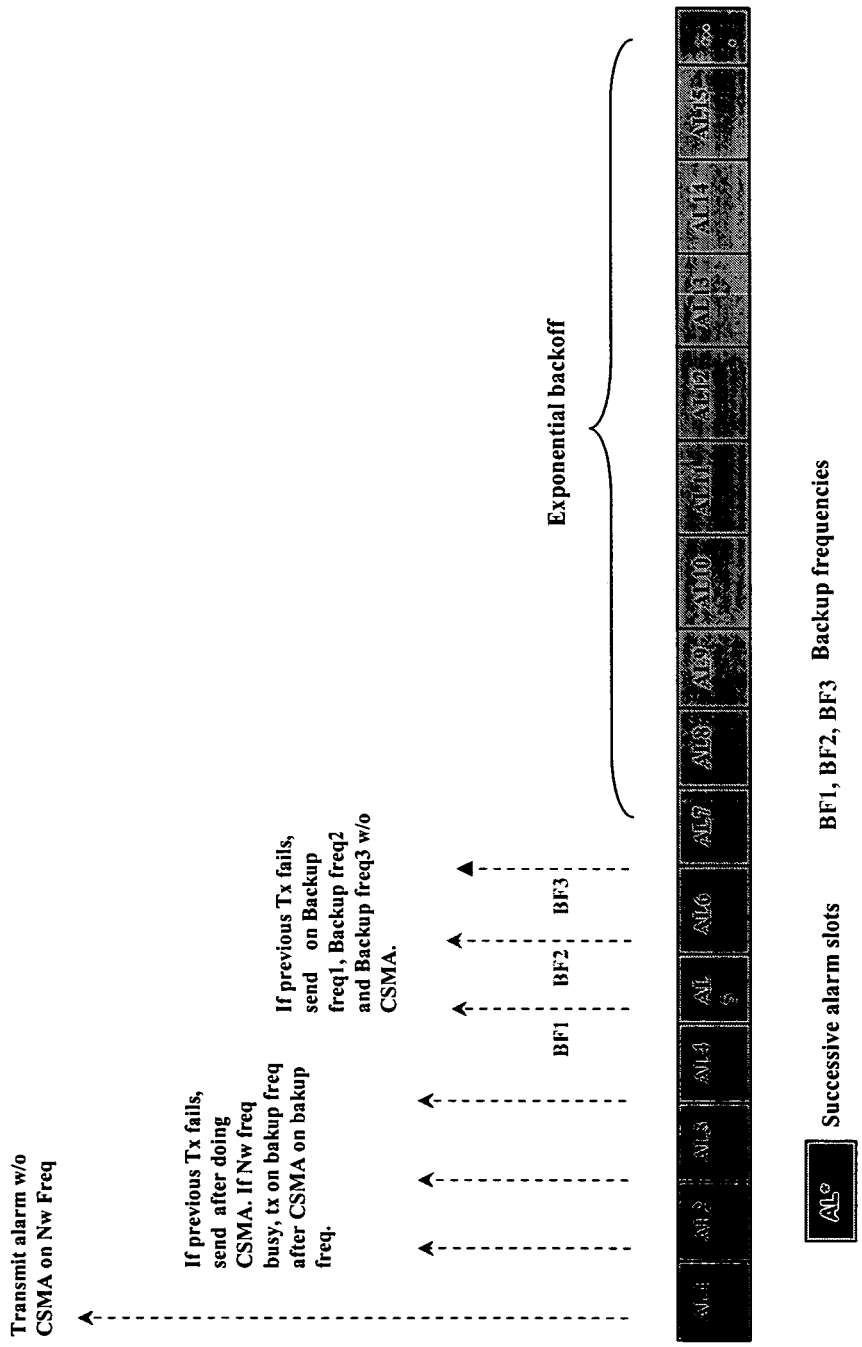
FIG. 23C shows an exemplary method for alarm transmission for US compliant systems.

FIG. 23C shows the procedure for systems in the United States. It remains the same for Europe, except that there is only one transmission on the backup frequency, as there is only one backup frequency available.

Collision Avoidance Using Exponential Backoff

To avoid collision with one another, the nodes may select a random number and based on the number, choose a time slot to transmit the alarms. The nodes may repeat this up to a maximum of six times. The range for the random number depends on the number of time slots to choose from and on the number of available frequencies to transmit including the backup frequencies. For every failed transmission, a node chooses from double the previous number of time slots. For Europe, the node ensures that it transmits four packets on the network frequency and two packets on the backup frequency, whereas for the United States, the node transmits three packets on the network frequency and one packet on each of the backup frequencies. The number of time slots to choose from and the range of the random number for the iterations are shown in the table of FIG. 24.

For example, if a node in a US compliant network fails to receive an acknowledgement in iteration 1 and 2, the node then chooses a random number from 1 to 32. If the chosen random number "rand_num" falls in the range 1 to 8, the node transmits in the slot "rand_num" in the network frequency. If the chosen random number falls in the range 9 to 16, the node transmits in the slot "rand_num mod number_of_slots" in backup frequency1. If the chosen random number falls in the range 17 to 24, the node transmits in the slot "rand_num mod number_of_slots" in backup frequency 2. If the chosen random number falls in the range 25 to 32, the node transmits in the slot "rand_num mod number_of_slots" in backup frequency 3.

The number of transmissions on network frequency and backup frequency may be fixed by adjusting the range of the random number. For example, if the node does transmissions 1, 2 and 4 on network frequency, the range of random numbers for the fifth iteration will be from 65 to 256.

Async Alarm Transmissions

Async alarms are generated when the node does not receive acknowledgements from the base station for alarm packets sent on the network and backup frequencies, or when the node loses time beacons and is out of sync with the base station. Async alarms are transmitted in the default frequency.

To send async alarms the node sends async alarms for one wakeup interval, the node stops async alarms if it receives an acknowledgement from the base station, and tries to retransmit async alarms five times if it does not receive acknowledgements from the base station. Each retry is performed by choosing a random number from a range R=t secs. The node then transmits an async alarm after "t" wakeup intervals. The range R doubles for every re-transmission.

Status Information Transfer Between Sensor Module and the Node

The sensor module transfers up to a maximum of four bytes of status information to the node. The status information is transmitted as part of the alarm packet to the base station. If the node has sent an alarm packet and is waiting for an acknowledgement from the base station, the sensor module does not transfer the status bytes to the node until it is ready to receive the status information.

Alarm Latencies

A worst-case alarm latency for systems in Europe is 725 milliseconds if there is no collision. A worst-case alarm latency for systems in the United States is 500 milliseconds if there is no collision. If there is a collision, it should be resolved after a few retransmissions that should take about 3 to 5 seconds. In the worst-case this may take about 67.5 seconds in the US and 66.5 seconds in Europe.

Packet Structure

The alarm packet may include, a preamble (four bytes), a start symbol (two bytes), a network identifier (one byte), a packet type (one byte), a length (one byte), a counter (one byte) (counter may remain the same for all retransmissions), a Status (four bytes), a node identifier: source (one byte), a cyclic redundancy check (CRC) (two bytes).

The acknowledgement from the base station may include, a preamble (four bytes), a start symbol (two bytes), a network identifier (one byte), a packet type (one byte), a counter (one byte), a destination node identifier (one byte).

Back Channel Commands

The user may control the operation of a node remotely by sending back channel commands at the panel. For example, the user may change the sensitivity of a sensor or arm an area or disarm motion detectors, etc. These messages are processed at the panel and the hub is responsible for creating the back channel packets. The command is sent to the nodes through the base station.

Most back channel commands are asynchronous. For example, disarming the network is an asynchronous back channel command. A user may invoke this command when the network need not monitor certain conditions in the environment. For power efficiency, the nodes do not receive at all times and instead sample for back channel at periodic intervals (e.g., wakeup interval). This interval may depend on the amount of power that can be sacrificed and the delay for other types of packets that can be accommodated.

Most back channel packets are addressed towards a predefined set of nodes based on area, type, etc. For example disarming all motion detector in the entrance. It is expected that there will be a maximum of eight zones or areas and typically two to three zones. Each zone may have eight to thirty-two nodes. Also, nodes may be grouped based on sensor types e.g., fire, motion detectors, etc. A maximum of eight such types are expected.

Each group may have a multicast identifier. A group may be a set for nodes that can be addressed together to do a certain task. For example, disarming all sensors in area 2 or arm all motion detectors, etc. A maximum of sixteen such groups is expected. The multicast identifier is a part of the node identifier address space. A node may belong to more than one group. For example, a node might belong to zone 2 and may also be a motion detector.

The nodes are assigned the multicast groups that they belong to and their acknowledgement position in a multicast group during the initialization phase. A fixed number of nodes (N) acknowledge receipt of the back channel packet in a wakeup interval. The nodes in a broadcast/multicast group are further divided into subgroups. The first N nodes belong to 1 and the next N nodes belong to 2 and so on. The back channel packets are acknowledged and these acknowledgements follow the back channel command. The nodes acknowledge the back channel packets in their respective acknowledgement slots.

The back channel packet specifies the action to be taken, such as, for example, arm, disarm, change the sensitivity, etc. It also specifies if the packet is intended for all the nodes in the group or only some nodes.

Procedure to Handle BC Commands

The MPS transmits the back channel packet to the base station, which extracts the back channel information and transmits the packet to the nodes in the back channel slot. A back channel packet may be a multicast packet, in which the back channel packet is addressed to all nodes that belong to a multicast group, a unicast packet, in which the back channel packet addresses a single node, or a unicast list packet, in which the back channel packet addresses a subset of nodes in a multicast group. The unicast list is used only for re-transmissions.

Figure 25A:
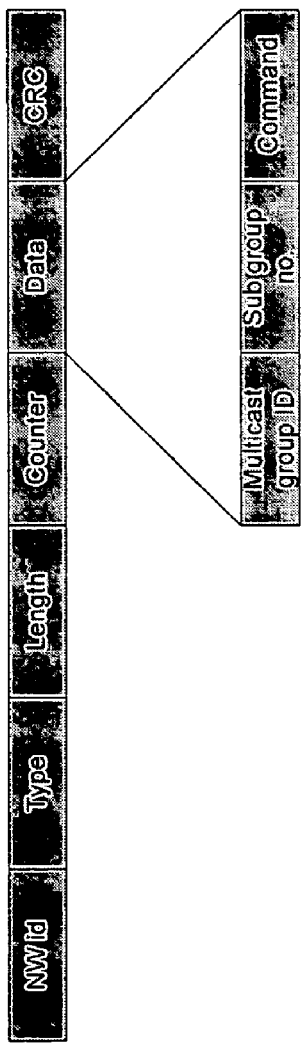
FIG. 25A shows an exemplary back channel packet structure for multicast and unicast packets.
Figure 25B:
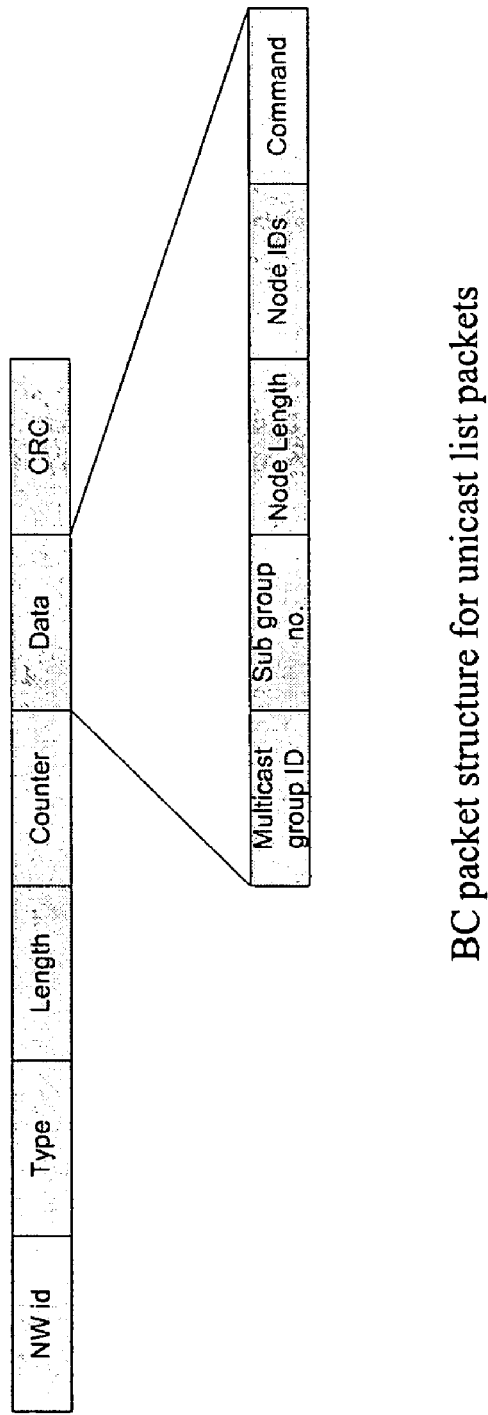
FIG. 25B shows an exemplary back channel packet structure for unicast list packets.

FIG. 25A shows an exemplary back channel packet structure for multicast and unicast packets, and FIG. 25B shows an exemplary back channel packet structure for unicast list packets.

Multicast Packet

FIG. 26 shows exemplary back channel packet structure values. If a packet is multicast, the subgroup identifier is also included in the back channel packet. The nodes belonging to the relevant multicast group execute the back channel command if a new valid counter value is received. However, only the nodes that belong to the subgroup indicated in the packet acknowledgement in the current wakeup interval. The MPS then resends the back channel packet with the next subgroup identifier. All nodes in the multicast group receive the packet but do not perform the action if they have already done so earlier. The nodes that belong to the indicated subgroup send the acknowledgements in this wakeup interval. This may be repeated for every of the multicast group until the MPS has indicated to all subgroups to acknowledgement receipt of the back channel packet.

Figure 27:
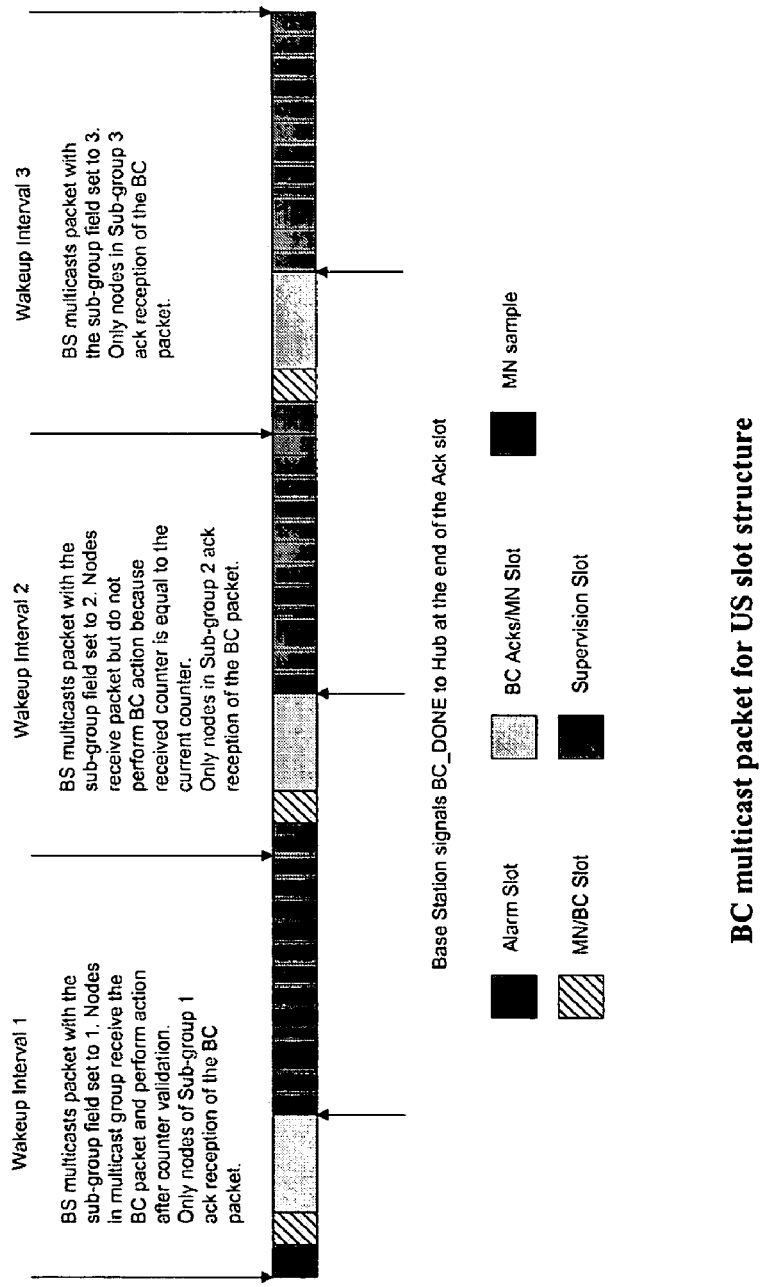
FIG. 27 illustrates exemplary behavior at the base station for multicast packets for US compliant systems.

FIG. 27 illustrates exemplary behavior at the base station for multicast packets for the US slot structure. Each back channel packet is received from the MPS. If there are 50 nodes and the maximum number of acknowledgements per slot is equal to 30, then nodes 1 to 30 would be part of subgroup 1 and would acknowledgement in Wakeup interval. Nodes 31 to 50 would be a part of subgroup 2 and would acknowledgement in Wakeup interval 2.

Unicast Packet

If a back channel packet is required to be unicast to a node, the node identifier of the node is indicated in the multicast group identifier field in the back channel packet. The subgroup identifier field is set to "0xFF". The node performs the relevant back channel action if a new valid counter value is received. The node transmits an acknowledgement in the same wakeup interval. If the received counter is equal to the counter at the node, the node does not perform the action but transmits the acknowledgement in the same wakeup interval.

Unicast List Packet

The unicast list is used for retransmissions only. The maximum number of nodes in the unicast list is predetermined based on the maximum back channel packet length. The multicast identifier field indicates the multicast group that was transmitted in the original back channel packet. The subgroup identifier field is set to "0xFF". All nodes whose node identifier is listed in the packet send their acknowledgements, in the order they are listed, in the current wakeup interval.

Figure 28:
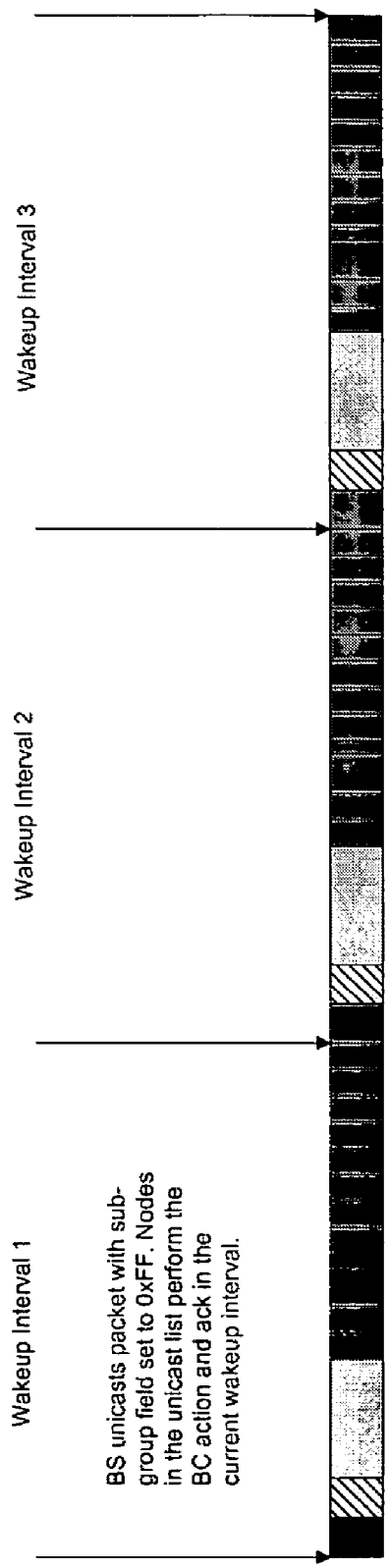
FIG. 28 illustrates exemplary behavior of the base station for unicast list packet for US compliant systems.

FIG. 28 illustrates exemplary behavior of the base station for unicast list packet for US slot structure. The base station forwards the received acknowledgements to the MPS. A base station signals "BC_DONE" to the MPS after all acknowledgements are received in a wakeup interval.

If a mobile node or alarm wipes out the back channel slot in a wakeup interval, then the base station does not receive a fire for the back channel acknowledgement time slot. The back channel packet is sent in the next wakeup interval and the acknowledgements follow the packet. "BC_DONE" is also sent after the acknowledgements have been passed to the MPS. The MPS and the back channel module are therefore unaware of the wiping of back channel by a mobile node packet.

Retransmissions

Based on the number of acknowledgements received from the nodes, the MPS decides on the kind of retransmission method. Retransmission may be performed in various manners. For example, a packet may be retransmitted to an entire subgroup. In particular, a packet is transmitted to a subgroup if the number of failures in any is greater than a predefined number "maxFailureCount". If there are multiple subgroups with number of acknowledgement failures greater than "maxFailureCount", then the back channel packet is transmitted first to the subgroup with the maximum number of failures. The subsequent packets are transmitted to the subgroups in decreasing order of acknowledgement failure counts. If there are no subgroups that satisfy the above criteria, the back channel packet is transmitted with a unicast list. Retransmission may also be performed via a unicast list, in which the back channel packet is unicast to a few nodes identified by the node ids in the data field. This is called a unicast list and is shown in FIG. 28. The unicast list packet contents and the order in which the acknowledgements are transmitted by the nodes is explained in the section unicast list packet. After each retransmission, the MPS reevaluates the remaining number of acknowledgement failures and retransmits using either a unicast list or retransmits to a subgroup with the highest number of failures as mentioned above. This process is repeated until the back channel packet is retransmitted with a unicast list three times.

Use of Alternate Frequencies

Figure 29:
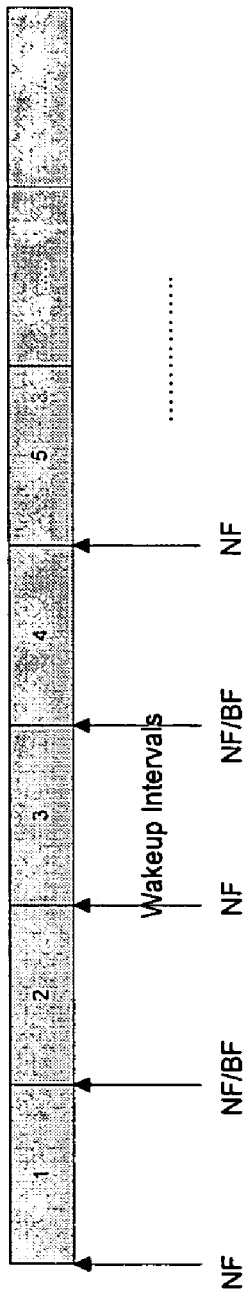
FIG. 29 illustrates an exemplary alternative use of the network and backup frequencies during retransmissions.

FIG. 29 illustrates an exemplary behavior of the base station for a unicast list packet for a US compliant slot structure. The base station transmits back channel packets in the backup frequency only for retransmissions. Each retransmission packet from the MPS is indicated by a byte in the back channel packet. Every alternate slot is used for retransmissions in the backup frequency. The unicast list back channel packet is retransmitted three times to ensure that at least one of them is on the backup frequency. Nodes sample the backup frequency in alternate back channel slots if they do not receive any packets on the network frequency.

Procedure to Handle BC at Node

To handle the back channel, the slot handler signals start of the back channel slot to the node. Based on the input from the slot handler, the node changes to network or backup frequency. The node receives the back channel packet and verifies that the packet is addressed to it. If not, the node drops the packet and goes to sleep. If there is no signal in the air, the node goes to sleep. If the packet is multicast, the back channel application at the node verifies if the node belongs to the multicast group indicated in the packet. If the packet is unicast or is a unicast list, the node verifies if its node identifier is listed in the back channel packet. If the packet is addressed to the node, the application accepts and acts on the back channel packet if the counter in the packet is greater than the counter at the node. If the received counter is greater than the previous counter, or when the received counter is equal to the counter at the node and if the time of reception of the packet is within a specified duration (maximum time for retransmission) since the node set its previous counter, or if the packet is unicast/unicast list, the back channel application computes the node's acknowledgement slot and schedules for an event to be fired to it in its acknowledgement time slot. The node sends the acknowledgement in the acknowledgement time slot. If the back channel packet was not addressed to the node, it goes back to sleep.

Procedure to Handle BC at the BS

To handle the back channel, the back channel application at the node signals to the slot handler that it has to transmit a back channel packet. The slot handler fires an event to the back channel application indicating start of the back channel slot. The base station changes to the appropriate frequency (e.g., network/backup frequency or default frequency for default type packet transmissions). The base station transmits the back channel packet and receives acknowledgements from the sensor nodes. The slot handler signals the end of the back channel acknowledgement slot to the base station. The base station signals "BC_DONE" to the MPS.

It is noted that the base station does not sense the channel (e.g., using CSMA) before transmitting its tone since the back channel packets take ~200 milliseconds. Even if the base station senses high noise, it may not last for 200 milliseconds and it may not exist near the nodes. Also since there is only one base station in that network frequency, the probability that it will collide with another back channel is low.

Priority

Since the alarm/mobile node/back channel time slot is common for alarms or mobile node packets or back channels, the packets with the highest priority may wipe out the packets from other sources. The back channel, for example, existence of network alarms may wipe out mobile node packets and back channel, or the existence of mobile node packets may wipe out back channel.

If a mobile node or alarm wipes out the back channel time slot in a wakeup interval, then the base station does not receive a fire for the back channel acknowledgement time slot. The back channel packet is sent in the next wakeup interval and the acknowledgements follow the packet. The back channel application notifies the hub after all acknowledgements expected in this wakeup interval have been passed to the hub. The hub and the back channel module are therefore unaware of the wiping of back channel by an mobile node packet.

Counter Management

The MPS is responsible for counter management. The MPS maintains a multicast counter (e.g., one counter for each multicast group), and a unicast counter (e.g., one counter for each node). The relevant counter is incremented for every new back channel packet that is multicast or unicast. The counters are not incremented for retransmissions. As unicast lists are used only for retransmissions, the counters are not incremented when back channel packets are transmitted as unicast lists.

The nodes verify the validity of the back channel packet based on the received counters. If the counter received in the back channel packet from the base station is greater than the counter at the node by a predetermined value, then the node accepts the back channel packet, executes the relevant back channel command and stores the new counter. If the node belongs to the subgroup indicated in the back channel packet, then the node acknowledgments the base station. If the counters are equal and the node belongs to the subgroup indicated in the back channel packet, then the node acknowledgements the back channel packet but does not perform the back channel action.

Mobile Nodes

The wireless sensor network system may also support mobile nodes (MN), including, for example, three kinds of mobile nodes: pendants (transmit only), key fobs (nodes that may handle two-way communication), and keypads (nodes that can handle two-way communication and may also be supervised). FIG. 30 shows exemplary values for the number of mobile nodes in a system. The pendants and network nodes share a common space in the hub memory. The sum of number of pendants and number of network nodes should not exceed the maximum nodes in the system.

The different kinds of message exchanges for mobile nodes may include, for example:

1. Asynchronous alarm messages from pendants, which are not acknowledged, as pendants are transmit-only devices.

2. Asynchronous alarm messages/commands from key fobs: the base station acknowledges these messages. The base station may also forward response to command received from the hub to the key fob within a predefined duration after the initial command has been sent.

3. Asynchronous messages from keypads: The keypad may send asynchronous messages to the base station based on user inputs. (e.g., key presses etc)

4. Asynchronous Output Command from the base station to a mobile node. The base station may be forwarding asynchronous messages from panel/hub to base station (e.g., text display/turn on sounder, etc). It may also be response messages to keypads.

5. Periodic Supervision of keypads. The system may also support supervision of keypads with a specific supervision interval. This supervision interval is same for keypads and static sensor nodes of a given system.

Mobile nodes are not in sync with the base station and cannot be assigned a fixed time to communicate. Moreover, some of these devices are not "on" at all times or may not be within communication range at all times. Therefore the mobile nodes are treated differently than the sensor nodes.

Brief Overview of Mobile Node Handling

Mobile nodes may operate only on the mobile frequency so that they do not interfere with the network operation. This is a predetermined fixed frequency and is not used by the system for any other communication.

The base station periodically (in the mobile time slot) samples the mobile frequency to check if any signal is being received. If the base station receives a valid packet from an mobile node that belongs to the system, it acknowledges the receipt of the valid packet and forwards the packets to the hub.

When a mobile node has data to send, it transmits mobile node packets continuously for a specified duration (separated by time intervals to accommodate acknowledgement timeout for key fobs) or until acknowledgement is received. The mobile node stops packet transmission when acknowledgement is received.

MN Handling at BS

FIG. 31A show an exemplary mobile node slot structure for the US, and FIG. 31B shows an exemplary mobile node slot structure for Europe. The base station periodically samples the mobile node frequency for mobile node packets. In the US, the mobile node frequency is sampled at the beginning of the back channel slot and after the second alarm slot. If a mobile node packet is received in the back channel slot, the back channel is wiped out and if a mobile node packet is received in the mobile node sample slot after second alarm slot, subsequent supervisions are wiped out.

In Europe, a slot is shared by network alarms, mobile node and back channel. Since network alarms have a higher priority over mobile node alarms or packets, the base station samples the network for any alarms. If the network has nothing urgent to report, it checks the mobile node frequency for any packets. If a network alarm is received, the base station does not sample the mobile node frequency. If a mobile node packet is received in the back channel time slot, the back channel is wiped out.

In the United States and Europe, if there are no back channel commands to be sent, the base station samples default frequency and mobile node frequency alternately to check for asynchronous alarms from network nodes and mobile node packets respectively.

Procedure for Pendants

At Node (Pendants)

If a pendant is in the alarm state it immediately starts transmitting mobile node alarm packets in the mobile node frequency. It transmits long enough to ensure that the base station may receive the packet during the mobile node sample time slot. (Time duration of transmission referred as "MNT× Duration" subsequently). In Europe, the base station samples on the mobile node frequency once in a wakeup interval, so pendants may transmit for a little longer than wakeup interval. In the US, the base station samples mobile node frequency twice in a wakeup interval. The pendants therefore transmit for a little more than the duration between the two mobile node sample time slots. For example, if the wakeup interval is 1200 milliseconds and an alarm packet transmission takes 120 milliseconds, in Europe, MNT×Duration will be 1200 milliseconds and the pendants transmit ten packets.

After the first transmission, the pendant waits for a random time interval before repeating the transmission. The random wait time is determined by choosing a random number between 2 and 10. The time after the first transmission (previous step above) is divided into time intervals of MNT× Duration. If the chosen random number is 5, the pendant transmits in the start of the fifth interval. The random number is chosen from 2 so that if there was a collision with another mobile node, choosing a random number of 1 could potentially cause collision with the same transmission, as the mobile nodes are not time synchronized.

The previous step is repeated three times to ensure that the base station receives the packet at least once even when more than one pendants are transmitting at the same time or in case of bad channel. The device identifier of the pendant is included in the packet so that the hub may verify if it belonged to the system.

At BS

When the base station receives a packet from the pendant, it forwards it to the hub. The hub verifies if the pendant belonged to the system, based on the device id in the packet. The same procedure is followed for the US. The number of mobile node alarms packets transmitted may be different if the duration between mobile node time slots is different.

Counter Handling

Since the pendant has only one button, it causes no problems if multiple alarms from the same pendant are passed to the hub. Although a counter may not be required, it is included to keep the packet formats similar to that of the key fob. The counter value should always be zero.

The pendants are powered-up only on key press and power down after a predefined time interval. This interval should be long enough to accommodate the worst-case time needed for repeating the transmissions, i.e. if the chosen random number is 10 each time.

Procedure for Key fobs

Figure 32:
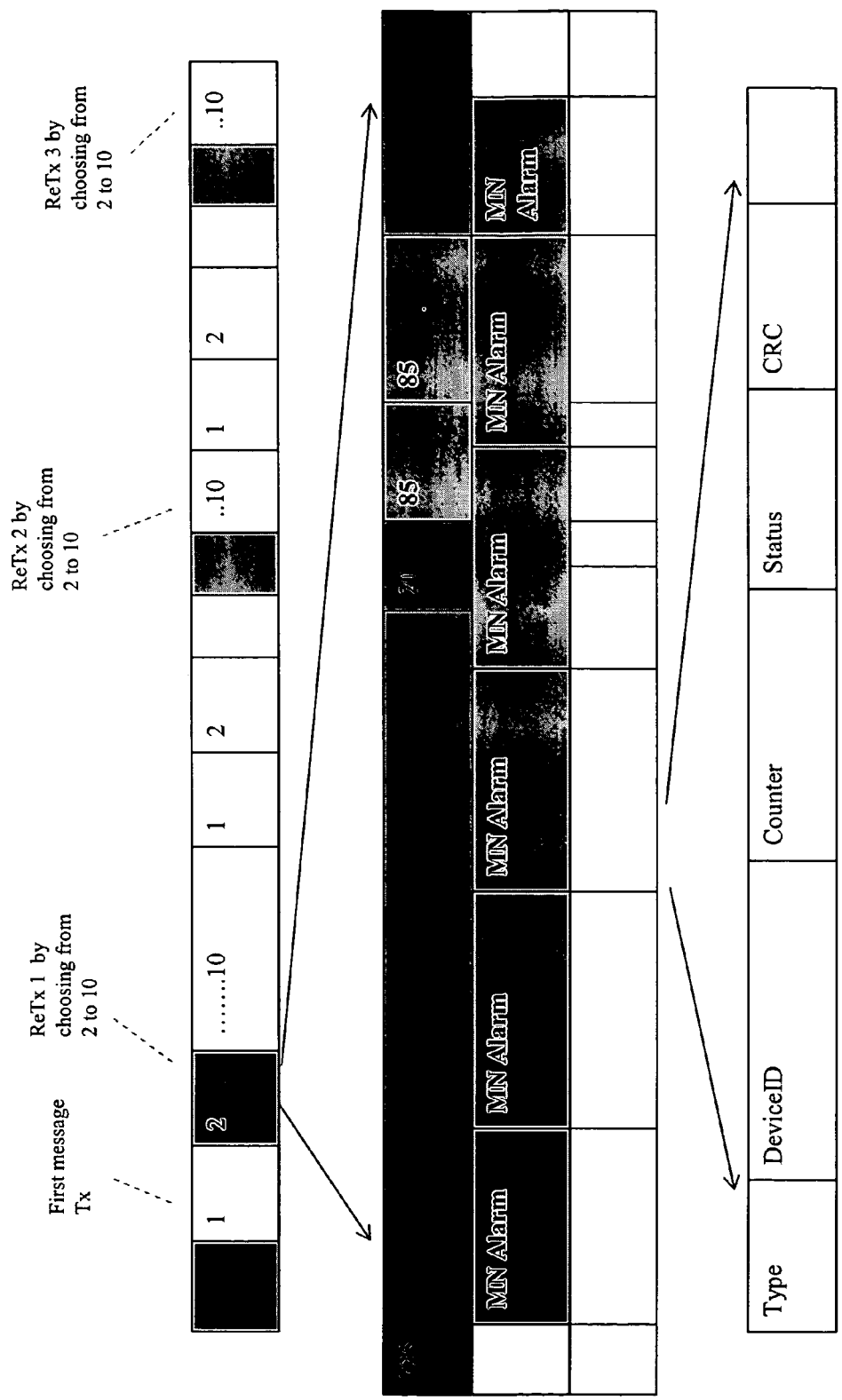
FIG. 32 shows an exemplary time slot structure for packet transmission at a key fob type mobile node.

The key fobs may either transmit alarm packets or commands like arm/disarm that need to be passed to the hub and panel. The appropriate back channel command may then be sent to the network nodes from the panel whenever needed. The procedure for packet transmission at the key fob is shown in FIG. 32.

At Node

Whenever a button is pressed, the key fob comes out of low-power mode. The key fob transmits a mobile node packet and waits for an acknowledgement. If an acknowledgement is not received within the timeout it retransmits again. It repeats this for "MNT×Duration". If the key fob does not receive an acknowledgement at the end of "MNT×Duration", it follows the previous step of pendants. (After the first time the key fob picks a random number between 2-10 and transmits mobile node packets to cover 1 mobile node (MN) time slot). The key fob performs CSMA before transmitting for MNT×Duration. The packet from the key fob includes the six-byte device identifier of the base station to which it belongs to in addition to its own node identifier. The 6-byte device identifier of the base station is used by the base station to verify that the node belongs to its system. After the key fob receives the acknowledgement from the base station to the packet it sent, it waits for a predetermined time for the response from the base station, if any. During this wait, the node performs RF wakeup. The RF wakeup duration will be determined by the size of the back channel time slot. If a response packet is received the key fob sends the acknowledgement to it, else it goes to power down mode at the end of the defined wait time.

At BS

When the base station receives a packet from the key fob, it verifies that the node belongs to the system and also the validity of the counter. After the packet is verified, it sends an acknowledgement to the node and passes the packet to the hub if the counter is valid. The acknowledgement packet consists of one byte of cyclic redundancy check (CRC) from the packet received so that if multiple nodes were expecting an acknowledgement, it would not be misinterpreted. Subsequently, whenever a response (not for all packets) is sent by the hub to the base station, it sends a tone followed by the packet. The procedure for the response packet is similar to that for sending asynchronous back channel from the base station to mobile nodes. The procedure is same as for Europe except for the mobile node sample time slot.

Counter Handling

The counter handling procedure is as described below.

MN to Hub Messages

The counters for messages from mobile nodes to the base station is handled at the base station. The counter is incremented for every new message from mobile node to the base station. The base station performs counter validity like for any other application. If the counter is not valid it sends back an acknowledgement with the correct counter. It does not pass this message to the hub if the counter is not valid. The mobile node sets its counter to that received from the base station and sends the packet again. This may happen when the mobile node keys are pressed when it is not in the communication range of the base station.

Hub to MN Messages

The hub manages the counters for packets sent to the mobile node. Although the packet contains a counter field, it may not be validated at the mobile node. The hub increments it for every new message from hub to mobile node.

Procedure for Keypads

Figure 33:
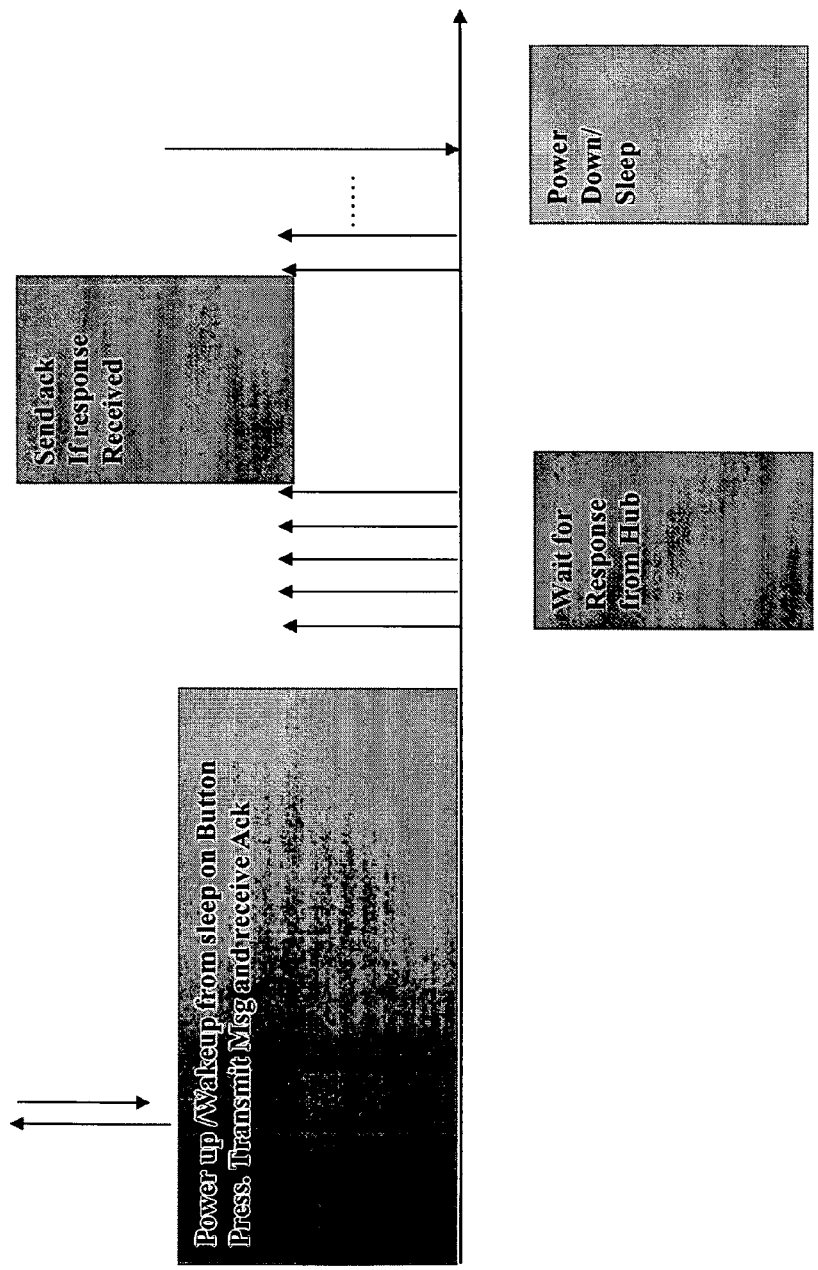
FIG. 33 shows an exemplary key fob transmission pattern.
Figure 34:
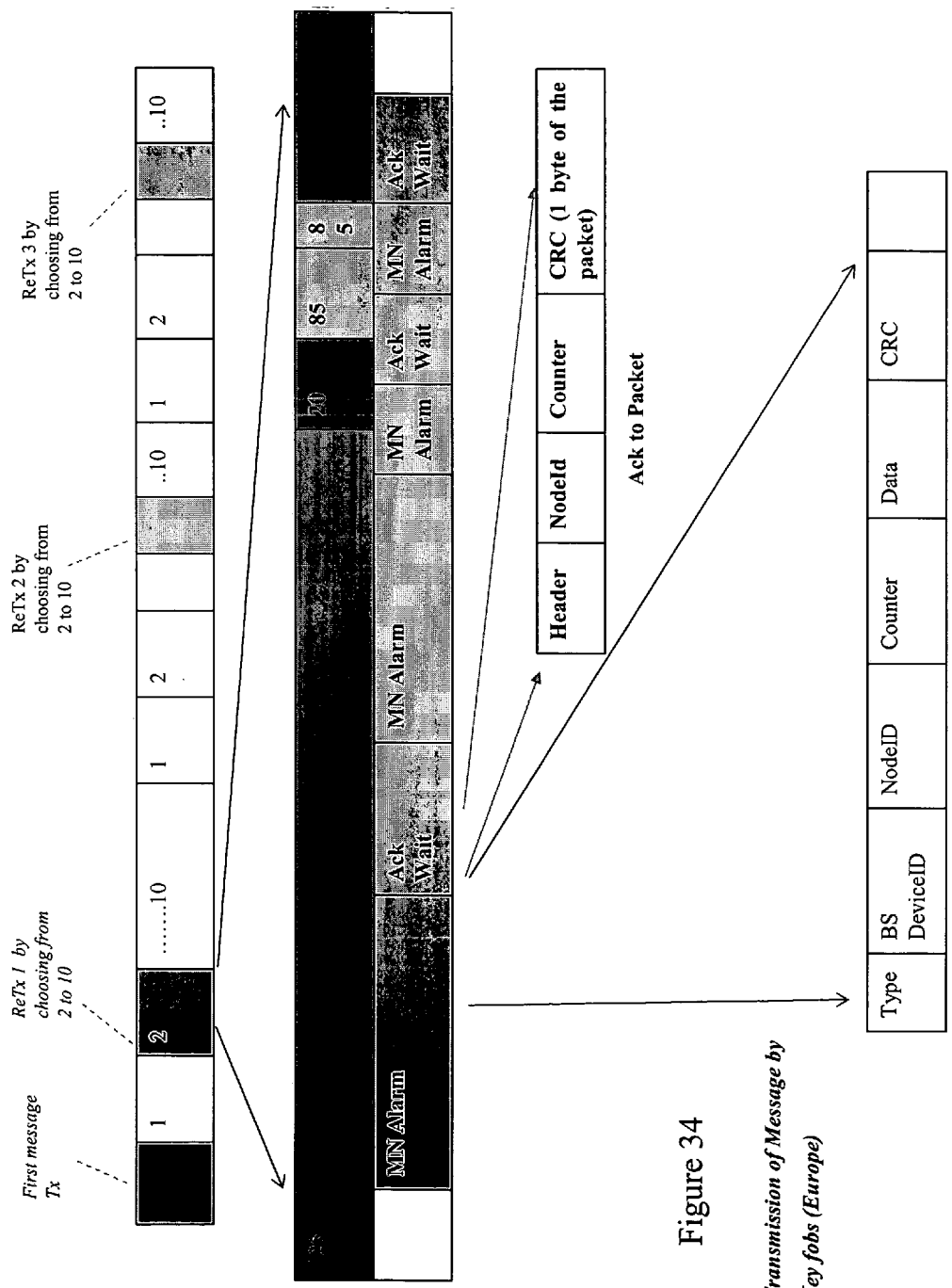
FIG. 34 shows an exemplary transmission of a message by a key fob for European compliant systems.

FIG. 33 shows an exemplary key fob transmission pattern, and FIG. 34 shows an exemplary transmission format of a message by a key fob for European compliant systems.

Keypad Consists of 2 Microcontrollers.

The keypad may include two microcontrollers. For example, the keypad may include a key micro microcontroller to handle the interaction with the keypad and the display, and/or a sensor transceiver to handle the interaction with the sensor network and pass all the information from the panel/hub to the keypad microcontroller.

The wireless sensor node system may support certain functionalities for keypads. For example, the wireless sensor node system may support asynchronous messages from the panel/hub base station to keypads. These messages may always be unicast to a keypad, periodic supervision of keypads, or asynchronous messages from keypads to the base station. The message priority may be prioritized as follows:

Network alarms

Mobile node alarms

Mobile node messages from the base station to mobile nodes

Network back channels/supervision

Network supervisions are not wiped out to accommodate mobile node output commands/supervisions. If a network back channel and output command/supervision simultaneously exist in the message buffer of the base station, need to decide about the priority. This may be performed at the base station.

Asynchronous Messages from BS to Keypads

At Node

Keypads may be in the "RF Wakeup" mode, since the keypad should be ready to receive asynchronous messages from the base station and at the same time save battery power. The duration of sleep time between wakeups may be determined by the size of the back channel slot and the time for communication between keypads and the base station. When a message from the hub is received, the nodes verify if the messages is intended for them by comparing the device identifier in the message with that of the node. If it matches, an immediate acknowledgement is sent to the base station. The cyclic redundancy check (CRC) of the received packet is included in the acknowledgement. The keypad also performs any action that is requested in the message.

At BS

Any message that is to be sent to a mobile node is passed from the hub to the base station. The hub also prioritizes the messages that are sent to the base station. The device identifier of the mobile node is included in the packet. In the mobile node sample time slot, the base station samples the mobile node frequency to check if any packet is being received since alarms from mobile nodes have higher priority than messages from the base station to mobile nodes. The base station sends a tone that is a little longer than the RF wakeup interval of the keypad. The message from the hub follows the tone. When an acknowledgement is received from the keypad, it is forwarded to the hub. If the base station does not receive an acknowledgement with a predefined period of time (timeout), it sends a packet to the hub indicating mobile node failure. It is the responsibility of the hub to retransmit the packet to the mobile node.

Supervision of Keypads

The hub supervises keypads. Supervision messages are handled by the wireless sensor node system as any other asynchronous message from the hub to the mobile node.

At Node

The keypads perform RF wakeup waiting for any asynchronous message from the base station. When they receive a tone followed by a supervision message, the keypad sends an acknowledgement if the device identifier in the message matches its own device identifier. The cyclic redundancy check (CRC) of the supervision message is included in the acknowledgement and the node status, if any.

At BS

The hub supervises each keypad in a supervision interval and the device identifier of the keypad is included in the message. At the end of each supervision interval (supervision of static nodes), the base station sends an end-of-supervision message to the hub. The hub could use this information to maintain supervision interval duration for mobile nodes. The base station does not differentiate between a supervision message and any other command to the mobile node. It sends the message in the mobile node slot preceded by a tone. When an acknowledgement is received, it is forwarded to the hub. If an acknowledgement timeout occurs, an acknowledgement failure message is sent to the hub. The hub retries the supervision message a predefined number of times if acknowledgement is not received.

Asynchronous Messages from Keypads to BS

Figure 35:
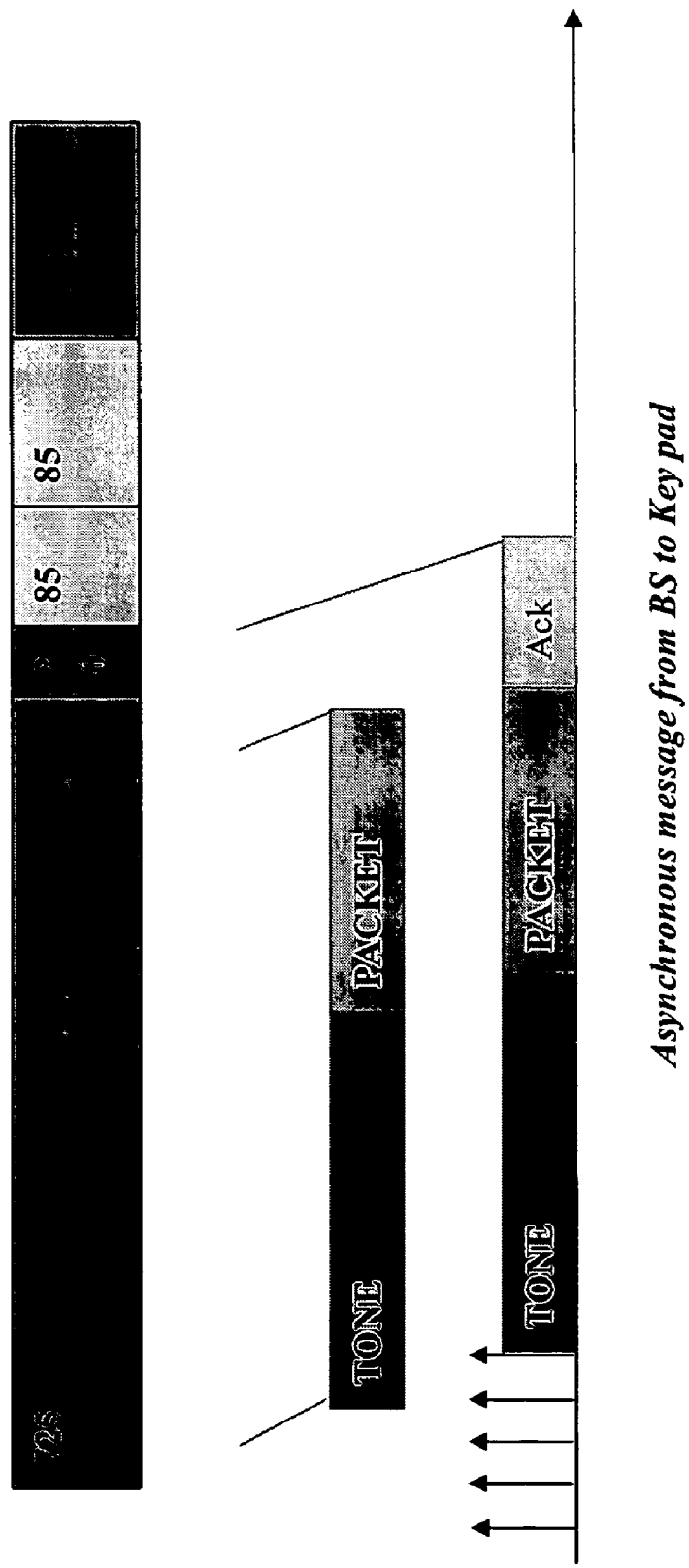
FIG. 35 shows an exemplary format of a synchronous message from the base station to the keypad.

FIG. 35 shows an exemplary format of a synchronous message from the base station to the keypad. The keypad may send different kinds of asynchronous messages to the base station, including, for example, alarm messages from the keypad to the base station which are handled similar to those from key fob to base station, or other messages (key presses/ status messages). Such as, for example, key presses, etc, which depend on the type of command. Since two such messages and their acknowledgements may be accommodated in one back channel slot in the United States and Europe the same procedure as that for message from key fob to alarm. A poll is therefore not required as using non-return to zero (NRZ) reduces number of on-air bytes.

Counter Handling

Counter handling procedure for keypads may be identical to that described for key fob when it is not powered down.

Mobile Node Configuration

The following describes communication between mobile nodes and the MPS when the mobile nodes have no configuration data. This may be used, for example, to configure mobile nodes that have not yet been initialized, (their device identifier may need to be collected, validated and configuration data should be given to them), or during mobile node configuration, to store configuration data in flash which was unsuccessful due to flash write error and subsequently watchdog reset or battery replacement occurs. The procedure may be used to send panic alarms from such nodes.

Procedure at Base Station

The base station receives mobile node packets only after network initialization, when it is in the slotted mode. Whenever the base station receives a packet with type/sub type indicating "packet with 6 byte device Id", the base station just forwards the packet to the MPS. The base station does not acknowledge such types of packets. This packet may be from a pendant, keypad or a key fob. In particular, the base station does not acknowledge because the node may not belong to this network, or the same packet type may be used for pendants and these packets and the base station may not need to process these packets. The MPS acts on the receipt of packet, depending on the mode it has been set to. If the MPS is in configure mode, it passes the device identifier of the mobile node to the panel for user verification. If the device identifier is valid, it sends configure mobile node command to the node. If the MPS is not in configuration mode, and if the node belongs to the MPS, the MPS informs the panel about the alarm message received. It also sends back configuration information to the node. The configure command may include the device identifier of mobile node, mobile node identifier, network identifier, the base station device identifier (if the mobile the mobile net can hear to networks with same network identifier, use the base station device identifier in packets to the base station, or any settings (keypad supervised, etc).

In this regard, the mobile node is always given the oldest base station device identifier even if there were multiple hub replacements during the network life time. When the base station receives packets from the mobile nodes (e.g., keyfobs or keypads), it compares the oldest base station device identifier with the device identifier in the packet. Mobile node identifiers (MNID) share the address space with static nodes' node identifier, multicast group identifiers and pendants. The BSTM forwards this configuration packet just as any output command to a mobile node, except that it resets the counter value that has been stored for the mobile node. This packet also serves as an acknowledgement to the earlier packet from the mobile node. When an acknowledgement to the configure packet is received, the BSTM forwards it to the MPS. If the acknowledgement packet indicates a flash write error and the MPS is in configuring mode, the user is informed about the configuration error. Mapping of the mobile node to user or area needs to be performed at the panel.

Procedure at Node

As pendants are transmit only nodes, they are never given any configuration information. The transmission of alarms for pendants is similar to the procedure described for pendants. When a panic alarm is generated from a key fob or a keypad, if they do not have any configuration information, then the node transmits stream of packets for "MNTxDuration". The node does not wait for acknowledgements in between packet transmissions, as the BSTM would not acknowledge. This packet contains the device identifier of the node Oust as pendants).

After the first transmission, the node waits in RF wakeup mode for a random time interval before repeating the transmission. The random wait time is determined by choosing a random number between 5 and 15. The start value for the random number is 5 instead of 2, to ensure that there is sufficient wait time to get the configure packet in response to the packet sent. If a configure command is received, the node updates its configuration information and sends back an acknowledgement. If a flash write error occurs, this information is passed in the acknowledgement. After sending the acknowledgement, the keypad continues to perform RF wakeup. The key fobs may remain powered up for predetermined period doing RF wakeup and then go to low-power mode at the end of this period. If the nodes do not receive a configure command, they repeat the above procedure three times.

After the third attempt the key fobs should do RF wakeup for a predetermined period. This predetermined period needs to be longer than the normal wait of fifteen seconds after a key press so that the user may have sufficient time to validate the device identifier of the node. This wait period may be, for example, five minutes.

Frequency Drift Compensation for Mobile Nodes

The base station may always perform mobile node sample with 50 KHz wide band. When the base station receives packet from the mobile node, $\delta f$ is measured by the base station. If $\delta f>$ predetermined threshold, the base station adjusts its frequency by $\delta f$ and transmits acknowledgment. The acknowledgement contains a $\delta f$ value. The mobile node receives an acknowledgement with 25 KHz bandwidth. When the mobile node receives an acknowledgement, it adjusts frequency by $\delta f$. The base station goes back to it original frequency (before adjustment). Keypads perform RF wakeup with 50 kHz as they may be receiving packets intermittently. Key fobs perform RF wakeup with 25 kHz bandwidth as they do RF wakeup only after transmission of messages.

CSMA Procedure for Mobile Nodes

The mobile nodes perform carrier sense multiple access (CSMA) protocol exchange prior to each MNTxDuration. They do not check the channel prior to each packet transmission. The nodes first check the channel using automatic wakeup of the radio. If the channel is free, the channel is checked again after a duration that should include the acknowledgment timeout, the delays due to radio, etc., to ensure that the node does not grab the channel during an intermediate acknowledgment wait time of another node. If the channel is found free, the node transmits for MNTxDuration. Otherwise, if the channel is found busy in any of the two checks mentioned above, the following backoff procedure may be performed. In particular, the node chooses a random number from 5 to 15 to determine the backoff duration. The granularity of each unit is 100 milliseconds, i.e. the back off duration ranges from 500 milliseconds to 1500 milliseconds to allow for another mobile node to complete its transmission if it has already started to transmit. After a wait time determined by the random number, the node again checks the channel. If the channel is found busy again, the previous steps are repeated for a maximum of five times or until the cumulative backoff duration is five seconds, whichever occurs first. At the end of five checks/five seconds, the node transmits even if the channel is busy.

Lost Time Beacons and Battery Replacement

Lost Time Beacons

The base station may send time beacons periodically to the nodes so that the nodes are synchronized to the base station's clock. Two time beacons may be sent on the network frequency and one time beacon may be sent on the backup frequency in a time beacon cycle of 120 seconds. If a node receives one of the three time beacons, it does not wakeup for the other time beacons. If a node does not receive a time beacon within two time beacon cycles, the node may not be synchronized with the base station's clock. The following describes the recovery procedure for a node that has lost synchronization with the base station. The MPS detects loss of sync with a node and starts the recovery procedure when it encounters a supervision failure, a missed back channel acknowledgement, or an async alarm.

Procedure at the Base Station

When the MPS receives any one of the above triggers, it sends a "Config Node by Device Id" command to the base station. The base station sends the "Config Node by Device Id" command to the node in the default frequency. In addition to the data received from the MPS in the previous step, the base station adds certain parameters to the message, including, for example, time (added by the communication stack), supervision and time beacon counters, and an alarm counter (the alarm counter is reset and sent to the node). The base station forwards the acknowledgement from the node to the MPS. If the MPS does not receive the acknowledgement to the "Config Node by Device Id" command, it retransmits the message "N" times. The number of retransmissions is determined by the MPS. The MPS sends a "Query Node" command in the network frequency to the base station. This is a verification message to ensure that the node is operating in the network frequency. The base station forwards the acknowledgement to the "Query Node" command to the MPS.

Procedure at the Node

If the node does not receive a time beacon with two time beacon cycles, it switches to the default frequency and performs RF wakeup. The node receives the "Config Node by Device Id" command and verifies its device identifier with the corresponding value in the received message. If they match, the node sets its time and counters and updates its configuration flash with the received data. Therefore, the node sends an acknowledgement to the base station. The node switches to the network frequency and network operation at a pre-defined time. Therefore, the node sends an acknowledgement to the "Query Node" command.

Battery Replacement

When the battery is replaced at a node, it loses synchronization with the base station. The base station and the node follow the same procedure as in the lost time beacon recovery procedure to re-establish synchronization between the base station and the node. A tamper alarm is generated when the installer removes the sensor node from the fixture and a restore tamper alarm is generated when the installer puts the node back in the fixture. The triggers that initiate a lost node recovery procedure may include, for example, a supervision failure, a missed back channel acknowledgement, an async alarm, or a user input at panel (see below). The tamper alarm may be sent on the network frequency when the sensor node is removed from the fixture. After the batteries are replaced, another tamper alarm is sent on the default frequency as the power up start initializes the RAM and there is no memory of the first tamper alarm. If the node has a corrupt configuration flash (due to, for example, a flash write error), the nodes may not be able to send a tamper/tamper restore alarm when the batteries are replaced. In this instance, a user input at the panel may trigger the node recovery. The MPS may determine whether it should initiate the "Addition of New Nodes" procedure or query each node and for nodes that failed to acknowledge to the query command.

Procedure at the Node

When the battery is replaced, the node boots up and as part of the boot up sequence, and reads the configuration from the flash. If the node finds a valid configuration data in the flash (e.g., validated by checksum), it updates the configuration from the flash and performs RF wake up in the default frequency. After configuration, if the node detects a tamper or restore tamper alarm, it may be reported to the base station.

32 KHz Crystal Drift

According to an exemplary embodiment, a time slotted approach may be used to save energy and reduce channel contention. This requires that the nodes and the base station be synchronized to each other as much as possible. The inaccuracy in time slot increases the slots assigned for each activity/node. In particular, 32 KHz crystals may be used to keep time at the base station and nodes. Certain inaccuracies of the crystal and the maximum inaccuracy the crystals in an exemplary system may include, for example, an initial tolerance of ±20 ppm, a temperature tolerance of 20 ppm, and/or an aging of +/−3 ppm.

Initial Inaccuracy

Initial inaccuracy may be measured at the factory and stored at a predefined location in the flash memory. The inaccuracy may give the number of ticks the crystal is off by. For example, in every 1000 ticks the crystal may gain one tick. This information is used by the software to adjust for the inaccuracy. The offset is used to compensate drift by adjusting the overflow value, for example, if hardware overflows every 500 ticks then after two overflows the software may miss a tick.

Temperature & Aging Inaccuracy

The protocol is configured to handle inaccuracies up to a maximum of 30 ppm. As soon as the inaccuracy is more than that the delays for the operations may increase. The base station transmits three time beacons at a predefined time every two minutes. The transmission may ensure that if relative inaccuracy is 30 ppm, the nodes may still be able to receive the time beacon (if sent every two minutes). The nodes reset their time based on the time beacon. As long as the nodes receive one time beacon every two minutes, the inaccuracies that arise due to temperature and aging may not affect the protocol if it is less than 30 ppm max.

Other Inaccuracies

If the total inaccuracy (other than the initial inaccuracy) in the crystal is less than 30 ppm, the periodic time beacons may be able to handle it.

BS Watchdog Reset

When MPS performs a watchdog reset, it also resets the base station and the procedure used to recover from it is same as panel power-down procedure. When the base station alone does a watchdog reset, network information stored in MPS is current and the base station requires updates its memory. The base station does not store any information in non-volatile memory. It receives the network information from the MPS (then there is no need to resync this information). It resynchronizes with the network nodes and resets the counters.

Procedure at BS

The base station sends a packet to the MPS indicating it performed a watchdog reset. The MPS gives the information needed by the base station. The procedure from here is very similar to the panel power-down procedure, except the packets contents are different.

Synchronize Sensor Transceivers

Figure 36:
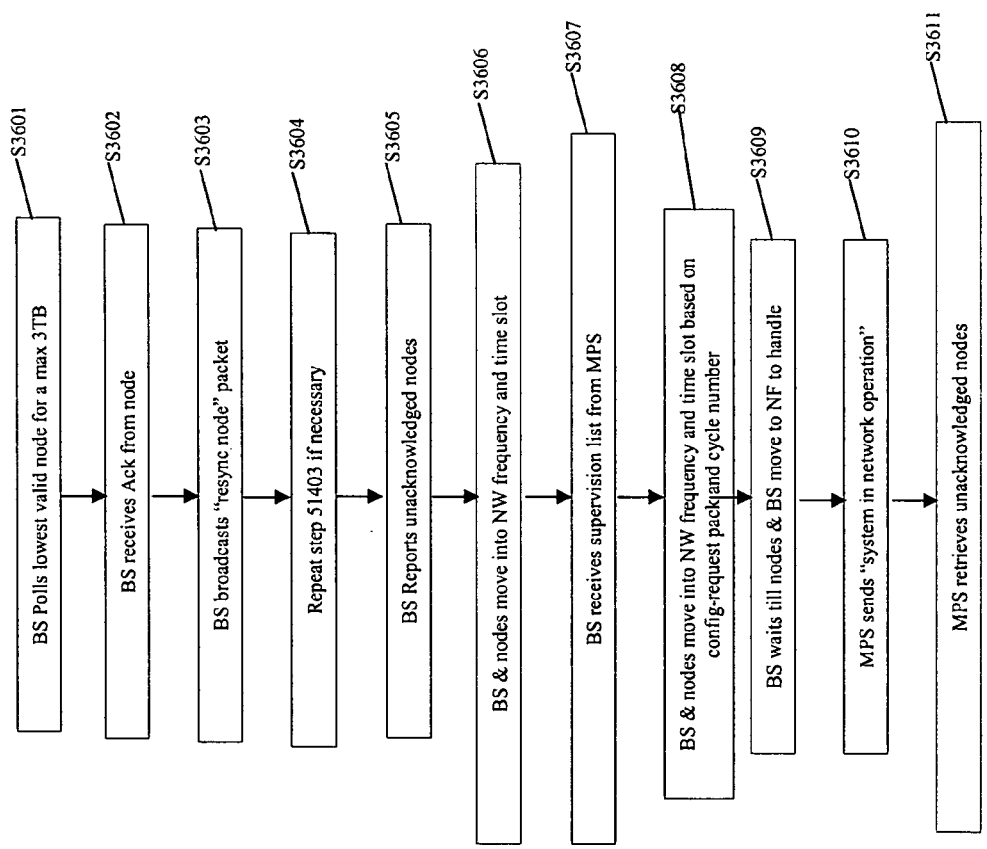
FIG. 36 shows an exemplary network to synchronize sensor transceivers.

FIG. 36 shows an exemplary network to synchronize sensor transceivers. In step S3601, the base station polls the lowest valid node for a maximum of three time beacon cycles using the "default-type packet" with subtype "poll for node" (preceded by a tone), in the default frequency. In step S3602, after three time beacon cycles TB and/or acknowledgement is received from the node, the base station proceeds to step S3603. In steps S3603, the base station broadcasts "default-type packet" with subtype "resync nodes" (preceded by a tone), in the default frequency (uses network identifier in the packet). This packet is triggered by the base station since it is keeping a timer to keep track of three time beacon cycles. In step S3604, the base station repeats step S3603 several times if an acknowledgement is not received from all the nodes. In steps S3605, at the end of step S3604, if some nodes have not acknowledged it is reported to the MPS. In step S3606, the base station and the nodes move into network frequency and time slot structure, at a predefined time. In step S3607, after the above step, the base station may receive the supervision list from MPS at anytime. In step S3608, the base station and the nodes move into the network frequency and time slot structure, at a predefined time (based on the config-request packet and cycle number). In step S3609, the base station waits to handle alarms until the nodes and the base station moves to the network frequency. In step S3610, after step S3609, when the system moves to network operation, the MPS will send a packet to the panel "system in network operation" to indicate that it can handle alarms now. In step S3611, if the MPS does not receive acknowledgements from all nodes, it may use the same procedure used for loss of time beacons to retrieve the nodes. Note: all the above steps are same as hub replacement. The contents in step S3603 are different.

Procedure at the Node

When the node does not receive time beacons for four minutes it switches to the default frequency and performs an RF wakeup (with 50 KHz bandwidth). If the node receives a tone followed by a "Default-Type Packet" with sub-type "poll for node" from the base station, it verifies that the network identifier matches (done at the application) and the node identifier is same as its own. If these match, it responds with a dummy acknowledgement with the network identifier. After this, the node element goes back to RF wakeup. If these do not match it returns to RF wakeup immediately. If the node receives a tone followed by a "Default-Type Packet" with subtype "resync nodes" from the base station, it resets certain counters and issues an acknowledges in the slots based on its node identifier. The certain counters may include, for example, a supervision counter, a time beacon counter, and an alarm counter. The nodes then continue with their RF wakeup. At a predefined time it moves to network frequency and slotted structure.

HUB Replacement and Panel Power-Down

HUB Replacement

When a hub is replaced, data at the panel and two node is used to reconstruct the hub's configuration data automatically, after an installer is authenticated and issues the command to replace the hub. The replacement sequence may be as follows:

The old hub disappears from the option bus causing a trouble. A new hub appears at the same option bus address. The hub's six-byte device identifier is used to determine if the hub has been changed. The system may not automatically attempt to substitute the new hub. An installer may have to authenticate him/herself at a keypad and issue the command to replace the hub. The panel gathers the network identifier, supervision interval, grade information, point number to device id relationships and the area and type (exterior etc.) the points belong to and send them to the new hub. The hub then passes the network identifier to the base station. The network identifier informs the base station of the correct frequencies to operate on. The base station then broadcasts a query to all nodes that have this network identifier (the network identifier should be unique to one hub). The nodes may respond to the query with their configuration data that is passed to the hub to reconstruct the hub's configuration database (device type, six-byte device identifier, node identifier, supervision on/off (keypads), backup frequency or frequencies, node troubles). After all nodes report, the system is ready to operate normally with the new hub. If the panel verifies the hub's six-byte device identifier to guard against replacement then the hub's six-byte device identifier must also be passed to the panel. For multi-cast groups, the system may be divided into areas (area 1, area 2 etc). Each area may have subareas (perimeter, interior etc.). It may be required to arm or disarm a set of nodes in the whole system (all motion detectors. etc). A node may belong to all the above or some of the multicast groups. A node may belong to a maximum of four multi-cast groups.

Panel Power Down

The hub (MPS and base station) derives power from the panel. When the panel loses power, the MPS and base station also loses power and may have enough time to store the network specific information, which has changed since its last write, into the non-volatile memory. In this regard, the panel and MPS store most of the network information in non-volatile memory. The information that is not stored in the non-volatile memory should be synchronized between the panel, MPS, base station and nodes. The base station and nodes may be out of sync with respect to time and might have moved to non-slotted operation. The base station may not store any data in the flash memory.

Panel Power Down Handling at "Panel"

Various types of data may be stored in the non-volatile memory of the panel. For example, the panel may store the device identifier of the first hub in the system. The panel may not re-sync all the hubs connected to the same panel. Once the panel realizes there has been a panel power-down it sends a command to MPS indicating this. The procedure is the same for panel power down from next point.

HUB Replacement Handling at Panel

The user notifies the user that the hub has been replaced. The panel checks the device identifier of the hub to verify this. Once it is verified that there is a new hub, following procedure starts. The panel passes the following data to the MPS: (i) device identifier (three significant bytes or all six bytes) of all sensor transceivers that are part of this network, (ii) point number for every device (MPS keeps point number to node identifier mapping), (iii) network identifier and backup frequencies, (iv) device identifier of all mobile nodes that are configured to be part of this system, (v) panel gives the oldest (first hub) hub identifier to the new hub so that it can be used for mobile node verification, (vi) no harm in sending it for panel power-down even though it is not needed, and (viii) supervision interval, grade information (grade information required for supervision power level) (same byte may be used to indicate both). The data at the MPS is different from that received from the panel, it is overwritten with the panel's data. Regarding data received from the nodes, all the common data will be from the panel by MPS. Common data is not needed from the node for verification. The configuration data specific to the node may include, for example: (i) six byte device identifier (panel might not have all bytes so send it always), (ii) out registers from the sensor micro, (iii) node identifier, (iv) multicast group (max of four), and (v) position in the multicast group (gives the acknowledgement position). It is noted here that multicast information received from the nodes is used to build the database at the MPS. This database is compared with the information got from the panel. If nodes participation in multicast group is inconsistent with the panel's information, the nodes are updated.

Procedure at BS

After the hub is replaced/panel power-down, the MPS sends a configure base station command, which may include, for example, the network identifier, back up frequencies, device identifier of the oldest base station (used to verify mobile node), supervision interval, maximum number of nodes. (If panel power-down occurs, MPS has the node identifier. This field will be maximum node identifier. If the hub is replaced, this field will be 240, and the device identifier (three bytes) of one of the sense transceivers.

Collect Information from Sensor Transceivers

Figure 37:
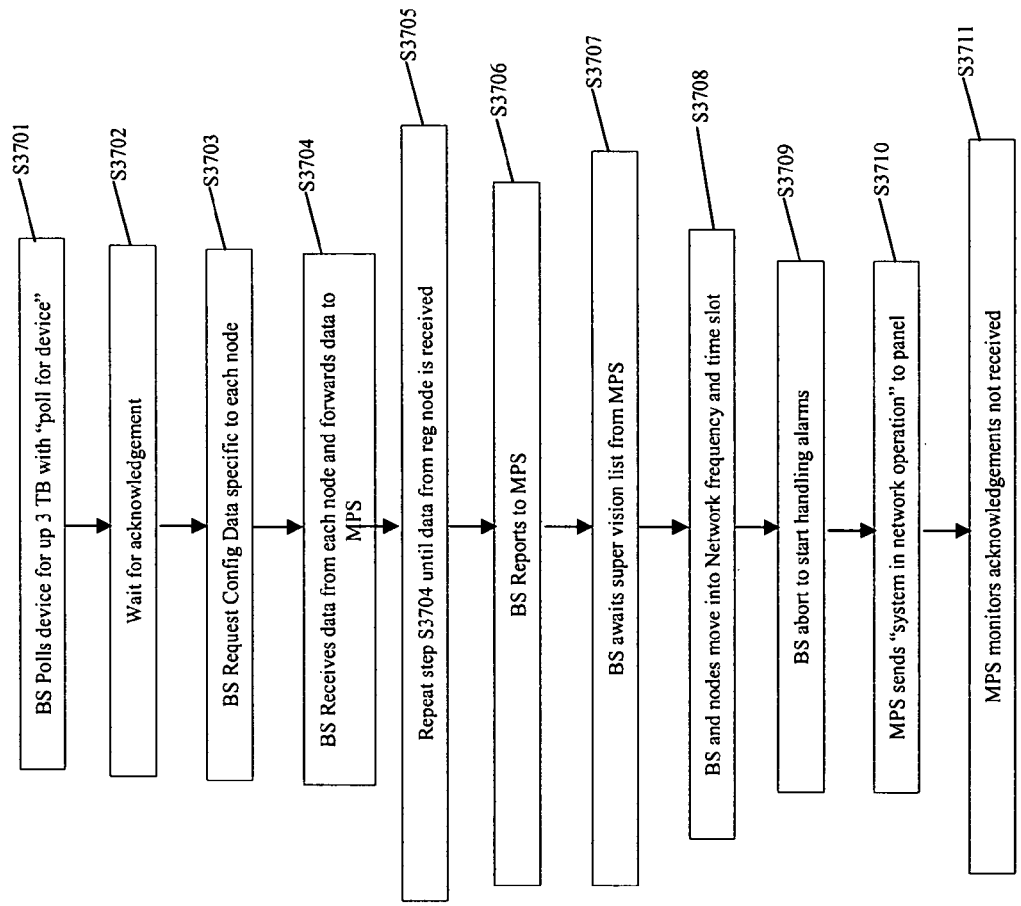
FIG. 37 shows an exemplary method to collect information from sensor transceivers.

FIG. 37 shows an exemplary method to collect information from sensor transceivers. In step S3701, the base station polls the device (device identifier provided by the MPS) for a maximum of three time beacon cycles using the "default-type packet" with subtype "poll for device" (preceded by tone), in the default frequency. The packet includes the device identifier (three bytes) of the node being polled. In step S3702, after three time beacon cycles and/or an acknowledgement is received from the device, which ever happens first, the base station proceeds with the next step. In step S3704, the base station broadcasts "default-type packet" with subtype "Config-Request" (preceded by tone), in the default frequency (uses network identifier in the packet), requesting the configuration data specific to each node.

This packet is triggered by the base station since it is keeping a timer to keep track of three time beacon cycles. The packet may contain back-up frequencies and a supervision interval. The base station may wait to receive an acknowledgement from a maximum number of nodes. In step S3704, the base station receives the data from each node in a time-slotted fashion based on their node identifier. The base station passes this information to the MPS as it arrives.

In step S3705, the base station repeats step S3703 several times until the data from every node is received. The repetition is triggered by the base station since it keeps a bit mask of all nodes that have acknowledged. In step S3706, after the predefined number of retries or after all acknowledgments have been received, the base station reports to the MPS the nodes that did not acknowledge. In step S3707, after the above step, the base station may receive the supervision list from the MPS at anytime. In step S3708, the base station and the nodes move into the network frequency and time slot structure at a predefined time based on the config-request packet and cycle number. In step S3709, the base station may not handle alarms until the nodes and the base station move to the network frequency. In step S3710, after step S3706, when the system moves to network operation, the MPS may send a packet to the panel "system in network operation" to indicate that it can handle alarms now. In step S3711, if the MPS does not receive acknowledgments from all nodes, it may use the same procedure used for loss of time beacons to retrieve the nodes. On panel power-down, e.g., hub/base station power-down, verify the data received from the nodes to the information stored in the non-volatile memory. If it is different for any node, then send separate "config" packets to those nodes in the network frequency in a time-slotted fashion. (the back channel time slot may be used for this).

Procedure to Handle Mobile Nodes

Mobile nodes may need no special handling for hub replacement. The MPS may need to provide the base station with oldest bay station device identifier.

Procedure at the Node

When the node does not receive time beacons for two time beacon cycles it goes into the default frequency and performs RF wakeup (with 50 KHz bandwidth). If the node receives a tone followed by a "Default-Type Packet" with sub-type "poll for device" from the base station, it verifies that the three bytes of device identifier is the same as its own. If these match, it acknowledges with the network identifier it is using. After this, the node returns to RF wakeup. If these do not match, the node returns to RF wakeup immediately. If the node receives a tone followed by a "Default-Type Packet" with sub-type "Config-Request Packet" from the base station, it verifies the network identifier and responds with data specific to the node, in the slots based on its node identifier. The nodes then continue with their RF wakeup. At the end of the collection of configuration data phase(s), the node moves to the network frequency to continue in a time-slotted manner at a predefined time. The wireless sensor network may not support automatic panel replacement procedure.

Message Exchange

Figure 38:
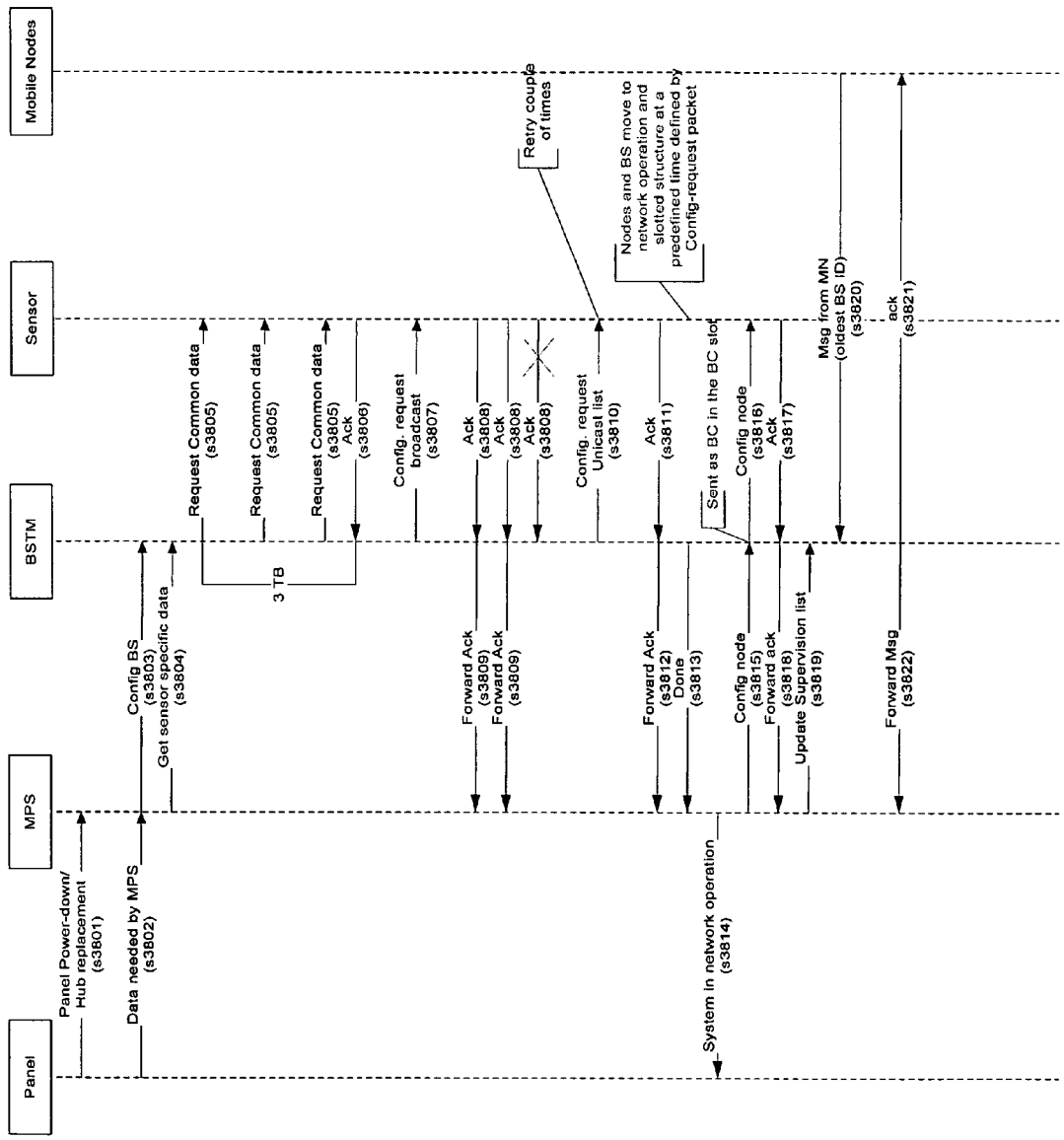
FIG. 38 shows an exemplary message sequence diagram for hub replacement and power down.
Figure 39:
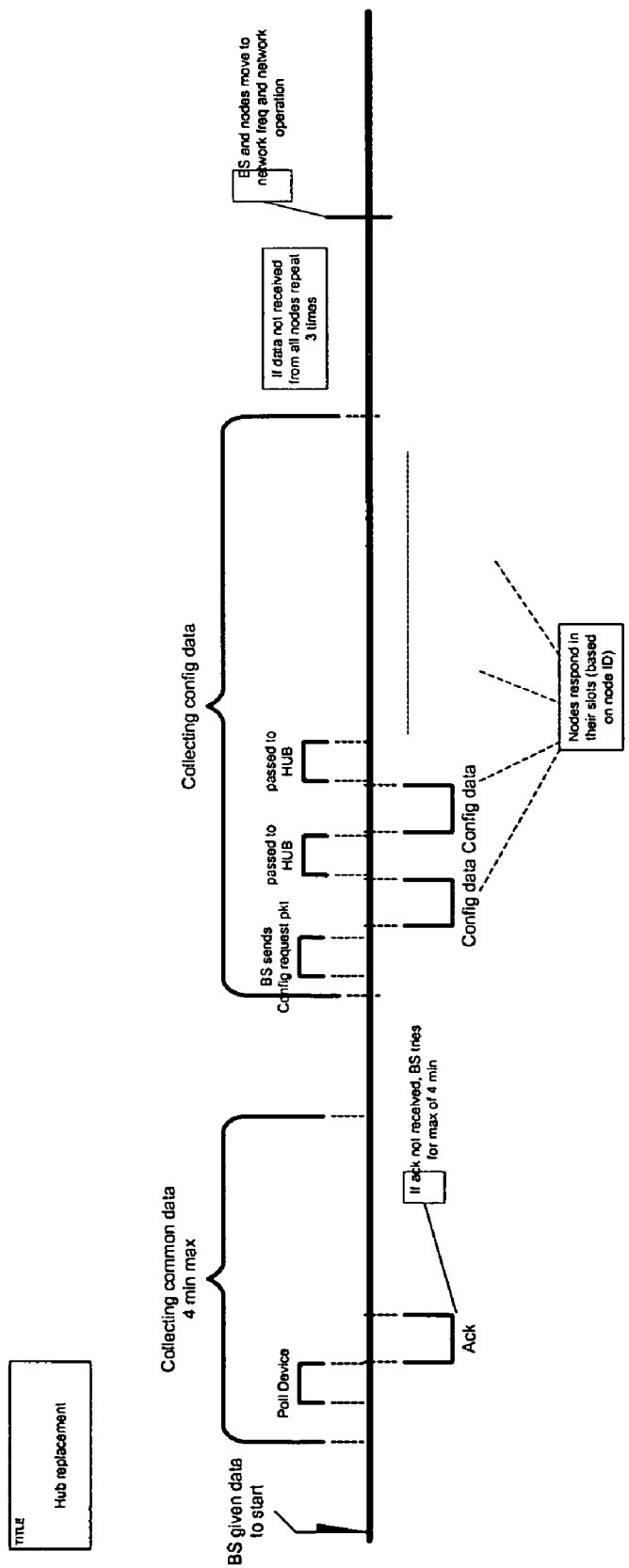
FIG. 39 shows a timeline for an exemplary sequence for hub replacement.

FIG. 38 shows an exemplary message sequence diagram for hub replacement and power down. In step s3801, upon the occurrence of a panel power-down, the panel may send an initialize message to indicate to the hubs that there was a panel power-down occurred. When the panel is informed about a hub replacement, it sends a start command to the new hub. In step s3802, all the data required by the MPS is sent by the panel to the MPS. If this is a panel power down, the MPS verifies its local data as compared to the data received from the panel. If the data is different, the MPS overwrites its local data with data from panel and notifies the user. For a hub replacement and panel powerdown, the MPS overwrites its local data with the data received from the panel. In step s3804, the base station is configured using the data sent by MPS. In step s3804, the MPS initiates the procedure to "get node specific data" from the node. In step s3805, the base station unicasts the packet "poll for device" and waits for an acknowledgement. The base station retries for a maximum of three time beacons or until an acknowledgement is received, whichever happens first and moves to the next step. In step s3806, an acknowledgement is sent from the node to the base station, which contains the network identifier the node is using. In step s3807, a configuration request is sent from the base station to the node. In particular, the base station broadcasts the "config request packet" using the network identifier received during step s3806. Based on the cycle number, all the nodes and the base station will move to network operation mode at a predefined time. In step s3808, an acknowledgement is sent from the nodes to the base station in which the nodes reply in a slotted fashion based on their node identifier. In step s3809, the acknowledgements from the nodes are forwarded by the base station to the MPS.

In step s3810, a configuration request is sent by the base station to the node(s). In particular, the base station constructs a unicast list (e.g., keeps a bit mask) based on the nodes that did not acknowledge and keeps track of when to timeout. In step s3811, the nodes addressed by base station respond with an acknowledgement that includes their data. In step s3812, the acknowledgement from the nodes is forwarded by the base station to the MPS. In step s3813, after the process for collecting "node specific data" is done, the base station informs the MPS of the nodes that did not acknowledge and the network identifier that the network is using. In step s3814, the MPS informs the panel that the system is in network operation and which network identifier the network is using. In step s3815, if any of the data stored at the MPS is different from the information received from the nodes, the MPS sends individual configure node commands to the node using the node identifier. In step s3816, the base station forwards the data to the node via the back channel. In step s3817, the node sends an acknowledgement. In step s3818, the acknowledgement from the node is forwarded to the MPS by the base station. If acknowledgement is not received from the node, the base station informs the MPS about the failure and repeats step s3815. In step s3819, the supervision list is updated and sent to the base station by the MPS. In step s3820, most messages from the mobile node include the hub identifier. Accordingly, the same procedure to handle packets from mobile network nodes is used here. In step s3821, if the received hub identifier is same as the oldest hub identifier, the base station accepts the packet. In step s3822, the packet is forwarded to the MPS.

Jamming

Depending on certain regulatory requirements, there may be two kinds of jamming detection (also referred to as "Interference Protection") that should be handled by the protocol.

In the US, interference protection should be continuous. Reception of any unwanted (interfering) transmission by a retransmission device (e.g., a repeater), or by the receiver/control unit for a continuous period of twenty seconds or more, which inhibits any status change signaling within the system, should result in an audible and visual trouble signal indication at the receiver/control unit, which identifies the specific trouble condition (interfering signal) as well as the device(s) affected (e.g., repeater and/or receiver/control unit).

In Europe, cumulative interference protection is provided so that, for example, a sum total of predefined seconds (grade dependent) of interference signal in any 60 seconds. In this regard, the cumulative interference protection may be provided at a Grade 1—sum total of 30 seconds of interference signal in any 60 seconds, or a Grade 2—sum total of 30 seconds of interference signal in any 60 seconds. For all grades, where the interference detected is less than 5 seconds in any period of 60 seconds, there is no indication or notification The system may be configured so that jamming detection and/or interference protection is performed only at the base station. Hence, jamming detection need not be performed at nodes (since, moreover, the nodes receive arm commands and jamming of receivers has to be detected). Jamming on the mobile network frequency should also be detected, for example, at the base station and also at the mobile nodes that perform RF wakeup only.

Jamming need not be reported if there is high signal strength for the network frequency. Moreover, jamming detection may not be required at the default frequency since although nodes may send alarms in the default frequency, jamming may be reported when all frequencies, including the network frequency and the backup frequency, are jammed and thus not wait for the default frequency to be jammed.

Jamming Detection

Figure 40B:
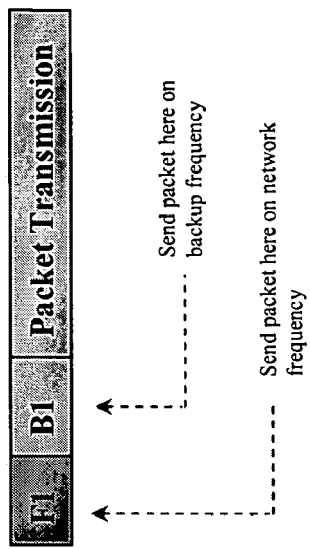
FIG. 40B shows an exemplary alarm time slot structure for European compliant systems.
Figure 40A:
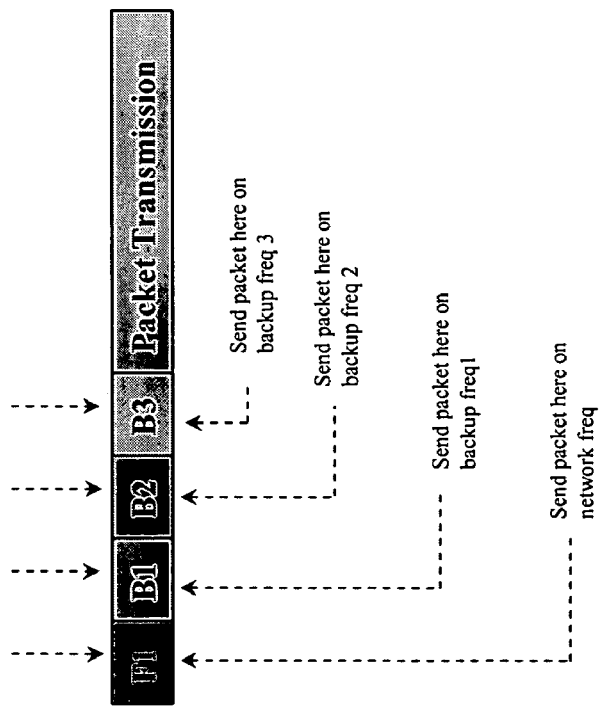
FIG. 40A shows an exemplary alarm time slot structure for US compliant systems.

The MPS should be informed as soon as any interference (e.g., continuous or cumulative as described above) inhibits any status change signaling within the system. Therefore, the device(s) of the network may report when jamming is detected, for example, in the network and/or backup frequency for continuous 20 seconds (US) or sum total of 30 seconds in 60 seconds (EU). In this regard, the device(s) of the network may detect jamming differently. For example, the base station may detect jamming during an alarm sample for network operation. In particular, the base station may sample in four channels in US, as shown, for example, in FIG. 40A, or the base station may as sample in two channels in Europe, as shown, for example in FIG. 40B. Likewise, the base station may sense the mobile network frequency in the mobile network time slot to receive any mobile network packets (e.g., alarms, key presses, etc.) and inform the MPS if there is jamming in the mobile network frequency. Moreover, the nodes of the network may receive arm, supervision, etc. from the base station such that if the nodes detect jamming during a back channel time slot in the frequency they are responsible for sampling, it should be reported to the base station. The mobile nodes may also transmit mobile node packets (e.g., alarm, commands, etc.) to the base station and if a mobile network node (e.g., only the one that performs RF wakeup, keypads) senses jamming, it should report it to the base station.

To handle jamming, every device performs certain steps. For example, initially for each pass a "jamming detection" flag, which is used to indicate jamming, and a "reported" flag, which is used to indicate if jamming was reported, are cleared. If jamming is detected for a particular pass a jamming count is incremented (e.g., US compliant systems) or a bit is set in the jamming history (e.g., European compliant systems). If the jamming is greater than a predefined threshold, then the MPS is informed directly, or via the base station, and the "reported" flag is set. Subsequently, when the device senses a "no jamming" condition, the device sends a restore jamming message and clears the "reported" flag. Further details regarding how particular devices of the system (e.g., base station, mobile nodes, or other nodes) handle jamming are described below.

Jamming Detection at BS

The base station samples in the alarm time slot for network jamming, and samples in the mobile network time slot for the mobile network jamming. If the base station senses network jamming and/or mobile network jamming, it immediately notifies the MPS.

Network Jamming

For each network and back frequency time slot, the base station clears the jamming flag if the base station does not sense a high signal or receives an alarms packet. If the base station senses a high signal during the network frequency time slot without receiving a packet, the base station does not clear the jamming detection flag. Accordingly, if the jamming detection flag is set it indicates that jamming was sensed in all the frequencies sampled.

MN Freq Jamming

During the mobile network time slot, if the base station senses a high signal without receiving a packet, it sets the jamming detection flag.

Jamming Detection at Sensor Nodes

Sensor nodes detect for jamming in the back channel time slot where they perform an auto power-up to receive any back channel packet. In particular, during each back channel time slot, the node samples the network frequency for a high signal, and if a high signal is not detected, the node goes back to sleep immediately. During each alternate back channel time slot, in addition to sampling the network frequency for a high signal, the node also samples the backup frequency for a high signal, and if a high signal is not detected, the node goes back to sleep immediately. FIGS. 41A and 41B show two exemplary sampling sequences performed by the sensor nodes.

Network Jamming

During the back channel time slot, if the node does not sense a high signal or receives a valid packet (e.g., back channel or preamble for network identifier poll or network identifier poll) in the network frequency, it clears the jamming-detection flag. If the node senses a high signal without receiving a packet, it does not clear the jamming detection flag. During alternate back channel time slots, in addition to above step, if the node does not see a high signal or receives a valid packet, it clears the jamming detection flag Jamming Detection at MN (Keypad)

Mobile nodes that perform an RF wakeup every predefined period (e.g., 200 milliseconds) sense for jamming. In particular, once every RF wakeup duration, the mobile node (keypads) performs an auto power-up to receive any packet from the base station. If the mobile node does not sense a high signal or fails to receive a valid packet, it clears the jamming detection flag. If the mobile node senses a high signal without receiving a packet, it does not clear the jamming detection flag.

Continuous (US)

FIG. 42 shows an exemplary truth table for continuous interference protection (US) prescribing the action to be taken on every pass based on the status of the jamming detection flag and the reported flag.

Cumulative (Europe)

Figure 43:
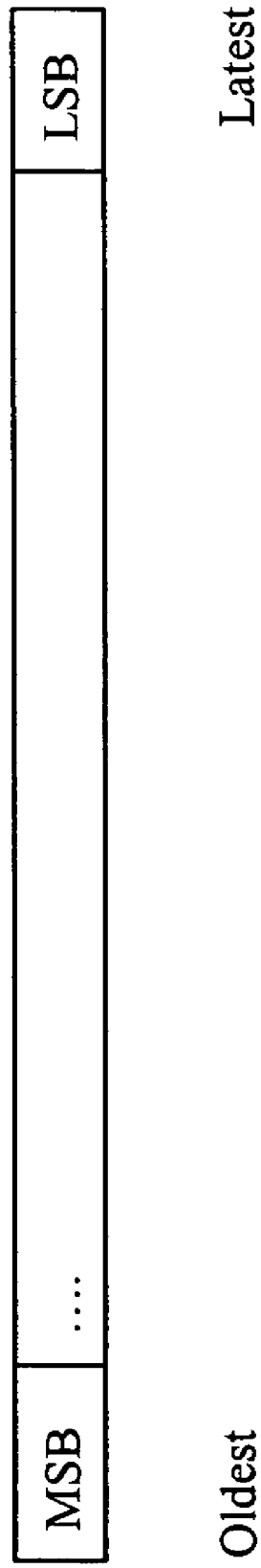
FIG. 43 shows an exemplary jamming history field for cumulative interference protection.

FIG. 43 shows an exemplary jamming history field for cumulative interference protection (Europe), which is configured as a 60-bit field that keeps track of the jamming state in every pass for 60 sec interval. The exemplary jamming history field is initialized to zero, and the jamming count, which keeps track of number of "1s" in the jamming history (thus removing the need to count the number of is in jamming history) is initialized to zero.

On every pass certain actions may occur. For example, the jamming count is decremented if the most significant bit (MSB) is set in the jamming history field and the jamming history is shifted by one bit to the left. If the jamming detection flag is cleared, no action is performed. Otherwise, if the jamming detection flag is set, the least significant bit (LSB) is set and the jamming count is incremented. If the reported flag is cleared and the jamming count exceeds a predefined threshold (e.g., 30 if wakeup interval is one second), the reported flag is set, jamming is reported, all 60 bits of the jamming history are set, and jamming count is set to 60 (indicating the number of ones in the jamming history). Since the sensor nodes detect jamming by sampling the network frequency during the back channel time slot, and the network and backup frequencies during alternate back channel time slots, if jamming is detected in only the network frequency time slot and not in the alternate back channel time slot where both network and backup frequencies are sampled, and the jamming count is at the threshold of 30, the counter would toggle between 29 and 30, which may result in jamming being reported in every alternate back channel time slot if the jamming count and all 60 bits were not set. Moreover, if the reported flag is set (looking for no jamming to report restore jamming) and the jamming count is less than the predefined threshold (e.g., 30 if wakeup interval is one second), the reported flag is cleared, a restore jamming is reported, and the jamming count and all 60 bits of the jamming history are cleared.

Addition of Nodes

When adding one or more nodes to the system, it may be assumed that the network parameters such as the network identifier, network frequency, backup frequency, etc., remain the same after the new nodes are added. If, for example, the operator prefers to reevaluate the network identifier and frequency with the newly added nodes, the operator may use the "manual frequency selection" option, by which the system picks up the most suitable frequencies and network identifier.

The addition of new nodes may involve, for example, node discovery and/or node configuration. In particular, when adding nodes, the base station first discovers uninitialized nodes that are within listening range and forwards the received device identifiers to the MPS. The discovery process may span across several back channel time slots. The MPS forwards the discovered device identifiers to the panel for validation and then configures each node using the "Configure Nodes by Device Id" command, which is a back channel command in the default frequency. Upon receiving the configure command the nodes update their configuration and switch to the network frequency and network operation.

At the Base Station

The MPS sends the "Start Device Id Discovery" command to the BSTM, with discovery type of "existing network", the number of nodes to be added and the device type. The BSTM sends the "Device Id Start" message to the nodes in the back channel time slot. The device identifier time slots are spread over several back channel time slots, starting with the next back channel time slot where the start message is sent. The base station computes the total cycle duration in terms of the number of back channel time slots it needs to wait for device identifiers from the nodes, which is calculated based on the number of device identifier time slots that can be accommodated in a back channel time slot and the total number of device identifier time slots required, considering the three intervals (T1=2N slots, T2=1.5N slots and T3=0.7 N slots) per cycle for device identifier collection. The base station skips its current back channel time slot and starts waiting for device identifier messages from nodes from the beginning of the next back channel time slot, which starts with the cycle start time at the base station. The base station starts device identifier receive at the beginning of a back channel time slot, and when it receives a message, it sends an acknowledgement to the node and forwards the device identifier to the MPS. (The base station may need to schedule an event to stop device identifier receive at the end of the current back channel time slot). This may be repeated for as many back channel time slots as needed to complete one cycle.

At the end of one complete cycle, the base station schedules the retry cycle starting from the next back channel time slot, sends the device identifier start message, and repeats one or more of the steps as described above in the retry cycles. In the retry cycles, the base station sends the value of 'number of nodes to be discovered' as the number of nodes remaining to be discovered so that, accordingly, the cycle duration may be recalculated. When the base station is finished with the retry cycles, it sends a "Discovery Complete" message to MPS, and this completes the discovery phase, which may continue for all three cycles, even if the expected number of devices is received. When the MPS receives the discovery complete message, it forwards the device identifier message to the panel for validation. The operator may then issue the discovery command again to repeat the discovery process to find more nodes. Furthermore, when the MPS receives the response from panel, it sends the "Config Node by Device Id" command to individual nodes. For those nodes that are not approved, the MPS sends the same command with a node identifier value of "0". The MPS then sends a message to base station to update the supervision list with the newly added nodes—"update supervision list" with a bit-mask representing all nodes.

At the Node

Initially the nodes are in RF wakeup, waiting for the device identifier start message. When the nodes receive the device identifier start message, each node picks up a random number as the temporary time slot for sending the device identifier to the base station. The nodes calculate their slot start time based on the temporary slot number and the back channel time slot structure in base station. In this regard, there may need to be some indication in the start message to the node that this is a discovery in network operation phase so that the node perform the slot calculation accordingly. The nodes skip one wakeup interval duration (e.g., T milliseconds) to sync with the next back channel time slot, where T is the time for sending the device identifier start message. In other words, T is the time elapsed since the start of back channel time slot to the time at which the start message is received at the node, which is the cycle start time at the node. The nodes calculate their slot start time as follows, Slot start=CycleStart+(mySlot/$m$)*wakeup Interval time+((mySlot % $m$)-1)*slot interval Where '$m$' is the number of device identifier time slots that can be accommodated in a back channel time slot. The nodes sleep until this time, then wake up and send the device identifier message to base station and wait for an acknowledgement. On receiving the acknowledgement, the node goes to RF wakeup waiting for the node identifier message. In this phase, nodes may not accept another device identifier start message, but may receive default type messages. When the node receives the 'Config Node by device Id' message (which is a default type message) from the base station, it sends an acknowledgement to base station. The nodes update their configuration parameters with the values received in the message and save the data to flash memory, for example. The node then switches to the network frequency and network operation. Those nodes that are not approved, (e.g., node identifier=0), reset themselves and return to the initialization start phase.

It is noted that the abort command may not be supported during addition of nodes.

Deletion of Nodes

The deletion of a node from a wireless network may include, for example, removing the node from the supervision list and/or resetting the node to the factory default state by erasing its configuration data. In particular, the MPS may send a node reset command (e.g., reset by device identifier) to the base station for the node to be replaced. The reset command may be sent, for example, in the network frequency first and if the MPS does not receive an acknowledgment, it retries in default frequency. Upon receiving this message the nodes erase the configuration flash memory and reset themselves. If an acknowledgement of the reset command is not received, a certain number of retry attempts may be performed. The MPS then sends a message to the base station to remove the node from the supervision list and the base station updates its supervision list. In this regard, the base station may not send a supervision poll to the deleted nodes and the back channel acknowledgement time slots are emptied for the deleted nodes. The MPS then removes the node from its database.

Replacement of Nodes

The replacement of nodes may involve, for example, the deletion of the node to be replaced and an addition of a new node. In this regard, the base station and the nodes may follow the same procedures for the addition and deletion of the node. However, certain other procedures may occur, including, for example, procedures performed at the MPS. In particular, the MPS may send a node reset command to the base station for the node to be deleted. The base station sends the delete command to the node. The MPS then sends addition of node command to the base station, which includes the number of nodes to be added equal to "1" and the device type of the node to be replaced. The base station performs a discovery for the given device type and then forwards the discovered device identifiers to the MPS. If there is only one node matching the device type is discovered, the MPS need not send this to the panel for validation. The MPS sends a configure node by device identifier command to the base station for the new node, which assigns the node identifier of the deleted node to the new node. The MPS then updates its database with the device identifier of the node.

Node Reset

The node reset feature may be used to reset a node to its factory default state by erasing the configuration data from the flash memory. The type of node reset may include, for example, a software node reset and a hardware node reset option.

The software node reset option may be used to reset a node, which is part of a network and the system is in network operation. The procedure for software node reset may use a back channel command to reset a specific node. The software reset command is sent only when the base station is in network operation, and the MPS indicates which frequency to be used for sending this command.

To perform a software reset, the MPS sends a node reset command (e.g., as a back channel command) to the base station, with the device identifier of the node to be reset and the frequency to be used (e.g., default network frequency). The BSTM sends this command to the node as a back channel command. For reset in the network frequency, the base station sends the reset command to the node in the back channel time slot with the device identifier of the node in the message. For reset in the default frequency, the base station sends the "default type" packet with sub type as "reset" in the back channel time slot with the device identifier of the node in the message. When the node receives a software reset command, it verifies the device identifier and if it matches, it erases its configuration in the flash memory, resets itself, and sends an acknowledgement to the base station, which forwards the acknowledgement from the node to the MPS. The MPS may retry the reset attempt in case of failure.

The hardware node reset option may be used to initialize a node to its factory default state by erasing the configuration flash memory and then issuing a reset. When the node detects a hardware reset, it erases the configuration data from flash and resets itself.

Flash Data Storage

The non-volatile data storage at the node and the base station may include, for example, two type of data—the manufacturing data and configuration data. The manufacturing data is saved to non-volatile memory during manufacturing, and does not change during system operation and cannot be erased in the field. The manufacturing data at the node and the base station may include, for example, the device identifier and frequency compensation data.

The configuration data is written during the installation phase and changes/updates to this data is possible during system operation. The configuration data, may include, for example, the node identifier, a list of backup frequencies, a supervision interval, sensor configuration, and one or more multicast groups the node belongs to and the position of the node in each of the multicast groups.

The base station may not save any configuration data in its flash memory. Instead the base station may receive configuration data from the MPS. In particular, when the base station boots up, the MPS sends the data in response to a request from the base station.

The configuration data and the manufacturing data should be stored in separate flash blocks, and all flash write failures should be reported to the MPS. At the nodes the flash write occurs at end of initialization or on manual frequency selection or a on "Config Node by Device Id". In these instances, the error should be reported to the MPS in the acknowledgement message. If this is not possible, the error should be indicated via the supervision status.

Figure 44:
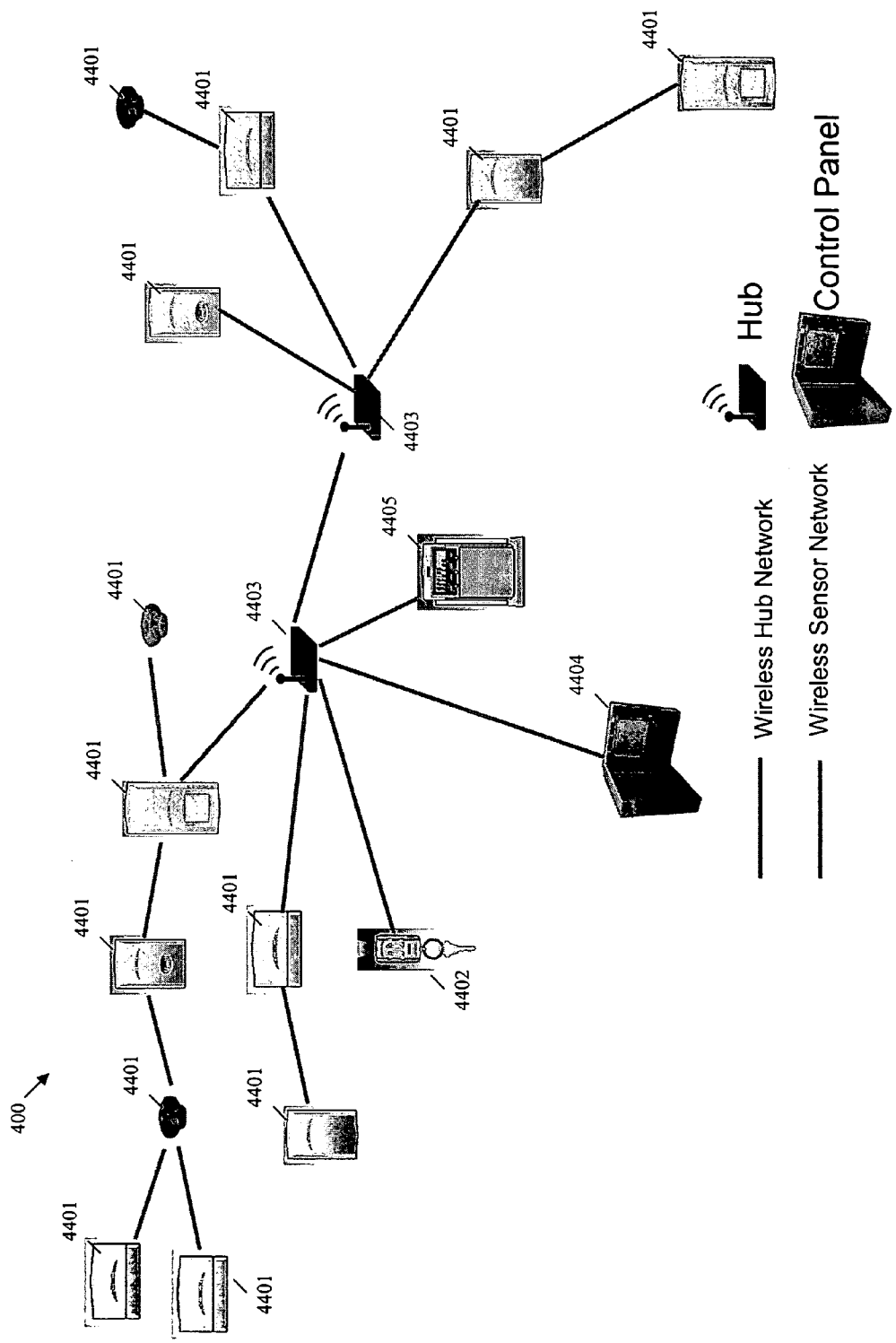
FIG. 44 shows an exemplary wireless system, which includes a plurality of sensor devices, a key fob, two hubs, a control panel, and wireless keypad.

FIG. 44 shows an exemplary wireless system 4400, which includes a plurality of sensor devices 4401, a key fob 4402, two hubs 4403, a control panel 4404, and wireless keypad 4405. The sensor devices 4401 may include, for example, a smoke detector, a motion sensor, door/window contacts, etc. The sensor devices 4401, key fob 4402, control panel 4404 and wireless keypad may form a wireless sensor network, and the two hubs 4403 may form a wireless hub network.

Figure 45:
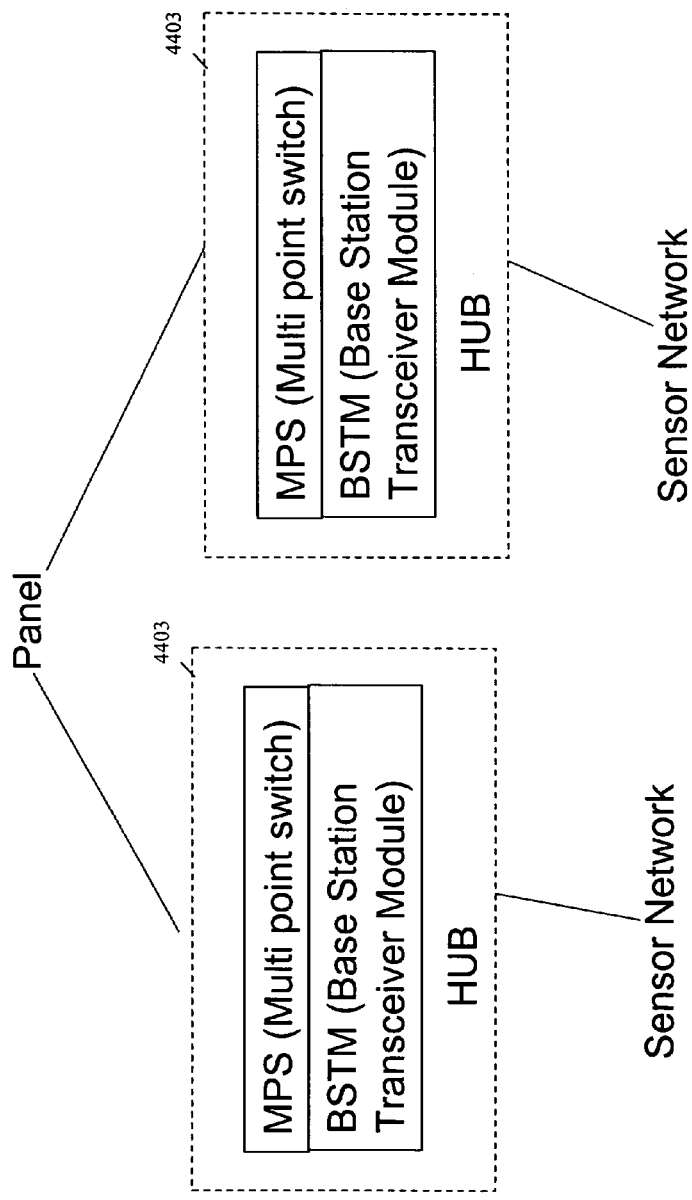
FIG. 45 shows an exemplary implementation of the two hubs of the exemplary wireless system of FIG. 44.

FIG. 45 shows an exemplary implementation of the two hubs 4403 of the exemplary wireless system 4400 of FIG. 44. In particular, the two hubs 4403 may include a multi point switch (MPS) and a base station transceiver module (BSTM). The multi point switch (MPS) provides an interface to a panel and/or other hubs. The base station transceiver provides an interface to the sensor network.

System Parameters for US Compliant Networks
Radio: CC1021
Data rate: 34.4 kbps
Total Number of channels (frequency bands): 18
Default frequency (1): Nodes start in default frequency.
Mobile node frequency (1): Used for communication between mobile nodes and base station.
Network and Backup frequencies (16): The remaining sixteen frequencies are used for network operation. Each network has one network frequency and three backup frequencies.
Network frequency: Each network chooses one fixed network frequency out of sixteen frequencies. All communications in the network occur on this frequency.
Backup frequencies: Each network chooses a set of three backup frequencies out of sixteen frequencies. These frequencies are used for retransmissions when the transmission on the network frequency doesn't get through.

These sixteen frequencies ideally may be shared by four adjacent installations. The system may support 128 adjacent installations. But ideally as one network uses four frequencies and we have sixteen frequencies in total, there should be only four adjacent networks.

System Parameters for Networks in Europe
Radio: CC1020
Data rate: 4.8 kbps
Total Number of channels (frequency bands): 8
Default frequency (1): Nodes start in default frequency.
Mobile node frequency (1): Used for communication between mobile nodes and base station.
Network Frequency (4): Four frequencies are kept for network operation. Each network chooses one fixed frequency from the four preassigned network frequency. All communications in the network occur on this frequency.

Backup frequency (2): Each network also chooses one fixed backup frequency out of the two pre-assigned backup frequencies. These frequencies are used for retransmissions when the transmission on the network frequency doesn't get through.

There may be a direct mapping of frequency number and network identifier, which allows frequency usage to be identified once the network identifier is known. For instance, if we know that network identifier 3 is used by a parallel network installation then frequency 3 is also likely used by that installation for network operation. The function, which maps network identifier with frequency number is as follows:

Frequency-number=Network-ID % Total-number-of-network-frequencies

As an example, the total number of network frequencies is four for Europe, which implies that for frequency 2 in Europe network identifiers 2, 6, 10, and 14. The total number of network frequencies in US compliant systems is sixteen, which implies for frequency 2 in a US compliant network identifiers 2, 18, and 34.

What is claimed is:

1. A method for initializing a wireless network, comprising:
    discovering at least one node of the wireless network that is within hearing range of a base station of the wireless network;
    authenticating the at least one discovered node;
    assigning a node identifier to the at least one discovered node; and
    selecting a network frequency, at least one backup frequency, and a locally unique network identifier;
    wherein the step of assigning the node identifier to the at least one discovered node further includes:
        broadcasting a first cycle start message to the at least one node, the first cycle start message including a cycle number, a message type, and a total number of time slots in a cycle, the message type including one of broadcast and unicast;
        performing a RF wakeup by the at least one node to receive the broadcasted first cycle start message and sleeping until an allocated time slot;
        sending a node identifier message to the at least one node during the allocated time slot, the node identifier message include a device identifier;
        performing a RF wakeup by the at least one node during the allocated time slot to receive the node identifier message and sending an acknowledgement to the base station if the device identifier of the node identifier message matches a device identifier of the at least one node;
        sending a subsequent cycle start message to the at least one node, which includes a list of nodes that failed to acknowledge the node identifier message, sending the node identifier message to the at least one node during the allocated time slot if the at least one node failed to acknowledge the node identifier message, and performing a RF wakeup by the at least one node if the at least one node is included in the list; and
        repeating the above step for a predefined number of cycles.

2. The method of claim 1, wherein the step of discovering the at least one node of the wireless network includes:
    transmitting a wakeup signal to the at least one node;
    performing a RF wakeup by the at least one node to receive the wake up signal; and transmitting a device identifier of the at least one node to the base station.

3. The method of claim 2, wherein the device identifier transmitted to the base station is transmitted in a random time slot using a Carrier Sense Multiple Access (CSMA) protocol exchange.

4. The method of claim 1, wherein only those nodes whose slot identifier is present in a cycle start message wakeup for receipt of the node identifier message.

5. The method of claim 1, wherein the step of selecting the network frequency, at least one backup frequency, and the locally unique network identifier, includes collecting information regarding at least one of quality and network usage.

6. The method of claim 5, further comprising:
performing an ambient received signal strength indication (RSSI) reading for at least one frequency.

7. The method of claim 5, further comprising:
performing a signal-to-noise (SNR) reading for the at least one frequency.

8. The method of claim 5, further comprising:
collecting information regarding which frequencies and network identifiers are being used by an adjacent installation.

9. The method of claim 8, wherein the information is collected using a network poll approach.

10. The method of claim 9, further comprising:
sending a poll packet message to at least one node of the adjacent installation; and
receiving a response message from the at least one node of the adjacent installation, the response message including at least one of a network identifier of the adjacent installation and a frequency used by the adjacent network installation.

11. The method of claim 10, wherein the poll packet is sent by the at least one node of the wireless network.

12. The method of claim 10, wherein the poll packet is sent during a back channel time slot.

13. A method for configuring a network, comprising:
discovering at least one node of the network that is within communication range of a central station of the network;
authenticating the at least one discovered node;
assigning a node identifier to the at least one discovered node;
collecting information regarding a quality of at least one transmission path between the central station and the at least one node;
collecting information regarding which communication paths and network identifiers are used by an overlapping network; and
selecting a preferred transmission path, at least one backup transmission, and a locally unique network identifier, based on the collected information;
wherein the step of assigning the node identifier to the at least one discovered node includes:
broadcasting a first cycle start message to the at least one node, the first cycle start message including a cycle number, a message type, and a total number of time slots in a cycle, the message type including one of broadcast and unicast;
performing a RF wakeup by the at least one node to receive the broadcasted first cycle start message and sleeping until an allocated time slot;
sending a node identifier message to the at least one node during the allocated time slot, the node identifier message include a device identifier;
performing a RF wakeup by the at least one node during the allocated time slot to receive the node identifier message and sending an acknowledgement to the base station if the device identifier of the node identifier message matches a device identifier of the at least one node;
sending a subsequent cycle start message to the at least one node, which includes a list of nodes that failed to acknowledge the node identifier message, sending the node identifier message to the at least one node during the allocated time slot if the at least one node failed to acknowledge the node identifier message, and performing a RF wakeup by the at least one node if the at least one node is included in the list; and
repeating the above step for a predefined number of cycles.

14. The method of claim 13, wherein the information regarding which communication paths and network identifiers are used by an overlapping network is collected using a network poll approach.

15. The method of claim 14, further comprising:
sending a poll packet message to at least one node of the overlapping network; and
receiving a response message from the at least one node of the overlapping installation, the response message including at least one of a network identifier of the adjacent installation and a communication path used by the overlapping network.

16. A method for initializing a wireless communications network, comprising:
transmitting a wakeup signal to at least one node of the wireless network that is within hearing range of a base station of the wireless network;
performing a RF wakeup by the at least one node to receive the wake up signal;
transmitting a device identifier of the at least one node to the base station;
authenticating the at least one discovered node;
broadcasting a first cycle start message to the at least one node, the first cycle start message including a cycle number, a message type, and a total number of time slots in a cycle, the message type including one of broadcast and unicast;
performing a RF wakeup by the at least one node to receive the broadcasted first cycle start message and sleeping until an allocated time slot;
sending a node identifier message to the at least one node during the allocated time slot, the node identifier message include a device identifier;
performing a RF wakeup by the at least one node during the allocated time slot to receive the node identifier message and sending an acknowledgement to the base station if the device identifier of the node identifier message matches a device identifier of the at least one node;
sending a subsequent cycle start message to the at least one node, which includes a list of nodes that failed to acknowledge the node identifier message, sending the node identifier message to the at least one node during the allocated time slot if the at least one node failed to acknowledge the node identifier message, and performing a RF wakeup by the at least one node if the at least one node is included in the list;
repeating the above step for a predefined number of cycles;
collecting information regarding a quality of at least one frequency;
collecting information regarding which frequencies and network identifiers are being used by an adjacent installation; and selecting a network frequency, at least one backup frequency, and a locally unique network identifier, based on the collected information.

17. The method of claim 16, further comprising:

sending a poll packet message to at least one node of the adjacent installation; and receiving a response message from the at least one node of the adjacent installation, the response message including at least one of a network identifier of the adjacent installation and a frequency used by the adjacent network installation.

* * * * *